United States Patent [19]
Takasaki et al.

[11] Patent Number: 5,813,490
[45] Date of Patent: Sep. 29, 1998

[54] FOUR WHEEL DRIVE SYSTEM FOR AUTOMOTIVE VEHICLE

[75] Inventors: Toshiharu Takasaki, Sagamihara; Tomoyuki Hara, Isehara, both of Japan

[73] Assignee: Nissan Motor Co., Ltd., Yokohama, Japan

[21] Appl. No.: 531,441

[22] Filed: Sep. 21, 1995

[30] Foreign Application Priority Data

Sep. 21, 1994 [JP] Japan ................................. 6-226468
Sep. 21, 1994 [JP] Japan ................................. 6-226472

[51] Int. Cl.$^6$ .................................................. B60K 17/35
[52] U.S. Cl. ......................................... 180/250; 180/249
[58] Field of Search ................................. 180/248, 249, 180/250, 233, 197

[56] References Cited

U.S. PATENT DOCUMENTS

| | | | |
|---|---|---|---|
| 5,005,663 | 4/1991 | Niide et al. ............................. | 180/250 |
| 5,299,131 | 3/1994 | Haas et al. .............................. | 180/197 |
| 5,323,871 | 6/1994 | Wilson et al. .......................... | 180/249 |
| 5,366,041 | 11/1994 | Shiraishi ................................ | 180/250 |
| 5,373,912 | 12/1994 | Haiki et al. ............................. | 180/249 |

FOREIGN PATENT DOCUMENTS

| | | | |
|---|---|---|---|
| 0390197 | 10/1990 | European Pat. Off. ............... | 180/250 |
| 0090824 | 4/1989 | Japan ..................................... | 180/250 |
| 0109739 | 4/1990 | Japan ..................................... | 180/250 |

*Primary Examiner*—Anne Marie Boehler
*Attorney, Agent, or Firm*—Foley & Lardner

[57] ABSTRACT

In a four wheel drive system for an automotive vehicle, a detected value $\Delta V_W$ of difference of rotating speed between the front and rear wheels is compared with a threshold $\Delta V_{W0}$ determined in accordance with a pseudo vehicle speed $V_{FF}$ (S16, S213). As a result of this, when a determination is made that the pseudo vehicle speed $V_{FF}$ is in a directly connecting four wheel drive condition inhibiting range, a directly connecting four wheel drive condition inhibiting signal $\mathbf{8}_N$ is sent out (S121), so that a front wheel side torque distribution instruction value $T_2$ is determined as a value preventing the directly connecting four wheel drive condition. Thereby, in a case where different diameter wheels are used, a deterioration of stability and an increase of load of power train system caused by the directly connecting four wheel drive condition can be prevented.

5 Claims, 22 Drawing Sheets

FOUR WHEEL DRIVE SYSTEM FOR AUTOMOTIVE VEHICLE

BACKGROUND OF THE INVENTION

1. Field of the Invention

The present invention generally relates to a four wheel drive system for an automotive vehicle, which either front wheels or rear wheels of the vehicle as main drive wheels while using remaining wheels as subsidiary drive wheels and which distributes a drive force supplied from an engine of the vehicle between the front and rear wheels. More specifically, the present invention relates to the four wheel drive system which is capable of changing of the drive force distribution for the front and rear wheels corresponding to the main and subsidiary drive wheels, in accordance with a drive mode selected manually by operation of a mode select lever or a mode select switch, or selected automatically based on a difference of rotating speed between the front and rear wheels.

2. Description of the Related Art

A part-time four wheel drive vehicle and a full-time four wheel drive vehicle are known as an automotive vehicle with such a four wheel drive system. The part-time four wheel drive vehicle enables a driver of the vehicle to select a drive mode between a two wheel drive mode and a directly connecting four wheel drive mode, by operation of a mode select lever or a mode select switch when either of the modes is required. On the other hand, the full-time four wheel drive vehicle automatically controls changing of the drive force distribution for the front and rear wheels corresponding to the main and subsidiary drive wheels.

In the part-time four wheel drive vehicle, when the two wheel drive mode is selected, the four wheel drive system makes the drive force distribution for the subsidiary drive wheels as 0% while making the drive force distribution for the main drive wheels as 100%, providing a two wheel drive condition. Also, when the directly connecting four wheel drive mode is selected due to, e.g. a rotating speed of the main drive wheels being faster than that of the subsidiary drive wheels, the four wheel drive system makes the drive force distribution for the subsidiary drive wheels as 50% while making the drive force distribution for the main drive wheels as 50%, providing a directly connecting four wheel drive condition in which the front and rear wheels are directly connected, so as to advance a fuel consumption ratio of the engine.

On the other hand, in the full-time four wheel drive vehicle, the four wheel drive system automatically changes the drive force distribution for the front and rear wheels corresponding to the main and subsidiary drive wheels in accordance with a difference of rotating speed between the front and rear wheels, so that the drive condition is continuously changed between the two wheel drive condition and the directly connecting four wheel drive condition.

Further known is a three mode four wheel drive vehicle which enables a driver of the vehicle to select an automatic four wheel drive mode except for the two wheel drive mode and the directly connecting four wheel drive mode, by operation of a mode select lever or a mode select lever switch. In the automatic four wheel drive mode, changing of the drive force distribution for the front and rear wheels is automatically controlled by the same way as the full-time four wheel drive vehicle.

As the four wheel drive system mounted on such a four wheel drive vehicle and capable of phased changing or continuous changing of the drive force distribution for the front and rear wheels corresponding to the main and subsidiary drive wheels, several kinds of systems are known. The known four wheel drive systems comprise, as a drive force distribution adjusting means, e.g., a variable torque clutch mechanism which is capable of controlling a variation of transmitting torque by controlling changing of fastening force, or a so-called limited-slip center differential gear mechanism which is capable of controlling a variation of transmitting torque by controlling a slip between front and rear drive shafts. The four wheel drive systems control the drive force distribution for the front and rear wheels by controlling the variation of transmitting torque by operations of such mechanisms.

As the variable torque clutch mechanism of the known four wheel drive system, a hydraulic control type clutch mechanism and an electro-magnetic control type clutch mechanism are mainly employed. The hydraulic control type variable torque clutch mechanism controls a fastening force by controlling changing of a friction force between clutch plates by controlling a hydraulic pressure fed to a clutch piston, so as to control the variation of transmitting torque. On the other hand, the electro-magnetic control type variable torque clutch mechanism controls a fastening force by controlling changing of a friction force between clutch plates by controlling an exiting current for a proportional electro-magnetic solenoid, so as to control the variation of transmitting torque.

In the aforementioned four wheel drive vehicles, a condition in which the main and subsidiary drive wheels can rotate at a different rotating speed may be changed to another condition in which the main and subsidiary drive wheels are directly connected and forced to rotate at a mutually same rotating speed, in accordance with selection of the directly connecting four wheel drive mode by a driver, or in accordance with an automatic changing to the directly connecting four wheel drive condition. For example, in the part-time four wheel drive vehicle, selection of the directly connecting four wheel drive mode for an advanced road-coverability results in changing of the drive condition from the two wheel drive condition to the directly connecting four wheel drive condition, also, in the full-time four wheel drive vehicle, when escaping from a mire, the drive condition is changed to the directly connecting four wheel drive condition by, e.g. the limited-slip center differential gear mechanism, However, in a situation that a diameter of at least one wheel is smaller than diameters of other wheels of the vehicle due to, e.g., an emergency wheel being used, it is required to avoid the directly connecting four wheel drive condition so as to enable the smaller diameter wheel to rotate faster than the other wheels. Because, when the vehicle becomes in the directly connecting four wheel drive condition in which the main and subsidiary drive wheels are directly connected and rotate at a mutually same speed under such a different diameter wheel using situation, a braking force acts relatively on the smaller diameter wheel to be rotated faster, due to a difference of circumferential speed of rotating wheel between the smaller diameter wheel and the other wheels, so that a cornering force of the smaller diameter wheel is varied in view of a friction circle, causing instability of running condition of the vehicle. Moreover, when the vehicle keeps running in the directly connecting four wheel drive condition under such a different diameter wheel using situation, a rotating speed difference between wheels following a backing movement of road surface and wheels driven by drive shafts is transmitted to the four wheel drive system, so that the four wheel drive power train system suffers an undesirable load.

Further, on, e.g., a snowy road, during running of the aforementioned four wheel drive vehicles in a drive condition except for the directly connecting four wheel drive condition, when the vehicle is stuck in mud, and the main drive wheels idly rotate while the subsidiary drive wheels stop rotating, the full-time four wheel drive vehicle and the three mode four wheel drive vehicle in the automatic four wheel drive mode automatically change the drive condition to the directly connecting four wheel drive condition, because of the large speed difference between the front and rear wheels. Thereby, on some cases, the vehicle can escape from the mud. On the other hand, in such a situation, the part-time four wheel drive vehicle in the two wheel drive mode may change the drive condition to the directly connecting four wheel drive condition, result from selection of the directly connecting four wheel drive mode due to manual operation of, e.g., a mode select switch by a driver, so as to escape from mud.

However, when the drive condition of tne vehicle is changed from the condition in which the main drive wheels idly rotating while the subsidiary drive wheels stopping rotating, to the directly connecting four wheel drive condition so as to escape from mud, the subsidiary drive wheels which stopped rotating become rotating as fast as the main drive wheels which idly rotating in high speed, so that, in some cases, a driver and/or a passenger feel uncomfortable, due to a shock caused by the rapid increase of a rotating speed of the subsidiary drive wheels.

In connection with the aforementioned four wheel drive vehicles, in case of the full-time four wheel drive vehicle and in case of the automatic four wheel drive mode being selected, the drive force distribution for the main and subsidiary drive wheels is determined in accordance with, e.g., a rotating speed difference between the front and rear wheels. On the other hand, in case of the directly connecting four wheel drive mode being selected, the drive force distribution for the main and subsidiary drive wheels is determined as e.g. 50%:50%, % further, in case of the two wheel drive mode being selected, the drive force distribution for the main and subsidiary drive wheels is determined as 100%:0%, then a control signal in accordance with the determined value is sent to the drive force distribution adjusting means of the corresponding four wheel drive system, so that a drive force supplied from the engine is distributed for the main and subsidiary drive wheels, in accordance with the control signal.

SUMMARY OF THE INVENTION

It is therefore an object of the present invention to provide an improved four wheel drive system for an automotive vehicle, which system is capable of overcoming the aforementioned problems of the known four wheel drive vehicles.

Briefly stated, the present invention provides a four wheel drive system for an automotive vehicle, which system comprises a drive force distribution adjusting means which uses either front wheels or rear wheels of the vehicle as main drive wheels while using remaining wheels as subsidiary drive wheels and which distributes a drive force supplied from an engine of the vehicle between the main and subsidiary drive wheels in accordance with a control signal, and a drive force distribution control means which determines a drive force distribution for the main and subsidiary drive wheels and which sends the control signal to the drive force distribution adjusting means in accordance with the determined drive force distribution.

In the four wheel drive system for an automotive vehicle according to the present invention, the drive force distribution control means includes a directly connecting four wheel drive condition inhibiting means which inhibits a drive condition from being a directly connecting four wheel drive condition in which the drive force distribution for the main and subsidiary drive wheels is 1:1, based an a difference of rotating speed between the main and subsidiary drive wheels.

With the four wheel drive system according to the present invention, in usual, the drive force distribution control means determines a drive force distribution for the main and subsidiary drive wheels in accordance with, e.g., a selected drive mode or a difference of rotating speed between the main and subsidiary drive wheels and sends a control signal to the drive force distribution adjusting means in accordance with the determined drive force distribution, than the drive force distribution adjusting means uses either front wheels or rear wheels of the vehicle as main drive wheels while using remaining wheels as subsidiary drive wheels and distributes a drive force supplied from the engine of the vehicle, between the main and subsidiary drive wheels, in accordance with the control signal.

Therefore, usually, in case of the full-time four wheel drive vehicle and in case of the automatic four wheel drive mode being selected, the drive force distribution for the main and subsidiary drive wheels is determined in accordance with a difference of rotating speed between the front and rear wheels, on the other hand in case of the directly connecting four wheel drive mode being selected, the drive force distribution for the main and subsidiary drive wheels is determined as, e.g. 50%:50%, and further in case of the two wheel drive mode being selected, the drive force distribution for the main and subsidiary drive wheels is determined as 100%:0%.

Further, with the four wheel drive system according to the present invention, when a difference of rotating speed between the main and subsidiary drive wheels becomes in a predetermined condition due to the aforementioned different diameter wheel using situation or the aforementioned stuck situation, even if the directly connecting four wheel drive mode is selected, or the drive force distribution for the main and subsidiary drive wheels is determined as 1:1 in accordance with a difference of rotating speed between the front and rear wheels in the full-time four wheel drive vehicle or in the automatic four wheel drive mode, the directly connecting four wheel drive condition inhibiting means inhibits a drive condition from being a directly connecting four wheel drive condition in which the drive force distribution for the main and subsidiary drive wheels is 1:1, therefore the drive force distribution for the main drive wheels becomes, e.g. greater than the distribution for the subsidiary drive wheels.

This enables the smaller diameter wheel to rotate faster than the other wheels. Further, this prevents the subsidiary drive wheels from suddenly becoming rotating in high speed as fast as the main wheels.

In a preferred embodiment of the present invention shown in FIG. 1, the four wheel drive system further comprises a drive node detecting means which detects an automatically or manually selected drive mode, and a different diameter wheel using situation detecting means which detects a different diameter wheel using situation when a difference of rotating speed between the front and rear wheels corresponding to the main and subsidiary drive wheels is kept greater than a predetermined value during a predetermined time, in which situation a diameter of at least one wheel of the vehicle is different from diameters of other wheels of the vehicle, and the drive force distribution control means determines a drive force distribution for the main and subsidiary drive wheels in accordance with at least a selected drive mode detected by the drive mode detecting means, while the drive force distribution control means includes a directly connecting four wheel drive condition inhibiting means which inhibits a drive condition from being a directly connecting four wheel drive condition in which the drive force distribution for the main and subsidiary drive wheels is 1:1, in accordance with the detection of the different diameter wheel using situation by the different diameter wheel using situation detecting means.

With the preferred embodiment of the present invention, in usual, the drive force distribution control means determines a drive force distribution for the main and subsidiary drive wheels in accordance with at least a selected drive mode detected by the drive mode detecting means, and sends a control signal to the drive force distribution adjusting means in accordance with the determined drive force distribution, then the drive force distribution adjusting means uses either front wheels or rear wheels of the vehicle as main drive wheels while using remaining wheels as subsidiary drive wheels and distributes a drive force supplied from the engine of the vehicle, between the main and subsidiary drive wheels, in accordance with the control signal.

Further, with the preferred embodiment of the present invention, when a difference of rotating speed between the front and rear wheels corresponding to the main and subsidiary drive wheels is kept greater than a predetermined value during a predetermined time due to the aforementioned different diameter wheel using situation, such a situation is detected by the different diameter wheel using situation detecting means, then the directly connecting four wheel drive condition inhibiting means inhibits a drive condition from becoming the directly connecting four wheel drive condition in accordance with the detection of the different diameter wheel using situation by the different diameter wheel using situation detecting means.

Thus, the smaller diameter wheel is enabled to rotate faster than the other wheels, so that stability of running condition of the vehicle can be secured, and the four wheel drive system can be prevented from suffering a undesirable load.

Furthermore, with the preferred embodiment of the present invention, even if a difference of rotating speed between the front and rear wheels become greater than a predetermined value for a short time due to cornering, braking or accelerating of the vehicle, a misdetection of the different diameter wheel using situation can be prevented, owing to the determination of passing of the predetermined time.

In a further preferred embodiment of the present invention shown in FIG. 2, the four wheel drive system further comprises a directly connecting four wheel drive condition detecting means which detects the directly connecting four wheel drive condition, while the drive force distribution control means further includes a drive force distribution changing means which changes the determined drive force distribution for the main and subsidiary drive wheels so that the drive force distribution for the main drive wheels becomes greater than the distribution for the subsidiary drive wheels when the directly connecting four wheel drive condition is detected by the directly connecting four wheel drive condition detecting means and which sends a control signal to the drive force distribution adjusting means in accordance with the changed determination, and the different diameter wheel using situation detecting means detects the different diameter wheel using situation after the drive force distribution has changed by the drive force distribution adjusting means in accordance with the control signal from the drive force distribution changing means.

With the preferred embodiment of the present invention, when the directly connecting four wheel drive condition is detected by the directly connecting four wheel drive condition detecting means, the drive force distribution changing means changes the determined drive force distribution for the main and subsidiary drive wheels and sends a control signal to the drive force distribution adjusting means in accordance with the changed determination, so that the drive force distribution for the main drive wheels becomes greater than the distribution for the subsidiary drive wheels, enabling the main and subsidiary drive wheels to rotate at a mutually different speed, then the different diameter wheel using situation detecting means detects the different diameter wheel using situation after the drive force distribution has changed.

Thus, when the vehicle is in the different diameter wheel using situation, even if the vehicle starts running under the directly connecting four wheel drive condition, the different diameter wheel using situation detecting means can detects the different diameter wheel using situation.

In another preferred embodiment of the present invention shown in FIG. 3, the four wheel drive system further comprises a drive mode detecting means which detects an automatically or manually selected drive mode, and a main and subsidiary drive wheel rotating condition detecting means which detects a rotating condition of the main and subsidiary drive wheels, and the drive force distribution control means determines a drive force distribution for the main and subsidiary drive wheels in accordance with at least a selected drive mode detected by the drive mode detecting means, while the drive force distribution control means includes a four wheel drive condition inhibiting means which determines the drive force distribution for the main and subsidiary drive wheels as 1:0 when the main and subsidiary drive wheel rotating condition detecting means detects a rotating condition in which the main drive wheels rotate while the subsidiary drive wheels stop rotating.

With the preferred embodiment of the present invention, when a rotating condition in which the main drive wheels rotate while the subsidiary drive wheels stop rotating is detected by the main and subsidiary drive wheel rotating condition detecting means, even if the drive force distribution for the main and subsidiary drive wheels is determined in accordance with a rotating speed difference between the front and rear wheels in the full-time four wheel drive vehicle or in the automatic four wheel drive mode, the four wheel drive condition inhibiting means which determines the drive force distribution for the main and subsidiary drive wheels as 1:0 to inhibit a drive condition from being a four wheel drive condition, then a control signal is sent from the drive force distribution control means to the the drive force distribution adjusting means in accordance with the determined drive force distribution.

Thus, when the main drive wheels idly rotate while the subsidiary drive wheels stop rotating due to the vehicle being stuck in mud in such a four wheel drive condition, the drive condition is automatically changed to the two wheel drive condition in which the drive force distribution for the main and subsidiary drive wheels is made as 1:0, therefore the subsidiary drive wheels are prevented from suddenly becoming rotating in high speed as fast as the main wheels, so that the situation in which a driver and/or a passenger feel uncomfortable due to a shock caused by the rapid increase of a rotating speed of the subsidiary drive wheels can be prevented.

Incidentally, when the vehicle is in the aforementioned two wheel drive condition, the vehicle can escape from the stuck condition by changing the drive condition to e.g. the directly connecting four wheel drive condition by once stopping the main drive wheels.

In another preferred embodiment of the present invention shown in FIG. 4, the four wheel drive system further comprises, instead of the drive mode detecting means and the main and subsidiary drive wheel rotating condition detecting means, a main drive wheel rotating speed detecting means which detect a rotating speed of the main drive wheels, and a subsidiary drive wheel rotating speed detecting means which detect a rotating speed of the subsidiary drive wheels, and the drive force distribution control means determines a drive force distribution for the main and subsidiary drive wheels in accordance with both rotating speed detected by the main drive wheel rotating speed detecting means and a subsidiary drive wheel rotating speed detecting means, while the drive force distribution control means includes a four wheel drive condition inhibiting means which determines the drive force distribution for the main and subsidiary drive wheels as 1:0 when the main drive wheel rotating speed detecting means detects rotating of the main drive wheels while the subsidiary drive wheel rotating speed detecting means detects stopping of the subsidiary drive wheels.

With the preferred embodiment of the present invention, in usual, the drive force distribution control means determines a drive force distribution for the main and subsidiary drive wheels in accordance with rotating speed of the main and subsidiary drive wheels detected by the main drive wheel rotating speed detecting means and the subsidiary drive wheel rotating speed detecting means, and sends a control signal to the drive force distribution adjusting means in accordance with the determined drive force distribution, then the drive force distribution adjusting means uses either front wheels or rear wheels of the vehicle as main drive wheels while using remaining wheels as subsidiary drive wheels and distributes a drive force supplied from the engine of the vehicle, between the main and subsidiary drive wheels, in accordance with the control signal.

Further, with the preferred embodiment of the present invention, when the main drive wheel rotating speed detecting means detects rotating of the main drive wheels while the subsidiary drive wheel rotating speed detecting means detects stopping of the subsidiary drive wheels, the four wheel drive condition inhibiting means determines the drive force distribution for the main and subsidiary drive wheels as 1:0 to inhibit a drive condition from being a four wheel drive condition, then a control signal is sent from the drive force distribution control means to the drive force distribution adjusting means in accordance with the determined drive force distribution.

Thus, when the main drive wheels idly rotate while the subsidiary drive wheels stop rotating due to the vehicle being stuck in mud in such a four wheel drive condition, the drive condition is automatically changed to the two wheel drive condition in which the drive force distribution for the main and subsidiary drive wheels is made as 1:0, as the above-mentioned embodiment, therefore the subsidiary drive wheels are prevented from suddenly becoming rotating in high speed as fast as the main wheels, so that the situation in which a driver and/or a passenger feel uncomfortable due to a shock caused by the rapid increase of a rotating speed of the subsidiary drive wheels can be prevented.

BRIEF DESCRIPTION OF THE DRAWING

The present invention will note be explained in more detail with reference to preferred embodiments shown in the attached drawings, in which:

FIG. 14 1s a graph of a characteristic curve exhibiting a relationship between a pseudo vehicle speed $\Delta V_{FF}$ and a threshold $\Delta V_{WO}$.

DETAILED EXPLANATION OF THE PREFERRED EMBODIMENTS

Figure 5:
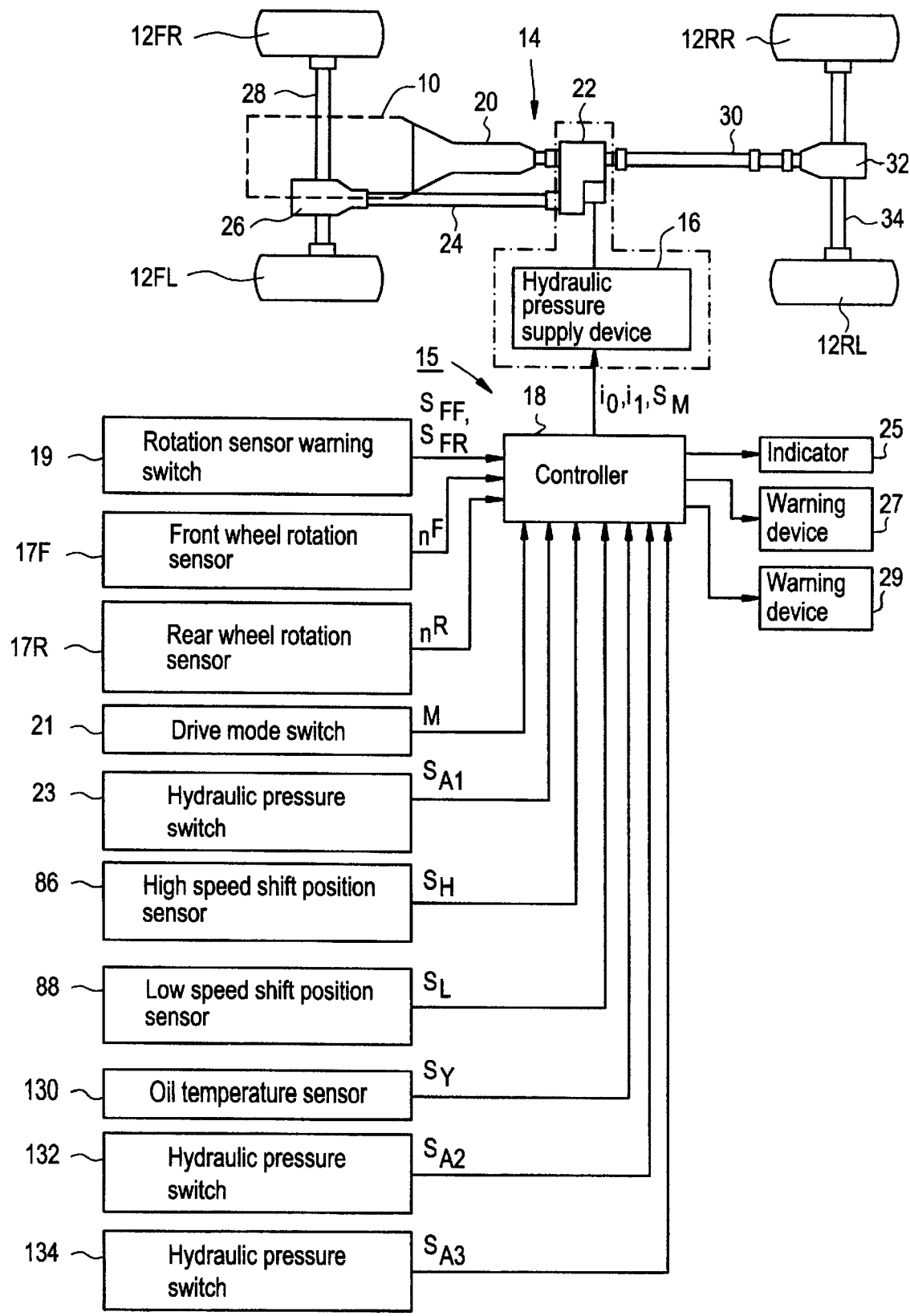
FIG. 5 is a schematic view illustrating the basic arrangement of transmission system of a vehicle according to a preferred embodiment of the present invention.

FIG. 5 shows a part-time four wheel drive system, for an automotive vehicle, based upon an FR (front-engine and rear-drive) system. The four wheel drive system enables a driver of the vehicle to select a drive mode by operation of a select switch (not-shown), among a two wheel drive mode in which a drive force distribution between main drive wheels (i.e. rear wheels) and subsidiary drive wheels (i.e. front wheels) is fixed as 100%:0%, an automatic four wheel drive mode in which a drive force distribution between the main drive wheels and the subsidiary drive wheels is automatically determined in accordance with a difference of rotating speed between the front and rear wheels, and a directly connecting four wheel drive mode in which a drive force distribution between the main drive wheels and the subsidiary drive wheels is fixed as 50%:50%. The four wheel drive system comprises a subsidiary speed change mechanism, and enables the driver to select a shift position of the subsidiary speed change mechanism by operation of a select lever (not-shown).

As shown in FIG. 5, the four wheel drive system incorporates an engine 10 as a rotary drive source, a drive force transmission system 14 which is capable of changing of the distribution ratio of drive force transmitted to front left to rear right wheels 12FL to 12RR, and a drive force distribution control device 15 for controlling the changing of the drive force distribution ratio by the transmission system 14.

The transmission system 14 comprises a speed change gear 20 for shifting the drive force from the engine 10 with a selected gear ratio, and a transfer 22 for distributing the drive farce from the speed change gear 20, between the front wheels 12FL, 12FR and the rear wheels 12RL, 12RR. In the transmission system 14, a front wheel side drive force into which the transfer 22 distributes the drive force, is transmitted to the front wheels 12FL, 12FR by way of a front wheel side output shaft 24, a front differential gear 26 and front side drive shafts 28. Meanwhile, a rear wheel side drive force is transmitted to the rear wheels 12RL, 12RR by way of a propeller shaft (rear wheel side output shaft) 30, a rear differential gear 32 and drive shafts 34. Therefore, in the four wheel drive system of the embodiment, the rear wheels 12AL, 12RR are the main drive wheels while the front wheels 12FL, 12FR are the subsidiary drive wheels as mentioned above. Incidentally, the speed change gear 20 may be a conventional automatic transmission.

Figure 6:
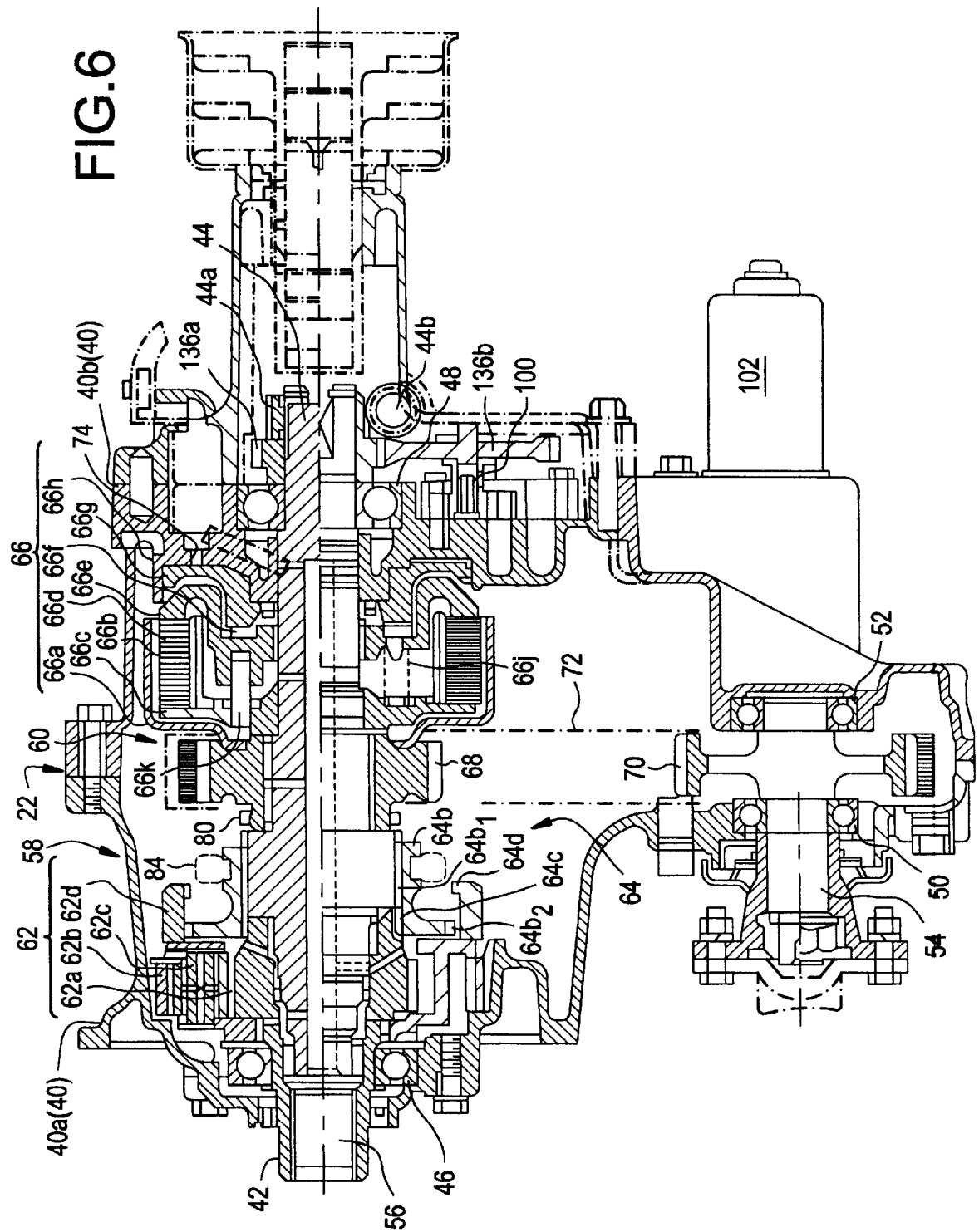
FIG. 6 is a view illustrating the interior structure of a transfer according to the present invention.

Referring to FIG. 6 which shows the interior structure of the transfer 22 having a transfer casing 40 in which an input shaft 42 and a first output shaft 44 are laid, being axially opposed to each other, the input shaft 42 is rotatably supported to a front casing section 40a of the transfer casing 40 by means of a radial bearing 46, while the first output shaft 44 is rotatably supported to a rear casing section 40b of the transfer casing 40 by means of a radial bearing 48, and accordingly, the shafts 42, 44 can be rotated, relative to each other. A second output shaft 54 is rotatably supported by means of bearings 50, 52 which are fitted respectively in the front and rear casing sections 40a, 40b, in parallel with the input shaft 42 and the first output shaft 44. It is noted that the input shaft 42 is coupled to an output shaft 56 of the speed change gear 20, the first output shaft 44 is coupled to the rear wheel side output shaft 30, and the second output shaft 54 is coupled to the front wheel side output shaft 24.

Further, the aforementioned subsidiary speed change mechanism 58 and a variable torque distribution mechanism (a two and four wheel drive change-over mechanism) 60 for changing a drive condition between a two wheel drive condition and a four wheel drive condition and for adjusting a transmitting torque, are provided to the input shaft 42 and the first-output shaft 44, respectively.

The subsidiary speed change mechanism 58 is composed of a planetary gear mechanism 62 and a meshing clutch type high and low speed change-over mechanism 64 which is laid, coaxial with this planetary gear mechanism 62.

The planetary gear mechanism 62 is composed of a sun gear 62 formed around the outer periphery of the input shaft 42, an internal gear 62b fixed in the front casing section 40a, pinion gears 62c meshed with the sun gear 62a and the internal gear 62b, and a pinion carrier 62d which rotatably supports the pinion gears 62c.

Further, the high and low speed change-over mechanism 64 is composed of a shift sleeve 64b which is axially slidable due to the spline-coupling between internal teeth $64b_1$ and a plurality of key grooves formed around an outer periphery of the first-output shaft 44 and which hag external tooth $64b_2$ formed around its outer periphery, a high speed shift gear 64c formed around an outer periphery of the input shaft shaft 42 and adapted to be meshed with the internal tooth $64b_1$ of the shift sleeve 64b, and a low speed shift gear 64d formed on the inner peripheral part of the pinion carrier 62d and adapted to be meshed with the external teeth $64b_2$ of the shift sleeve 64b.

Figure 7:
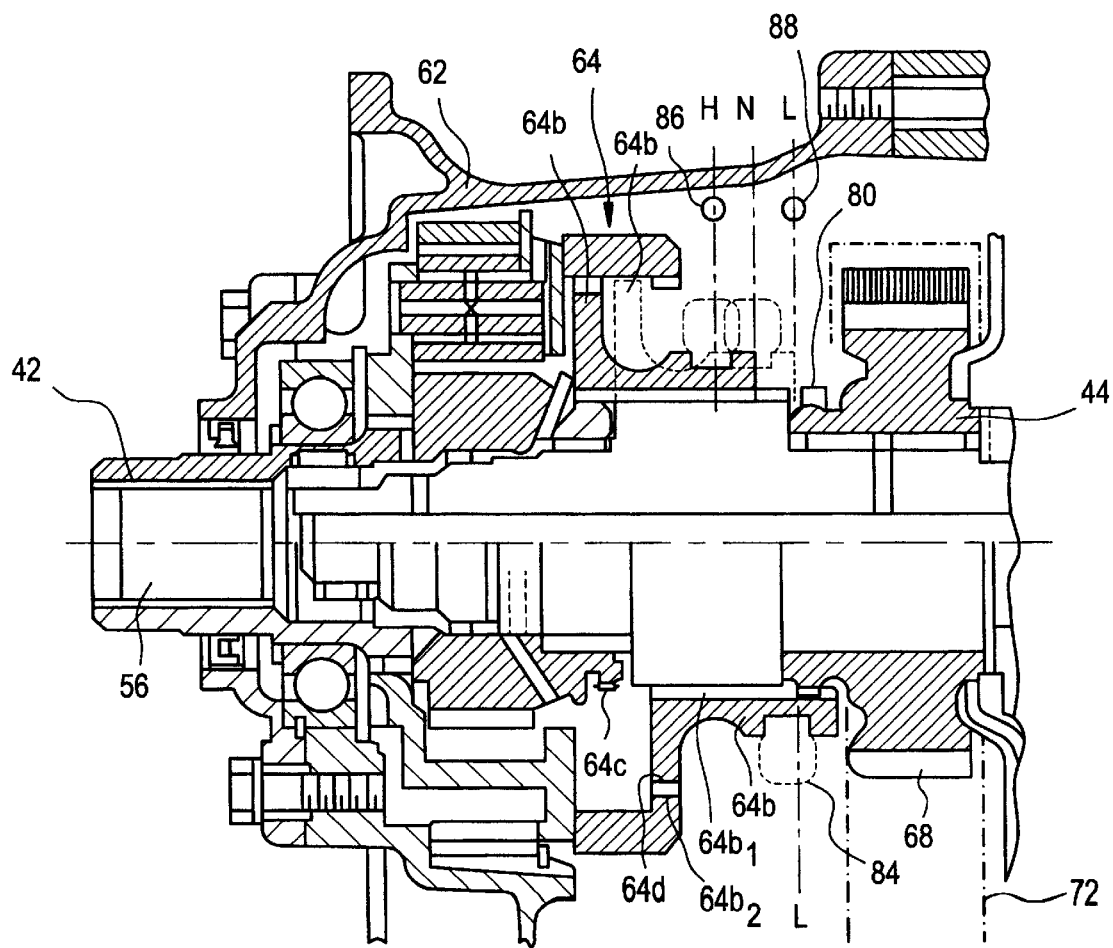
FIG. 7 in an enlarged view of a part relating to a high and low speed change-over mechanism in the transfer.

FIG. 7 shows an enlarged view of a part relating to the high and low speed change-over mechanism 64. In the high and low speed change-over mechanism 64, when the shift sleeve 64b is slid to a high speed shift position H as indicated by the real line shown in the upper half of FIG. 7, the high speed shift gear 64c is meshed with the internal teeth $64b_1$. On the other hand, when the shift sleeve 64b is slid to a low speed shift position L as shown in the lower half of FIG. 7, the low speed shift gear 64d is meshed with the external teeth $64b_2$. Further, when the shift sleeve 64b is slid to a neutral position N as indicated by the two-dot chain line shown in the upper half of FIG. 7, the internal teeth $64b_1$ and the external teeth $64b_2$ are not meshed with any of other gears in the high and low speed change-over mechanism 64.

Referring again FIG. 6, the variable torque distribution mechanism 60 is composed of a wet type multi-disc friction clutch (which will be hereinbelow denoted as "friction clutch" or "clutch" simply) 66 as a variable torque clutch for changing the distribution ratio of drive force between the front and rear wheels in accordance with supplied hydraulic pressure, a first sprocket 68 rotatably fitted on the first output shaft 44, a second sprocket 70 coupled coaxially with the second output shaft 54, and a chain 72 wound on and stretched between the first and second sprockets 68, 70.

The friction clutch 66 is composed of a clutch drum 66a coupled to the first sprocket 68, friction plates 66b spline-coupled to the clutch drum 66a, a clutch hub 66c spline-coupled with the outer periphery of the first input shaft 44, friction discs 66d integrally coupled with the clutch hub 66c and interposed between the clutch platen 66b, a rotary member 66e arranged around the outer periphery or the first output shaft 44 and adapted to be moved toward the clutch drum 66a so as to bring the friction plates 56b and the friction discs 66d into contact with one another, pins 66k integrally coupled to the clutch hub 66c so as to engage the clutch hub 66c with the rotary member 66e, a clutch piston 66g mounted to the internal wall of the rear casing section 40b and adapted to be axially moved, a thrust bearing 66f for transmitting the axial movement of the clutch piston 66g to the rotary member 66c, a cylinder chamber 66h defined between the inner walls of the clutch piston 66g and the rear casing section 40b, and a return spring 65j urging the rotary member 66e toward the clutch piston 66g.

In the friction clutch 66, when the clutch pressure $P_C$ is fed from a hydraulic pressure supply device 16 shown in FIG. 5 to an inlet port 74 formed in the rear casing section 40b and communicated with the cylinder chamber 66h, the clutch piston 66g is moved to the left in FIG. 6 by a pressing force generated in the cylinder chamber 66h, and accordingly, the movement of the clutch piston 66g is transmitted to the rotary member 66e through the thrust bearing 66f. Thus, the friction plates 66b and the friction dices 66d which have been separated from one another are brought into contact with one another since the friction discs 66d is moved, and accordingly, a fastening force in accordance with the clutch pressure $P_C$ is effected by the friction force therebetween. Therefore, the rotary drive force of the first output shaft 44 is transmitted to the second output shaft 54 through the first sprocket 68, the chain 72 and the second sprocket 70 at a predetermined torque distribution ratio in accordance with the fastening force of the friction clutch 66.

On the other hand, when the clutch pressure $P_C$ to be fed, is lowered so that the rotary member 66e and the clutch piston 66g is moved toward the right in FIG. 6 by the urging force of the return spring 66j, resulting in separation between the friction plates 66b and the friction discs 66d, no rotary drive force of the first output shaft 44 is transmitted to the second output shaft 54.

Further, a four wheel drive gear 80 is incorporated to the first sprocket 68 around the cuter periphery thereof beside the shift sleeve 64b. When the shift sleeve 64b is slid to the aforementioned low speed shift position L as shown in the lower half of FIG. 7, the four wheel drive gear 80 is meshed with the internal teeth $64b_1$, in addition to the meshing between the external teeth $64b_2$ and the low speed shift gear 64d. With this arrangement, the shift sleeve 64 and the four wheel drive gear 80 constitute a dog clutch for forcing the first output shaft 44 and the second output shaft 54 to be coupled with each other at the low speed shift position. That is, when the low speed shift position L is selected by the select lever, the vehicle becomes in the four wheel drive condition since a drive torque is inevitably distributed to the front wheels.

The shift sleeve 64b in the high and low speed change-over mechanism 64 of the meshing clutch type, is slid to the high speed shift position H, the neutral position N or the low speed shift position L through a fork (only the front end part 84 of the fork is shown in FIGS. 6, 7) by manual operation of the select lever of the subsidiary speed change mechanism 58. In this arrangement, a high speed shift position sensor 85 for detecting the shift sleeve 64b which has been slid to the high speed shift position H, and a low speed shift position sensor 88 for detecting the shift sleeve 64b which has been slid to the low speed shift position L are located in the front casing section 40a. The high speed shift position sensor 86 and the law speed shift position sensor 88 send respectively a detection signal $S_H$ and a detection signal $S_L$ to the controller 18 at any suitable time.

Figure 8:
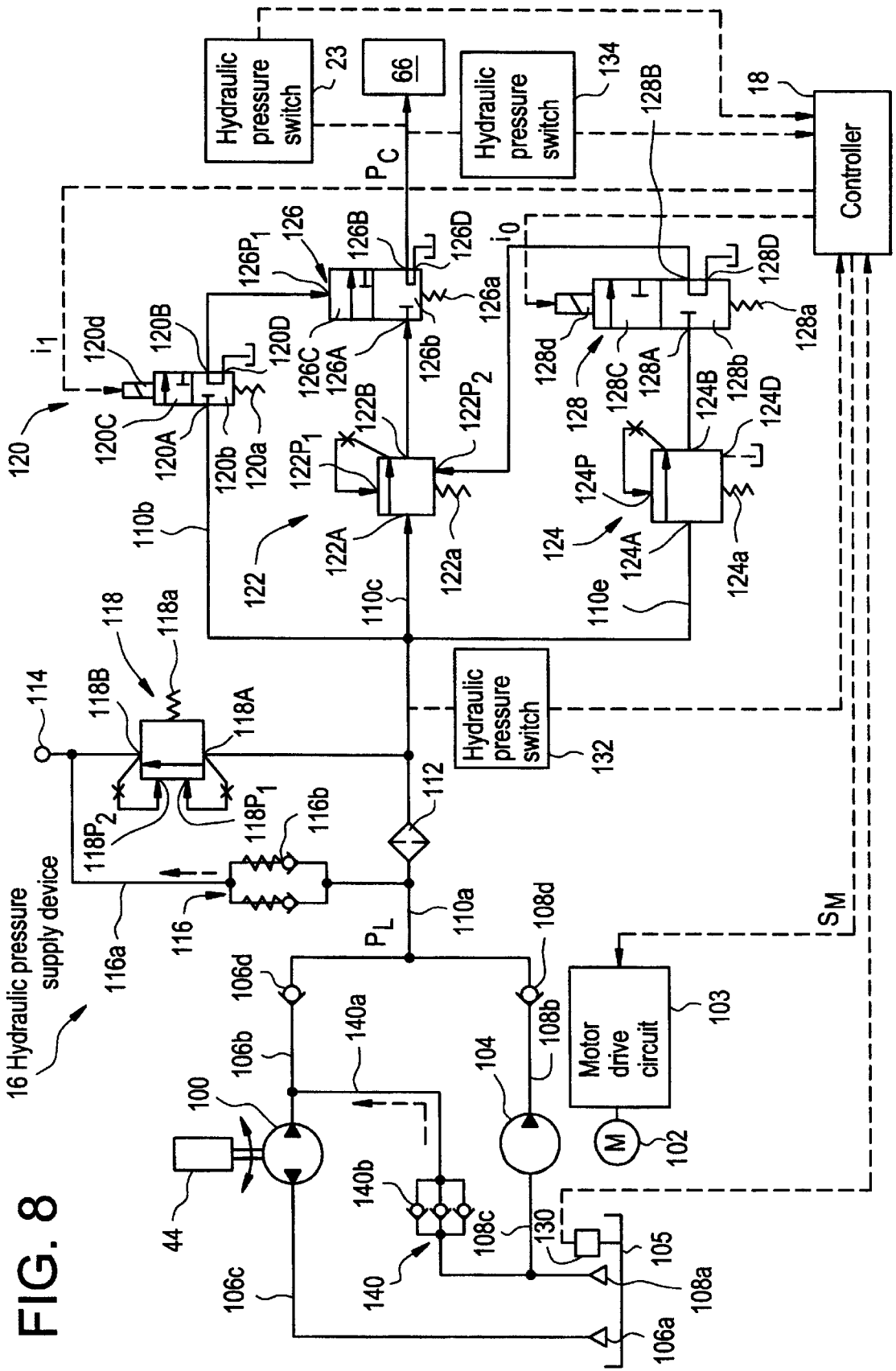
FIG. 8 is a block diagram illustrating a constitution of hydraulic circuit of a hydraulic pressure supply device in the vehicle transmission system.

FIG. 8 shows a black diagram illustrating a constitution of hydraulic circuit of the above-mentioned hydraulic pressure supply device 16 for controlling the operation of the friction clutch 66.

The hydraulic pressure supply device 16 includes, as hydraulic pressure sources, a reversible rotation type main pump directly coupled to the first output shaft 44 which, in turn, is coupled to the output shaft 56 of the speed change gear 20 through the input shaft 42, and a one-way rotation type subpump 104 connected in parallel with the main pump 100 and rotated by an electric motor 102 as a power source. The main pump 100 and the subpump 104 suck up hydraulic oil from an oil tank 105 through strainers 106a, 108a, and delivers the same into discharge lines 106b, 108b. A manifold line 11a to which the discharge lines 106b, 108b converge, is connected with an oil filter element 112 which, in turn, is connected at the upstream side thereof (the main pump 100 and the subpump 104 side) with one end of a relief passage 116 connected at the other end thereof to a lubrication system 114.

The oil filter element 112 is also connected on the downstream side thereof (the transfer 22 side) with a line pressure regulating valve 118, and lines 110b, 110c, 110e branching off from the manifold line 110a are connected with the inlet sides of a solenoid selector valve 120, a clutch pressure regulating valve 122 and a pressure reducing valve 124, respectively. The clutch pressure regulating valve 122 is connected on the outlet side thereof with the inlet side of a pilot selector valve 126 for feeding the clutch pressure $P_C$ to the friction clutch 65 of the transfer 22 when a pilot pressure is fed thereto from the solenoid selector valve 120, and the pressure reducing valve 124 is connected on the outlet side thereof with the inlet side of a duty control solenoid valve 128.

It is noted that a temperature sensor 130 for detecting a temperature of hydraulic oil is located in the oil tank 105, and further, a hydraulic pressure switch 132 which sands a predetermined pressure detection signal $S_{A2}$ when a pressure to which the line pressure regulating valve 118 decreases the line pressure is detected as a pressure equal to or over a predetermined value $A_2$, and a hydraulic pressure switch 134 which sends a predetermined pressure detection signal $S_{A3}$ when the clutch pressure $P_C$ delivered from the pilot selector valve 126 is detected as a pressure equal to or over a predetermined value $A_3$, are also provided, these seneor and switches sending their detection signals to the controller 18.

Incidentally, the hydraulic pressure supply device 16 is located in the transfer 22 in the case of an actual vehicle, the main pump 100 for sucking up hydraulic oil from the oil tank 105 is coupled to the first output shaft 44 through a first gear 136a and a second gear 136b as shown in FIG. 6, and the subpump 104 is coupled to the electric motor 102 externally attached to the transfer casing 40.

Next, detailed description will be made about constitutions and actions of the components of the hydraulic pressure supply device 16, with reference mainly to FIG. 8.

The main pump 100 on normal rotation sucks up hydraulic oil from the oil tank 105 through the strainer 106a connected to one end of a suction line 106c, and the subpump 104 also sucks up hydraulic oil from the oil tank 105 through the strainer 108a connected to one end of a suction line 108c. Further, check valves 106d, 108d are connected in the pump discharge lines 106b, 108b connected to the manifold line 110a, respectively, and a bypass passage 140 is connected between the discharge line 106b of the main pump 100 and the suction line 108c of the subpump 104. The bypass passage 140 is composed of a bypass line 140a and a triple-check valve 140b interposed in the bypass line 140a. The check valve 140b is opened when a pressure in the discharge line 106b becomes negative due to counter rotation of the main pump 100, thus a communication passage through which hydraulic oil flows in the arrow indicated by the broken line is established.

A relief passage 116 connected to the manifold line 110a at upstream side of the oil filter element 112, is composed of a relief line 116a connected at the other end to the lubrication system 114, and a spring-loaded twin-check valve 116b interposed in the relief line 116a. If a filter in the oil filter element 112 clogs, so that the pressure at upstream side of the oil element 112 exceeds a predetermined pressure, the check valve 116b opens so as to establish a communication passage through which hydraulic oil flows in the arrow indicated by the broken line.

The line pressure regulating valve 118 consists of an internal pilot and spring-operated type pressure reducing valve, including a spool slidably fitted in a cylindrical valve housing having an inlet port 118A connected to the manifold line 110a, an outlet port 118B connected to the lubrication system 114, and internal pilot ports $118_{P1}$, $118_{P2}$ to which primary and secondary pressures are fed from the inlet and outlet ports 118A, 118b through fixed restrictors, the spool being urged toward one and side of the valve housing by a return spring 118a.

A supply pressure $P_L$ raised by the main pump 100 or the subpump 104 is regulated to a predetermined pressure by the line pressure regulating valve 118, and then is fed to the solenoid selector valve 120, the clutch pressure regulating valve 122 and the pressure reducing valve 124. It is noted that hydraulic oil which is discharged from the output port 118B when the pressure $P_L$ is reduced to the predetermined pressure, is returned to the lubrication system 114.

The clutch pressure regulating valve 122 consists of an internal and external pilot and spring-operated type pressure regulating valve, including a spool slidably fitted in a cylindrical valve housing having an inlet port 122A connected to the line 110c, an outlet port 122B connected to the pilot selector valve 126, an internal pilot port $122_{P1}$ to which secondary pressure is fed as a pilot pressure from the outlet port 122B through a fixed restrictor, and an external pilot port $122_{P2}$ to which a control pressure is fed from the duty control solenoid valve 128, the spool being urged toward one end side of the valve housing by a return spring 122a. The clutch pressure regulating valve 122 does not feed a secondary pressure since a communication passage between the inlet port 122A and the outlet port 122B is blocked, when no pilot control pressure is fed from the duty control solenoid valve 128. On the other hand, when the pilot control pressure is fed from the duty control solenoid valve 128, the spool is moved under control, so that a secondary pressure in accordance with the pilot control pressure, is fed as the clutch pressure $P_C$ from the outlet port 122a.

The pressure reducing valve 124 consists of an internal pilot and spring-operated type and constant secondary pressure type pressure reducing valve, including a spool slidably fitted in a cylindrical valve housing having an inlet port 124A connected to the line 110e, an outlet port 124B connected to the duty control solenoid valve 128, an internal pilot port 124P to which a secondary pressure is fed, as a pilot control pressure, through a fixed restrictor from the outlet port 124B, and a drain part 124D, the spool being urged to one end side of the valve housing by a return spring 124a. when the spool is moved under control to a predetermined position by the pilot control pressure fed to the internal pilot port 124P, a primary pressure fed from the inlet port 124A is fed, as a control pressure reduced and regulated to a predetermined pressure, to the duty control solenoid valve 128.

The duty control solenoid valve 128 is of a three port and two position type, having an inlet port 128A connected to the pressure reducing valve 124, and a drain port 128D connected to a drain, an outlet port 128B connected to the external pilot part $122_{P2}$ of the clutch pressure regulating valve 122, a return spring 128a, and a spool located in the valve. The spool is moved under control between a normal position 128b where the outlet port 128B is communicated to the drain port 128D, and an operating position 128c where the inlet port 128A is communicated with the outlet port 128B. In the duty control solenoid valve 128, when the controller 18 supplies an exciting current $i_0$ having a required duty ratio to a solenoid 128d, the spool is moved under control from the normal position 128b to the operating position 128c, overcoming the return spring 128a during a period in which the exciting current $i_0$ is supplied, thereby the pilot control pressure in accordance with the duty ratio is fed to the clutch pressure regulating valve 122. Accordingly, the clutch pressure regulating valve 122 feeds the clutch pressure $P_C$ in accordance with a pilot control pressure which is fed to the external pilot port $122_{P2}$ from the duty control solenoid valve 128, and as a result, the clutch fastening force of the friction clutch 66 is controlled so as to distribute a drive torque to the front wheels in accordance with the clutch pressure $P_C$.

The spring off-set type solenoid selector valve 120 is of a three port and two position type, having an inlet port 120A to which the line pressure is fed, an outlet port 120B connected to the external pilot port $126_{P1}$ of the pilot selector valve 126, a drain pot 120D connected to a drain, and a spool located in the valve. The spool is moved under control between a normal position 120b where the inlet port 120A is blocked while the outlet port 120B is communicated with the drain port 120D, and an operating position 120c where the inlet port 120A is communicated with the outlet port 120B while the drain port 120D is blocked. In the solenoid selector valve 120, when the controller 18 supplies an exciting current $i_1$ to a solenoid 120d, the spool is moved under control to the operating position 120c, overcoming the return spring 120a during a pariod in which the exciting current $i_1$ is supplied, thereby a pilot control pressure is fed to the external pilot port $126_{P1}$ of the pilot selector valve 126. On the other hand, when the exciting current $i_1$ from the controller 18 is turned off, the spool is returned to the normal position 120b by the urging force of the return spring 120a, thereby the pilot control pressure having been fed to the external pilot port $126_{P1}$ is exhausted through the drain port 120D.

Figure 9:
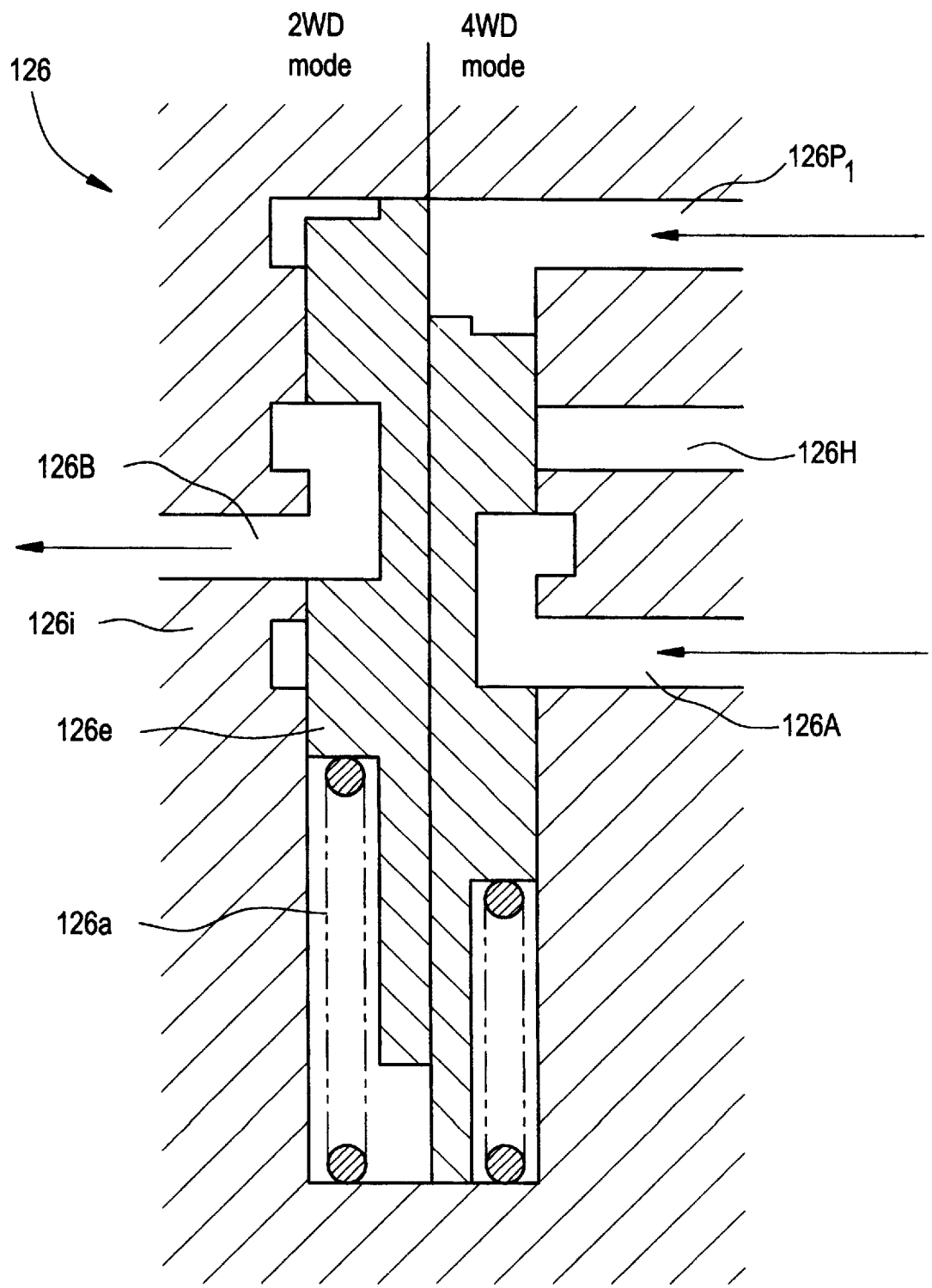
FIG. 9 is a sectional view of a pilot selector valve in the hydraulic circuit, illustrating a difference of operating conditions in the two wheel drive mode and the automatic four wheel drive mode.

FIG. 9 shows a difference of operating conditions of the pilot selector valve 126 in the two wheel drive mode and the automatic four wheel drive mode. As shown in FIG. 9, the pilot selector valve 126 includes a spool 126e which is slidably fitted in a cylindrical valve housing 126i having an inlet port 126A to which the secondary pressure is fed from the clutch pressure regulating valve 122, an outlet port 126B from which the secondary pressure is fed to the friction clutch 66 of the transfer 22, an external pilot port $126_{P1}$ to which a control pressure is fed when the solenoid 120 of the solonoid selector valve 120 is energized, and a drain port 126D connected to a drain, the spool being urged to one end side of the valve housing by a return spring 126a. It is noted that the control pressure fed from the external pilot port 126$_{P1}$ is fed opposite to the urging force of the return spring 126a.

The spool 126e in the pilot selector valve 126 is moved under control to a two wheel drive mode (2WD mode) position where the inlet port 126A and the outlet port 126B are blocked while the outlet port 126B is communicated with the drain port 126D as shown in the cross-sectional view in the left half of FIG. 9 when no pilot control pressure is fed to the external pilot port 126$_{P1}$. On the other hand, when a solenoid 120d of the solenoid selector valve 120 is energized (turned on) so that the spool of the solenoid selector valve 120 is moved under control to the operating position 120c where the pilot control pressure is fed to the external pilot port 126$_{P1}$, the spool 126e is moved to a four wheel drive (4WD) mode position where the inlet port 126A is communicated with the outlet port 126B as shown in the cross-sectional view in the right half of FIG. 9.

Thus, by driving the pilot selector valve 126 with the pilot control pressure from the solenoid selector valve 120, the spool 126e can be driven by a high pilot control pressure, and accordingly, it is possible to ensure the slide movement of the spool 126e even though a slide resistance to the spool 125e is high due to dust, chips or the like sticking to a slide passage far the spool 126e in the valve housing 126i.

Figure 10:
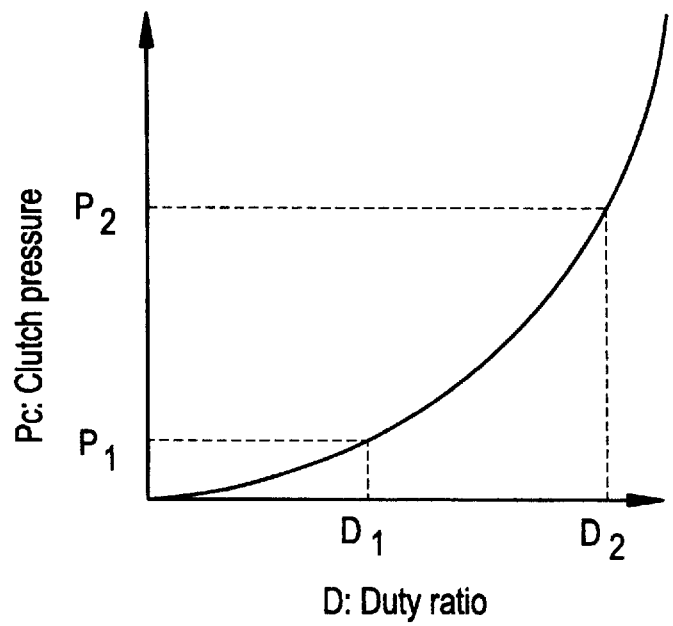
FIG. 10 is a graph of a characteristic curve exhibiting a relationship between a duty ratio D of exciting current supplied to a duty control solenoid valve and a clutch pressure PC in the hydraulic pressure supply device.

FIG. 10 shows a characteristic curve exhibiting a relationship between the duty ratio D of the exciting current $i_0$ supplied to the solenoid 128d of the duty control solenoid valve 128 and the supply pressure corresponding to the clutch pressure $P_C$ in the hydraulic pressure supply device 16. As shown in FIG. 10, the clutch pressure $P_C$ which increases parabolically in accordance with an increase in the duty ratio D is fed from the pilot selector valve 126 to the friction clutch 66. Thereby, a predetermined friction force is generated between the friction plates 66b and the friction disks 66d in accordance with the clutch pressure $P_C$ fed from the hydraulic pressure supply device 16 to the friction clutch 66, so that the drive torque is distributed for and transmitted to the front wheels and the rear wheels, in accordance with a fastening force caused by the generated friction force.

Figure 11:
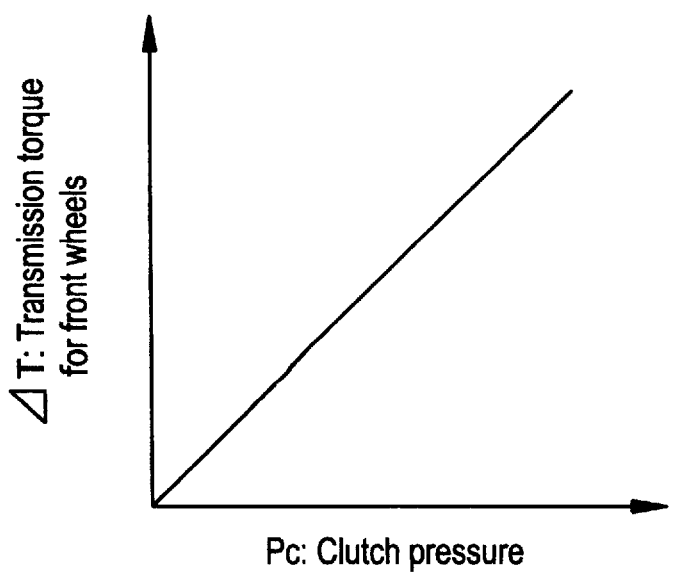
FIG. 11 is a graph of a characteristic curve exhibiting a relationship between a clutch pressure PC fed to a friction clutch in the transfer and a transmission torque $\Delta T$ transmitted to front wheels of the vehicle.

FIG. 11 shows a characteristic curve exhibiting a relationship between the clutch pressure $P_C$ fed to the friction clutch 66 and the transmission torque $\Delta T$ transmitted to the front wheels. As shown in FIG. 11, the transmission torque $\Delta T$ increases linearly as the supply pressure corresponding to the clutch pressure $P_C$ increases. That is, in the transfer 22, the distribution ratio of the drive torque between the front wheels and the rear wheels can be continuously varied in accordance with the duty ratio D of the exciting current $i_0$ from 0:100 to 50:50. In concrete expression, the distribution ratio becomes 0%:100% when the clutch pressure $P_C$ is fed with duty ratio $D_1$, while the distribution ratio becomes 50%:50% when the clutch pressure $P_C$ is fed with duty ratio $D_2$. It is noted that when the duty ratio D is below the duty ratio $D_1$, no drive force is transmitted to the front wheels despite the friction plates 66b and the friction disks 66d of the friction clutch 66 being in contact with each other.

Returning now to FIG. 5, the aforementioned drive force distribution control device 15 includes a front wheel rotation sensor 17F, a rear wheel rotation sensor 17R, a rotation sensor warning switch 19 which sends failure detecting signals $S_{FF}$, $S_{FR}$ as warning signals when the rotation sensors 17F, 17R fail their operation, a drive mode switch 21 for detecting a drive mode selected by the select switch, a hydraulic pressure switch 23 which sends a predetermined pressure detection signal $S_{A1}$ when a pressure to which the line pressure regulating valve 118 decreases the line pressure is detected as a pressure equal to or over a predetermined value $A_1$ to provide the directly connected four wheel drive condition, the aforementioned high speed shift position sensor 86 and low speed shift position sensor 88, and a controller 18 which supplies the above-mentioned exciting current $i_0$, $i_1$ for the hydraulic pressure supply device 16.

The controller 18 in this embodiment further controls the hydraulic pressure supply device 16 to enable the hydraulic pressure supply device 16 to hold the hydraulic pressures to ba predetermined hydraulic pressures. For this control, the controller 18 includes the oil temperature sensor 130 and the hydraulic pressure switches 132, 134 required for the control, and sends a motor control signal $S_M$ to the hydraulic pressure supply device 16 based on the pressure detection signals from the sensor and switches.

Further, as shown in FIG. 5, the four wheel drive system of this embodiment comprises an indicator 25 for indicating the current driving condition which is provided by mode selection with the select switch or control operation of the system, a warning device 27 for warning with on-off of a lamp and/or sound that the four wheel drive system is inhibiting the directly connecting four wheel drive condition, and a warning device 29 for warning to the driver with on-off of a lamp and/or sound that the hydraulic pressure supply device 16 cannot hold the hydraulic pressures to be predetermined hydraulic pressures, based on the pressure detection signals from the oil temperature sensor 130 and the hydraulic pressure switches 132, 134.

The front wheel side output shaft 24 and the rear wheel side output shaft 30 are provided respectively at predetermined positions beside these output shafts with the front wheel rotation sensor 17F and the rear wheel rotation sensor 17R which detect a rotating speed of the corresponding output shaft respectively by way of optical detection or magnetic detection and send a front wheel rotation detection value nF and a rear wheel rotation detection value nR as a circumferential speed, i.e. a rotating speed of the corresponding wheels to the controller 18 individually with a pulse signal or a sine curve signal in accordance with the rotating speed. As the front and rear wheel rotation sensors 17F, 17R, for example, a rotation sensor which is mentioned in a prior Japanese patent application filed by the present applicant and laid-open No. 01-195126 in Japan, can be utilized.

The drive mode switch 21 for detecting a drive mode M selected by the select switch, sends a signal indicating a drive mode detection value M=2 when the two wheel drive mode is selected, a signal indicating a drive mode detection value M=AUTO4 when the automatic four wheel drive mode is selected, and a signal indicating a drive mode detection value M=LOCK4 when the directly connecting four wheel drive mode is selected.

Figure 12:
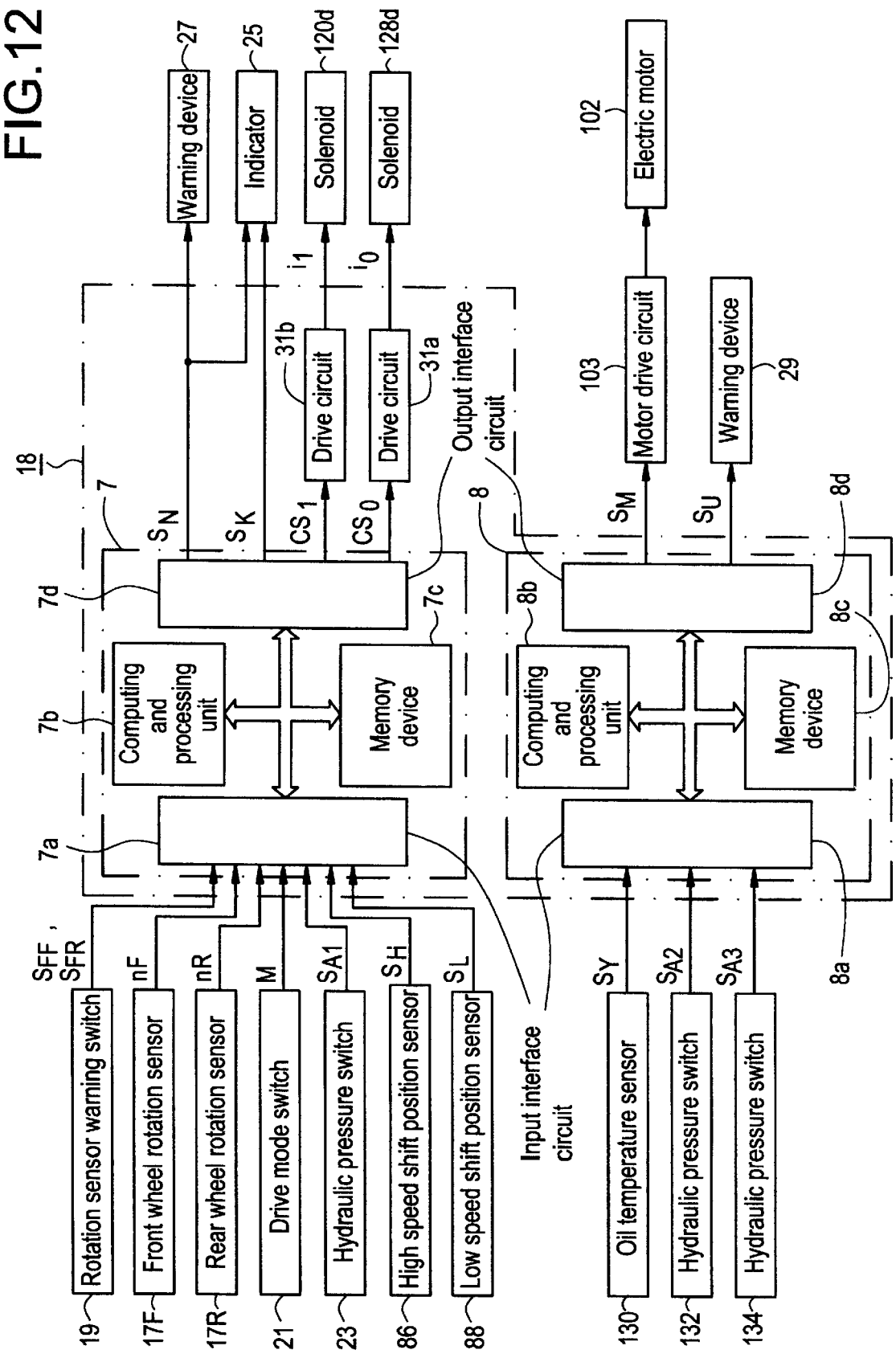
FIG. 12 is a block diagram illustrating a detailed constitution of a controller in the vehicle transmission system.

FIG. 12 shows details of the controller 18. As shown in FIG. 12, the controller 18 is composed of a microcomputer 7 for processing the control of distribution of drive force, a microcomputer 8 for processing the control of drive of the motor 102 for holding the predetermined hydraulic pressures, a drive circuit 31a for supplying an exciting current $i_0$ having a predetermined ratio D to the solenoid 128d of the duty control solenoid valve 128 in the hydraulic pressure device 16 in accordance with a control signal $CS_0$ from the microcomputer 7, a drive circuit 31b for supplying an exciting signal $i_1$ which is turned on and off in accordance with a control signal $CS_1$ from the microcomputer 7, to the solenoid 120d of the solenoid selector valve 120 in the hydraulic pressure supply device 16, and a motor drive circuit 103 for controlling a speed of tne electric motor 102 in the hydraulic pressure device 16 to a speed in accordance with a motor control signal $S_M$ from the microcomputer 8 by means of chopper control.

The microcomputer 7 is composed of an input interface circuit 7a having an A-D converting function for reading detection signals, as detection values, from the sensors 19, 17F, 17R, 21, 23, 86 and 88, a computing and processing unit 7b for performing predetermined computation and process for the control of distribution of drive force in accordance with a given program, a memory device 7c including ROM, RAM and the like, and an output interface circuit 7d having D-A converting function for sending a front wheel side torque distribution instruction value $T_2$ obtained by the computing and processing unit 7b, as a control signal $CS_0$ for achieving a clutch pressure $P_C$ in accordance with the front wheel aide torque distribution instruction value $T_2$, and a control signal $CS_1$ for determining whether the clutch pressure $P_C$ is supplied or not. That is, the clutch pressure $P_C$ is supplied in case of that the front wheel side torque distribution instruction value $T_2$ obtained by the computing and processing unit 7b is not "0", on the other hand, the clutch pressure $P_C$ is not supplied in case of that the front wheel side torque distribution instruction value $T_2$ obtained by the computing and processing unit 7b is "0" or the front wheel side torque distribution instruction value $T_2$ is not supplied.

In the memory device 7c, a table corresponding to the characteristic curve exhibiting a relationship between the duty ratio D of the exciting current $i_0$ supplied to the solenoid 128d of the duty control solenoid valve 128 and the supply pressure for the friction clutch 66 corresponding to the clutch pressure $P_C$ shown in FIG. 10, and a table corresponding to the characteristic curve exhibiting a relationship between the clutch pressure $P_C$ fed to the traction clutch 66 and the transmission torque $\Delta T$ transmitted to the front wheels shown in FIG. 11 are memorized as fixed data. By the output interface circuit 7d utilizing the tables in the memory device 7c, the front wheel side torque distribution instruction value $T_2$ obtained by the computing and processing unit 7b is transformed to the front wheel side transmission torque $\Delta T$, the front wheel side transmission torque $\Delta T$ is transformed to the clutch pressure $P_C$ based on the characteristic curve in FIG. 11, the clutch pressure $P_C$ is transformed to the duty ratio D, end then the control signal $CS_0$ indicating the duty ratio D is sent to the drive circuit 31a.

On the other hand, the microcomputer 8 is composed of an input interface 8a having an A-D converting function for reading detection signals as detection values from the sensor 130 and the switches 132, 134, a computing and processing unit 8b, a memory device 8c including ROM, RAM and the like an output interface circuit 8d having a D-A converting function for sending a motor speed instruction value obtained by the computing and processing unit 8b, as, for example, an analog voltage signal $S_M$.

Further, the microcomputer 7 determines a front wheel aide torque distribution instruction value $T_2$ in accordance with computation and process shown in FIGS. 16, 17 and explained below, based on the failure detection signals $S_{FF}$, $S_{FR}$ from the rotation sensor warning switch 19, the front wheel rotation detection value nF from the front wheel rotation sensor 17F, the rear wheel rotation detection value nR from the rear wheel rotation sensor 17R, the drive mode detection value M (2, AUTO4, or LOCK4) from the drive mode switch 21, the detection signal $S_{A1}$ from the hydraulic pressure switch 23, the high speed shift position detection signal $S_H$ from the high speed position sensor 88, and the low speed shift position detection signal $S_L$ from the low speed shift position sensor 88, then sends the control signals $CS_0$, $CS_1$ in accordance with the determined front wheel torque distribution instruction value $T_2$, to the drive circuits 31a, 31b. In addition to this, the microcomputer 7 sends a directly connecting four wheel drive condition inhabiting signal $S_N$ to the warning device 27, while sending a driving condition signal $S_K$ indicating the present driving condition to the indicator 25, in accordance with the above-mentioned computation and process.

The drive circuit 31a includes, for example, a pulse width modulation circuit for supplying an exciting current $i_0$ having a duty ratio D corresponding to the instruction value of the control signal $CS_0$ which is an analog voltage signal sent from the microcomputer 7, to the solenoid 128d of the duty control solenoid valve 128.

The drive circuit 31b converts the control signal $CS_1$ sent from the microcomputer 7 into an exciting current $i_1$ having a current value $I_K$ which can excite the solenoid 120d of the solenoid valve 120, and supplies the exciting current $i_1$ to the solenoid 120d.

The computing process carried out by the microcomputer 8 in the controller 18 of the embodiment, that is, the control for enabling the hydraulic pressure supply device 15 to feed a predetermined hydraulic pressure is as follows. When the hydraulic pressure switch 132 detects such a condition that the line pressure $P_L$ downstream of the oil element 112 in the manifold pipe 110 is lower than a predetermined value, the control signal $S_M$ indicating a rotational speed instruction value determined in accordance with an oil temperature detection value $S_Y$ from the oil temperature sensor 130, is computed by a computing process which is not shown, in order to control the discharge pressure (oil volume) from the subpump 104, and is then sent to the motor drive circuit 103 for controlling the rotating speed of the electric motor 102 to maintain the line pressure $P_L$ fed by the hydraulic pressure device 16 at a predetermined pressure.

In connection to the above-mentioned control, for example, when the detection signal $S_{A2}$ indicating that the line pressure $P_L$ becomes equal to or over the predetermined value $A_2$ is not sent from the hydraulic pressure switch 132, or the detection signal $S_{A3}$ indicating that the line pressure $P_L$ becomes equal to or over the predetermined value $A_3$ is not sent from the hydraulic pressure switch 134, the microcomputer 8 carries out a control to increase the discharge pressure (oil volume) from the subpump 104 by increasing the rotating speed of the electric motor 102 with the control pulse signal $S_M$, then if the detection signals $S_{A2}$, $S_{A3}$ are not sent from the hydraulic pressure switches 132, 134 despite of such a control during a predetermined period, the hydraulic pressure supply device 16 is determined to be abnormal, so that an abnormal detection signal $S_U$ is sent to the warning device 29 for warning to the driver with on-off of a lamp and/or sound.

Next, a basic principle or the computing process carried out by the microcomputer 7 in the controller 18 of the embodiment, that is, the control for distribution of driving force is explained below.

In this embodiment, in usual, the four wheel drive system allows a driver of the vehicle to select a drive mode by operation of the select switch among the two wheel drive mode, the automatic four wheel drive mode and the directly connecting four wheel drive mode. In the two wheel drive mode, a drive force distribution between the rear and front wheels is fixed as the rear wheels:the front wheels= 100%:0%, while in the automatic four wheel drive mode, a drive force distribution between the rear and front wheels is automatically determined in accordance with a difference of rotating speed between the rear and front wheels, and further in the directly connecting four wheel drive mode, a drive force distribution between the rear and front wheels is fixed as the rear wheels:the front wheels 50%:50%.

In more detail, when the automatic four wheel drive mode is selected, a difference $\Delta V_W$ of rotating speed between the rear and front wheels is computed by subtracting a mean front wheel speed (the front wheel rotation detection value nF) obtained from a mean rotating speed of the front wheels 12FL, 12FR as the subsidiary drive wheels, from a mean rear wheel speed (the rear wheel rotation detection value nR) obtained from a mean rotating speed of the rear wheels 12RL, 12RR as the main drive wheels, based on the following equation (1).

$$\Delta V_W = nR - nF \tag{1}$$

Figure 13:
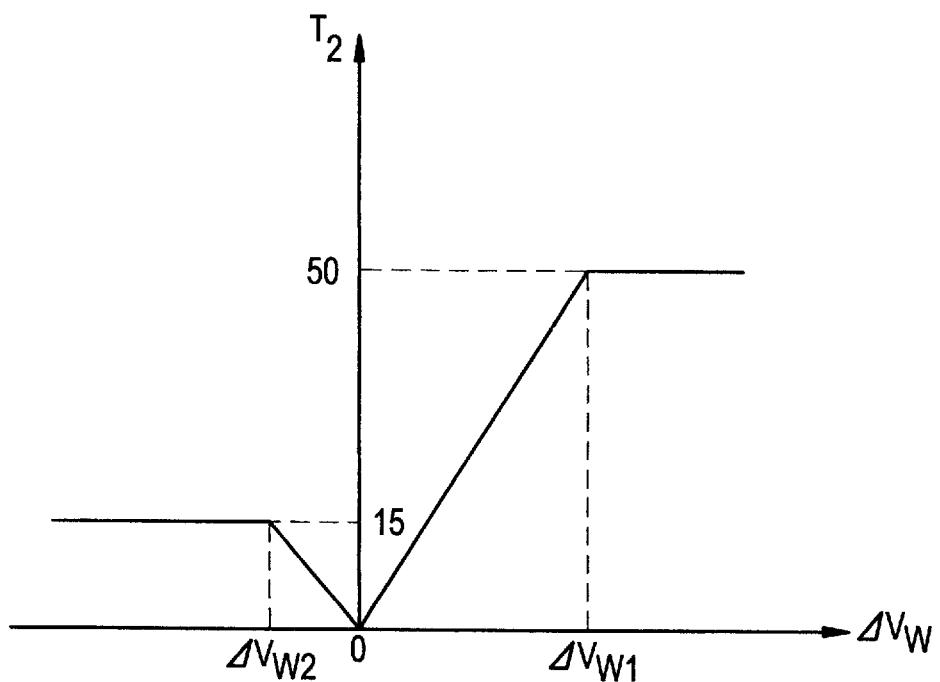
FIG. 13 is a graph of a characteristic curve exhibiting a relationship between a difference $\Delta V_W$ of rotating speed of front and rear wheels of the vehicle and a front wheel torque distribution instruction value $T_2$.

Normally, for the purpose of coexistence of a driving performance of a four wheel drive vehicle with a cornering performance of a rear wheel drive vehicle and for the purpose of an advanced handling stability of the vehicle, as shown in FIG. 13, the front wheel torque distribution instruction value $T_2$ is determined as "50" when the difference $\Delta V_W$ of rotating speed between the rear and front wheels is equal to or greater than a predetermined value $\Delta V_{W1}$ (>0), while the front wheel torque distributor instruction value $T_2$ is determined as "15" when the difference $\Delta V_W$ is equal to or less than a predetermined value $\Delta V_{W2}$ (<0). Further, the front wheel torque distribution instruction value $T_2$ is determined by computation with the following equation (2a) when the difference $\Delta V_W$ is equal to or greater than "0" and less than the predetermined value $\Delta V_{W1}$, while the front wheel torque distribution instruction value $T_2$ is determined by computation with the following equation (2b) when the difference $\Delta V_W$ is less than "0" and greater than the predetermined value $\Delta V_{W2}$.

$$T_2 = k_1 \cdot \Delta V_W \tag{2a}$$

$$T_2 = k_2 \cdot \Delta V_W \tag{2b}$$

However, in the aforementioned situation that a diameter of at least one wheel is smaller than diameters of other wheels of the vehicle, it is not desirable for the vehicle that the front and rear wheels rotate at a mutually same speed in the directly connecting four wheel drive condition, because a stability of running condition of the vehicle is deteriorated and the four wheel drive power train system suffers an undesirable load. On the other hand, when the directly connecting four wheel drive condition is selected by the select switch or the four wheel drive system becomes automatically in the directly connecting four wheel drive condition, there is a reason for requiring such the directly connecting four wheel drive condition, that is, e.g. to obtain a stability of straight running. Further, at relatively low vehicle speed, despite of the vehicle being in the directly connecting four wheel drive condition under the different diameter wheel using situation, the deterioration of stability and the load of power train system can be reduced.

Further, in the vehicle in a driving condition except the directly connecting four wheel drive condition, a difference of rotating speed between the front and rear wheels becomes great when using a different diameter wheel, so that the different diameter wheel using situation can be determined based on the difference of rotating speed between the front and rear wheels.

Therefore, in this embodiment, the difference of rotating speed between the front and rear wheels, that is, the difference $\Delta V_W$ of rotating speed between the front and rear wheels, is computed by subtracting a mean front wheel speed (the front wheel rotation detection value nF) obtained from a mean rotating speed of the front wheels 12FL, 12FR as the subsidiary drive wheels, from a mean rear wheel speed (the rear wheel rotation detection value nR) obtained from a mean rotating speed of the rear wheels 12RL, 12RR as the main drive wheels, based on the aforementioned equation (1).

Further, in this embodiment, a threshold $\Delta V_{W0}$ for inhibiting the directly connecting four wheel drive condition is determined in accordance with the detected vehicle speed, based on a vehicle speed-front and rear wheel rotating speed difference threshold curve indicating the threshold $\Delta V_{W0}$ of the difference $\Delta_{VW}$ of rotating speed between the front and rear wheels in accordance with a vehicle speed, which is previously made. Then, a determination is made whether the directly connecting four wheel drive condition is to be inhibited or not, from a comparison of the computed difference $\Delta V_W$ and the determined threshold $\Delta V_{W0}$.

Further, in this embodiment, as the different diameter wheel using situation, the situation in which a diameter of only one wheel is smaller than diameters of other wheels of the vehicle due to an emergency wheel being used, is assumed. In this situation, in case of the difference $\Delta V_W$ of rotating speed between the front and rear wheel, being greater than "0", the small diameter wheel (emergency wheel) is used as the rear wheel, so that the directly connecting four wheel drive condition is determined to be inhibited when the difference $\Delta V_{W0}$ is greater than the threshold $\Delta V_{W0}$, on the other hand, in case of the difference $\Delta V_W$ of rotating speed between the front and rear wheels being less than "0", the small diameter wheel (emergency wheel) is used as the front wheel, so that the directly connecting four wheel drive condition is determined to be inhibited when the difference $\Delta V_W$ is less than the threshold $\Delta V_{W0}$.

Figure 14:
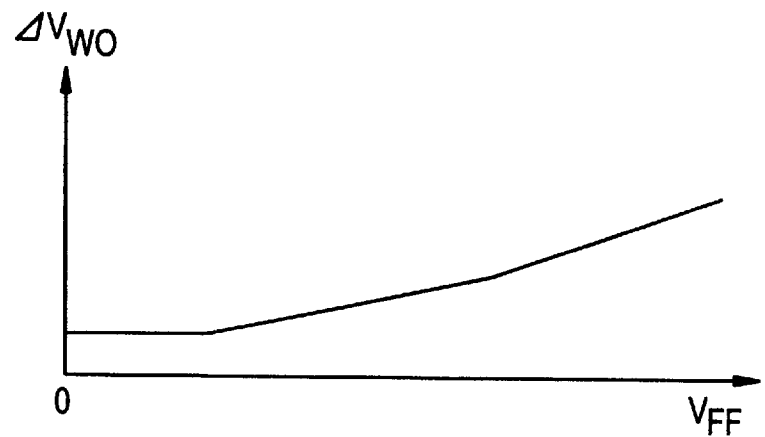
Figure 15:
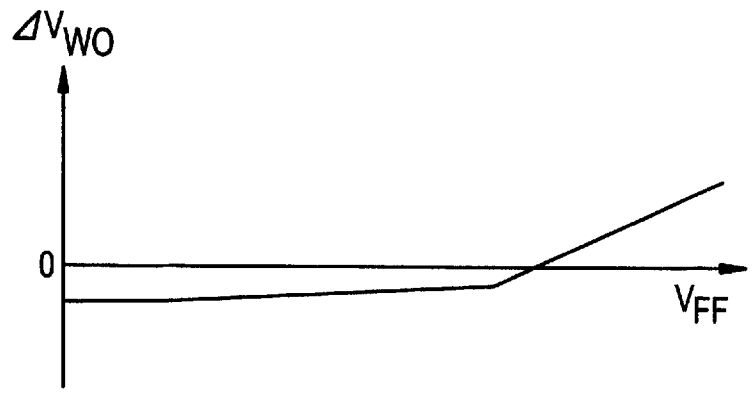
FIG. 15 is a graph of another characteristic curve exhibiting a relationship between the pseudo vehicle speed $V_{FF}$ and the threshold $\Delta V_{WO}$.

In connection to this, in this embodiment, as the vehicle speed-front and rear wheel rotating speed difference threshold curve, a graph shown in FIG. 14 is used in case of the difference $\Delta V_W$ of rotating speed between the front and rear wheels being greater than "0", while a graph shown in FIG. 15 is used in case of the difference $\Delta V_W$ of rotating speed between the front and rear wheels being less than "0". These vehicle speed-front and rear wheel rotating speed difference threshold curves are made by, e.g., such a way that, in an actual vehicle in the two wheel drive condition, change of the difference $\Delta V_W$ of rotating speed between the front and rear wheels attending on change of a vehicle speed (below-explained pseudo vehicle speed) is investigated in cases of $\Delta V_W > 0$ and $\Delta V_W < 0$ using a difference of diameter between the different diameter wheel and other wheels as a parameter, then an allowable value of the difference of diameter is determined relatively great in ease of a relatively low vehicle speed, while an allowable value of the difference of diameter is determined relatively small in case of a relatively high vehicle speed, regarding a degree of deterioration of stability and a magnitude of load of power train system attending on using of the different diameter wheel.

Further, in this embodiment, during the directly connecting four wheel drive condition being determined to be inhibited, when the directly connecting four wheel drive condition is selected in the two wheel drive condition, the front wheel side torque distribution instruction value $T_2$ is determined as "0" so as to maintain the two wheel drive condition. Also, when the directly connecting four wheel drive condition is selected in the automatic four wheel drive condition in which the drive torque is distributed in accordance with a speed difference between the front and rear wheels, or the front wheel side torque distribution instruction value $T_2$ determined in accordance with the difference $\Delta V_W$ of rotating speed between the front and rear wheels becomes "50" in the automatic four wheel drive mode, the front wheel side torque distribution instruction value $T_2$ is determined as a predetermined value a (upper limit) less than "50".

In the meantime, in case of the vehicle in the different diameter wheel using situation being started in the directly connecting four wheel drive condition, e.g. selected by the select switch, the difference $\Delta V_W$ of rotating speed between the front and rear wheels is not occurred, accordingly, it is required to determine the different diameter wheel using situation after enabling a mutually different speed rotation of the front and rear wheels by changing the drive force distribution between the main and subsidiary wheels as a ratio except 1:1, so as to determine the different diameter wheel using situation based on the difference $\Delta V_W$ with the some way as mentioned above. Though, such a change at drive condition from the directly connecting four wheel drive condition to the drive condition in which the drive force distribution between the main and subsidiary wheels is made as a ratio except 1:1 (e.g., the automatic four wheel drive condition) for the determination of different diameter wheel using situation, should be performed prudently, because such the change is not favorable in a point that the change diverts the vehicle from the directly connecting four wheel drive condition which is made based on the aforementioned requirements.

Therefore, in this embodiment, only in cane that a situation in which a vehicle speed being equal to or higher than a predetermined value (e.g., 50 km/h) and a variance of the vehicle speed being in a predetermined range (e.g., ±3.5 km/h) is continued during a predetermined period $t_1$ (e.g., 10 seconds), the change of drive condition from the directly connecting four wheel drive condition to the automatic four wheel drive condition for the determination of different diameter wheel using situation, is performed.

That is, in a high speed range equal to or higher than, e.g. 60 km/h, an influence of turning trace difference can be disregarded since the difference $\Delta V_W$ of rotating speed between the front and rear wheels is less than 0.2 km/h and is a little. Further, when accelerating of the vehicle, usually the determination of different diameter wheel using situation cannot be made exactly due to increasing of the difference $\Delta V_W$ of rotating speed between the front and rear wheels caused by increasing of slip ratio of the wheels. Though, in case that a vehicle speed being equal to or higher than, e.g., 60 km/h and a variance of the vehicle speed being in a range of, e.g., ±3.5 km/h during 10 seconds, the vehicle can be assumed to be in a constant speed running condition since the variance of the acceleration becomes in a range of 0.01 G. thereby, the determination of different diameter wheel using situation can be made exactly based on the difference $\Delta V_W$ of rotating speed between the front and rear wheels.

In more detail, for determining (or discriminating) a situation in which a variance of vehicle speed being in a predetermined range, being continued during a predetermined period $t_1$, in this embodiment, a detected value (in concrete, the below-explained pseudo vehicle speed $V_{FF}$) of vehicle speed at a sampling time is determined as a standard value $V_{FFK}$, and a value obtained by subtracting a predetermined variance value $\Delta V_{FF}$ (3.5 km/h) from the standard value $V_{FFK}$ is determined as a minimum value, while a value obtained by adding the same variance value $\Delta V_{FF}$ to the standard value $V_{FFK}$ is determined as a maximum value, then it in determined whether a situation in which a detected value $V_{FF}$ of vehicle speed sampled after the sampling time being in a range between the maximum and minimum values, is continued during a predetermined period $t_1$ or not. With this determination, when a newly detected value $V_{FF}$ is out of the aforementioned range before passing the predetermined period $t_1$, the newly detected value $V_{FF}$ is determined as the standard value $V_{FFK}$, then the aforementioned determination is repeated till a situation in which a detected value $V_{FF}$ of vehicle speed sampled after the sampling time being in a range between the maximum and minimum values based on the newly detected value $V_{FF}$, is continued during the predetermined period $t_1$.

Besides, a difference of rotating speed between the front and rear wheels does not occur immediately after changing of drive condition from the directly connecting four wheel drive condition to the automatic four wheel drive condition due to a responsibility of the clutch mechanism, filtering of the instruction torque, a period for achieving the predetermined hydraulic pressure, and a inertia of power train system including the wheels, so that the determination of different diameter wheel using situation shall be carried out after passing of a predetermined period which has been determined expecting such the response delays.

Therefore, in this embodiment, after the aforementioned changing condition (vehicle speed and variance thereof) to the automatic four wheel drive condition is fulfilled in the directly connecting four wheel drive condition, the front wheel side torque distribution instruction value $T_2$ is determined as a predetermined value $A_0$ ($A_0$: a front wheel side torque distribution instruction value to achieve a minimum torque by the automatic four wheel drive condition) so as to change the front wheel side torque from the value in the directly connecting four wheel drive condition to the minimum torque value, then after passing a predetermined period $t_2$ (e.g., 3 seconds) expecting a filtering time for determining the instruction value $T_2$ and a time for canceling the inertia of power train system, the determination of different diameter wheel using situation is carried out based on the difference $\Delta V_W$ of rotating speed between the front and rear wheels.

Further, such the determination of different diameter wheel using situation is usually enough to be carried out once from ON to OFF of a ignition switch of the vehicle. Though in this embodiment, as mentioned above, a threshold $\Delta V_{W0}$ for inhibiting the directly connecting four wheel drive condition is determined in accordance with the detected vehicle speed, based on the previously made vehicle speed-front and rear wheel rotating speed difference threshold (directly connecting four wheel drive condition inhibiting threshold) curve, then a determination is made whether the directly connecting four wheel drive condition is to be inhibited or not, from a comparison of the computed difference $\Delta V_W$ and the determined threshold $\Delta V_{W0}$, so that even it once a determination is made as a difference $\Delta V_W$ being out of the directly connecting four wheel drive condition inhibiting range, the difference $\Delta V_W$ may enter in the directly connecting four wheel drive condition inhibiting range due to a change of the vehicle speed.

Therefore, in this embodiment, when a determination is made as a difference $\Delta V_W$ being out of the directly connecting four wheel drive condition inhibiting range, the determination is repeated as long as the vehicle speed being equal to or higher than a predetermined value (below-mentioned value $V_{FF2}$), and during the repeating, when a determination is made as a difference $\Delta V_W$ being in the directly connecting four wheel drive condition inhibiting range, and besides such the determination is continued during a predetermined period $t_3$ (e.g., 5 minutes), failure of determination is indicated to a driver of the vehicle by lighting on and off of a failure lamp, then the control process of determination whether the directly connecting four wheel drive condition is to be inhibited or not, is finished. Thereby, it can be prevented that a determination is made as a difference $\Delta V_W$ being in the directly connecting four wheel drive condition inhibiting range due to another cause (e.g., cornering, braking or driving). Further, in this embodiment, inhibiting of the directly connecting four wheel drive condition is released when a vehicle speed becomes lower than a predetermined value (below-mentioned value $V_{FF1}$) which is smaller than the former predetermined value ($V_{FF2}$), so as to enable to start the control process again after OFF of the ignition switch.

It is noted that, in this embodiment, the pseudo vehicle speed $V_{FF}$ is computed from the front wheel rotation detection value nF corresponding to the mean front wheel speed and the rear wheel rotation detection value nR corresponding to the mean rear wheel speed, based on the following equation (3), and the pseudo vehicle speed $V_{FF}$ is used as the vehicle speed.

$$V_{FF}=1/2(nR+nF) \quad (3)$$

Further, in this embodiment, in case of at least one of the front wheel rotation sensor 17F and the rear wheel rotation sensor 17R being not operating normally, the aforementioned control process cannot be carried out exactly, so that the control process is not carried out when at least one of the failure detection signals $S_{FF}$, $S_{FF}$ is sent from the rotation sensor warning switch 19.

Further, in this embodiment, a determination whether the vehicle under control of the four wheel drive system is in the directly connecting four wheel drive condition or not, is made in accordance with whether the predetermined pressure detection signal $S_{A1}$ indicating that the clutch supply pressure $P_C$ becoming equal to or over the predetermined value $A_1$ providing the directly connecting four wheel drive condition in which the front wheel side torque distribution $T_2$ becomes $T_2$=50), is sent from the hydraulic pressure switch 23 or not.

Thus, in this embodiment, a first computing process for determining whether the vehicle is in a situation in which the directly connecting four wheel drive condition is to be inhibited, or not, considering the above-mentioned matters, and a second computing process for determining the front wheel side torque distribution instruction value $T_2$ as any one of $T_2$=0, 50, $A_0$, 8, $k_1 \cdot \Delta V_W$ and $k_2 \cdot V_W$, from at least the drive mode detection value M (when M=AUTO4, further from the detected difference of $\Delta V_W$ of rotating speed between the front and rear wheels) and from a result on the way and a final result of the first computing process, are carried out in parallel.

Figure 16:
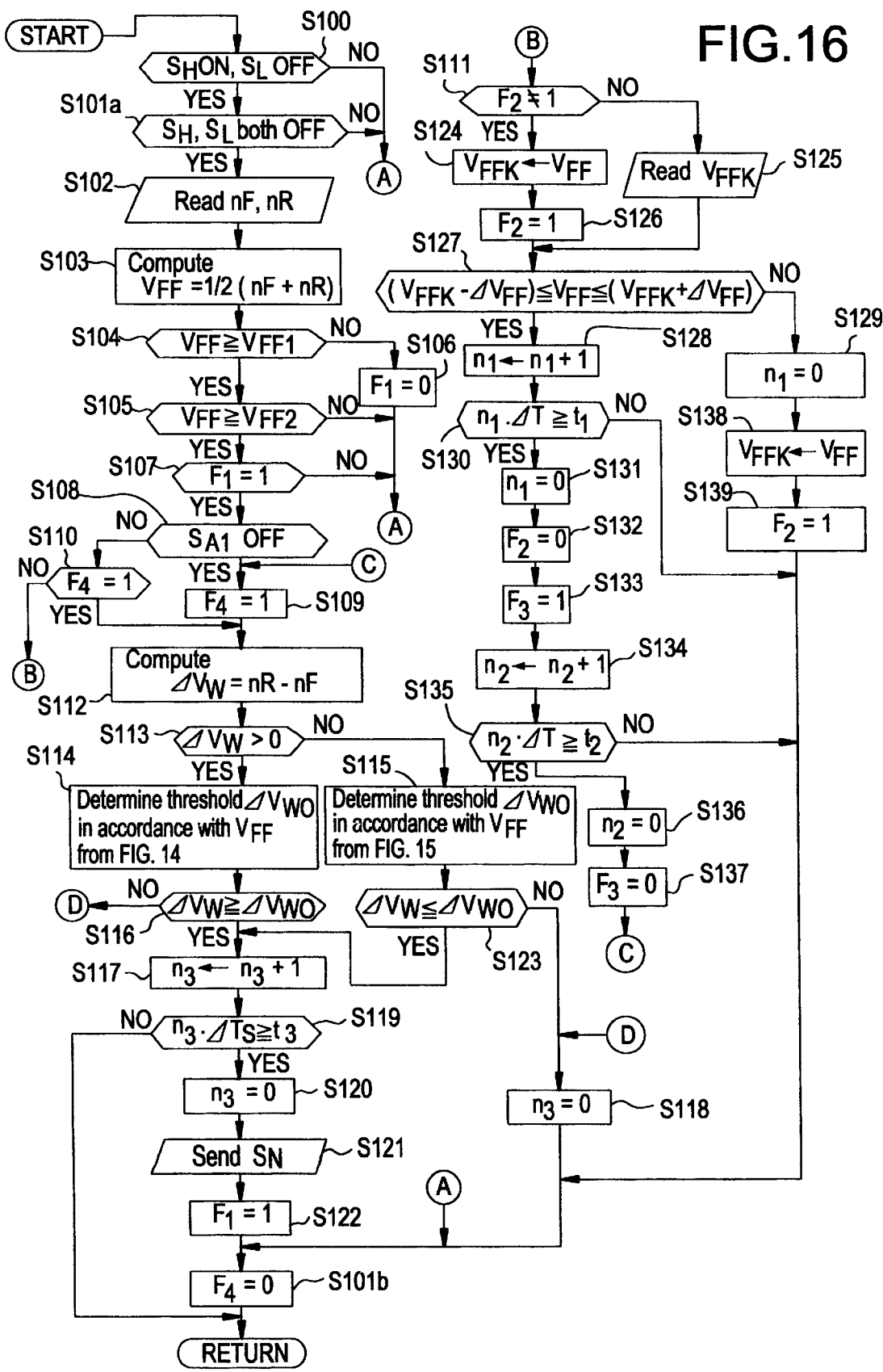
FIG. 16 is a flowchart of a first computing process executed by the controller.

Incidentally, the aforementioned drive condition signal $S_K$ indicating the present drive condition is determined by another computing process which, in case of change of drive condition from the directly connecting four wheel drive condition to the automatic four wheel drive condition for the determination of different diameter wheel using situation, changes the driving condition signal $S_K$ to the one indicating the automatic four wheel drive condition when the directly connecting four wheel drive condition inhibiting signal $S_N$ is sent by the first computing process shown in FIG. 16.

Figure 17:
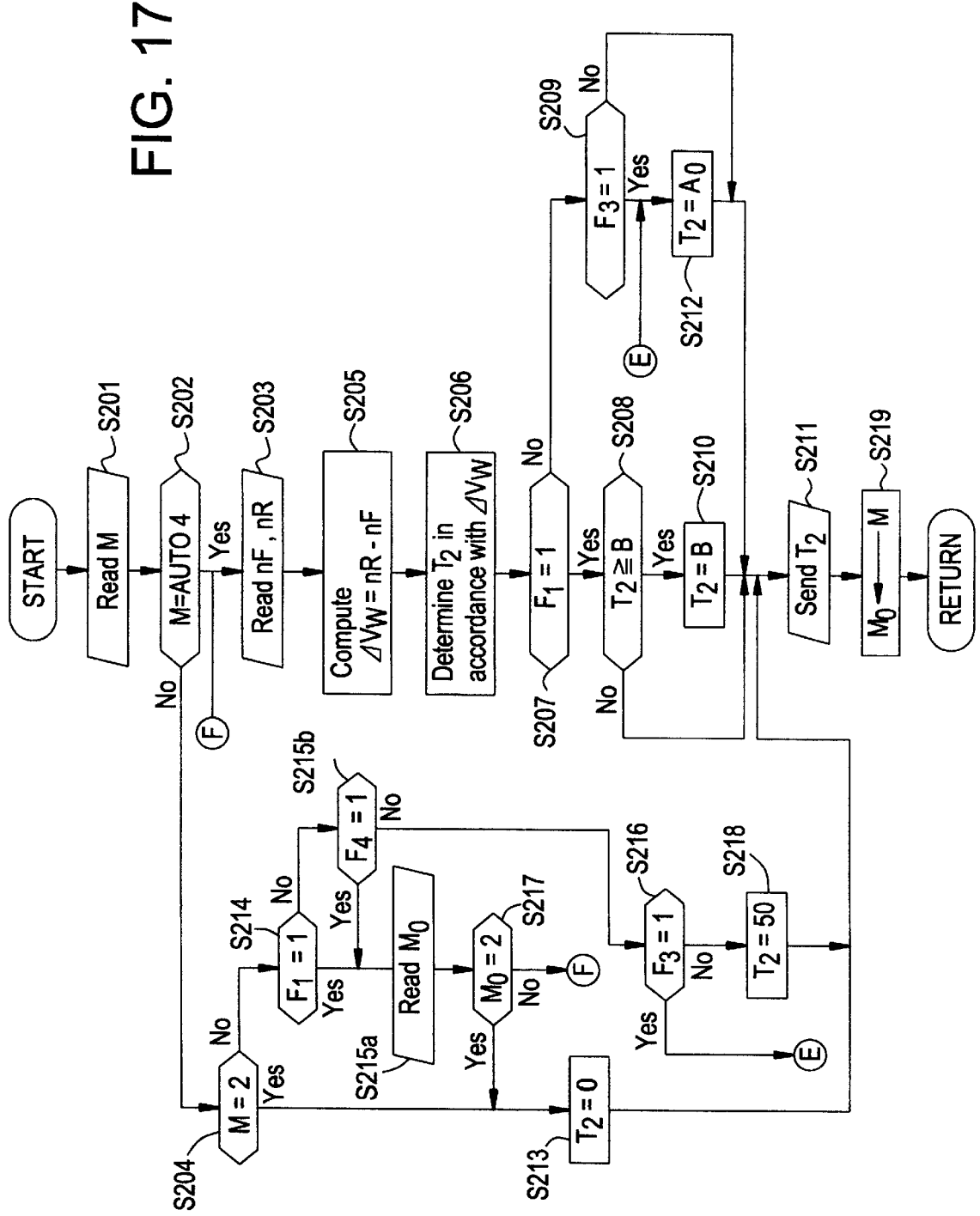
FIG. 17 is a flowchart of a second computing process executed by the controller.

Next, the first computing process is explained with a flowchart shown in FIG. 16, and the second computing process is explained with a flowchart shown in FIG. 17. These computing process are executed based or the above-explained basic principle, for determining the situation in which the vehicle is using a different diameter wheel (small diameter emergency wheel), and for carrying out the control which inhibit the vehicle from the directly connecting four wheel drive condition when the difference $\Delta V_W$ is in the directly connecting four wheel drive condition inhibiting range due to the different diameter wheel using situation.

The computing process shown in FIG. 16 and FIG. 17 are executed by a timer interruption for every predetermined time $\Delta T_S$ (e.g., 10 seconds). In the computing process, a control flag $F_1$ indicates a determination that the vehicle is in a situation in which the directly connecting four wheel drive condition is to be inhibited due to the different diameter wheel using situation, so that inhibiting of the directly connecting four wheel drive condition is executed when the control flag $F_1$ is set to $F_1$=1, while releasing of the inhibiting of the directly connecting four wheel drive condition or allowing the directly connecting four wheel drive condition is executed when the control flag $F_1$ is set to $F_1$=0. A control flag $F_2$ instructs a renewal of the set standard value $V_{FFK}$ used to determine whether a variance width of vehicle speed fulfills the predetermined condition or not, so that renewing of the standard value $V_{FFK}$ is executed when the control flag $F_2$ is set to $F_2$=1, while releasing of renewal of the standard value $V_{FFK}$ is executed when the control flag $F_2$ is set to $F_2$=0.

Further, in the computing process, a control flag $F_3$ indicates a situation in which the drive condition is to be changed from the directly connecting four wheel drive condition to the automatic four wheel drive condition for the determination of the different diameter wheel using situation, go that control for the automatic four wheel drive condition is executed when the control flag $F_3$ is set to $F_3$=1, while releasing of the automatic four wheel drive condition is executed when the control flag $F_3$ is set to $F_3$=0. A control flag $F_4$ indicates starting of the determining of the different diameter wheel using situation caused by fulfilling of the required condition for the determination of the different diameter wheel using situation, so that starting of the determining of the different diameter wheel using situation is executed when the control flag $F_4$ is set to $F_4$=1, while fulfilling of the required condition is checked when the control flag $F_4$ is set to $F_4$=0.

Further, in the computing process, timers n1, n2 and n3 are used to determine the passing of the predetermined periods $t_1$, $t_2$ and $t_3$, the timers are substantially constituted from court values respectively, so that a time period in which the standard value $V_{FFK}$ is continued to be set to a certain value, is computed by $n1 \cdot \Delta T_S$ and compared with the predetermined period $t_1$, and a time period passed from change of drive condition from the directly connecting four wheel drive condition to the automatic four wheel drive condition for the determination of the different diameter wheel using situation, is computed by $n2 \cdot \Delta T_S$ and compared with the predetermined period $t_2$, additionally a time period in which the determination of inhibiting of the directly connecting four wheel drive condition is continued, is computed by $n3 \cdot \Delta T_S$ and compared with the predetermined period $t_3$.

In the first computing process shown in FIG. 16, at first, at step S100, whether the detection signal $S_K$ is sent from the high speed shift position sensor 86 and besides the detection signal $S_L$ is not sent from the low speed shift position sensor 88 or not in determined. If the detection signal $S_H$ is sent from the high speed shift position sensor 86 and besides the detection signal $S_L$ is not sent from the low speed shift position sensor 88, the procedure is shifted to step S101*a*, on the other hand if it is not so, that is, if the detection signal $S_L$ is sent and besides the detection signal $S_H$ is not sent, the procedure is shifted to stop S101*b*.

At the step 101*a*, whether both of the failure signals $S_{FF}$, $S_{FR}$ about the front and rear wheel rotation sensors 17F, 17R are sent or not is determined, and if neither of the failure signals $S_{FF}$, $S_{FR}$ is sent, the procedure is shifted to step S102, on the other hand if it is not so, that is, if at least one of the failure signals $S_{FF}$, $S_{FR}$ is sent, the procedure is shifted to the step S101*b*. At the step 101*b*, the control flag $F_4$ is get to $F_4=0$, then the procedure is returned to a main program.

At the step S102, the front wheel rotation detection value nF and the rear wheel rotation detection value nR are read from the front wheel rotation sensor 17F and the rear wheel rotation sensor 17R. At next step S103, the pseudo vehicle speed $V_{FF}$ is computed from the front wheel rotation detection value nF and the rear wheel rotation detection value nR which are read at the step S102, in accordance with the aforementioned equation (3). Then at step S104, whether the pseudo vehicle speed $V_{FF}$ computed at the step S103 is equal to or greater than the predetermined value $V_{FF1}$ (e.g. a value corresponding to 50 km/h) or not is determined, and if the pseudo vehicle speed $V_{FF}$ is equal to or greater than the predetermined value $V_{FF1}$, the procedure is shifted to step S105, on the other hand if it is not so, that is, if $V_{FF}<V_{FF1}$, the procedure is shifted to stop S106.

At the step S105, whether the pseudo vehicle speed $V_{FF}$ computed at the step S103 is equal to or greater than the predetermined value $V_{FF2}$ (e.g. a value corresponding to 60 km/h) or not is determined, and if the pseudo vehicle speed $V_{FF}$ is equal to or greater than the predetermined value $V_{FF2}$, the procedure is shifted to step S107, on the other hand if it is not so, that is, if $V_{FF}<V_{FF2}$, the procedure is shifted to the step S101*b*. At the step S106, the control flag $F_1$ is met to $F_1=0$, then the procedure is shifted to the step S101*b*. At the step S107, whether the control flag $F_1$ is $F_1=1$ or not is determined, and if the control flag $F_1$ is $F_1=1$, the procedure is shifted to the step S108, on the other hand if it is not so, that is, if $F_1=1$, the procedure is shifted to the step S101*b*.

At the step S108, whether the predetermined hydraulic pressure detection signal $S_{A1}$ is sent from the hydraulic pressure switch 23 or not is determined, and if the predetermined hydraulic pressure detection signal $S_{A1}$ is not sent, the procedure is shifted to step S109, on the other hand if it is so, that is, if the predetermined hydraulic pressure detection signal $S_{A1}$ is sent, the procedure is shifted to step S110. At the step S110, whether the control flag $F_4$ is $F_4=1$ or not is determined, and if the control flag $F_4$ is $F_4=1$, the procedure is shifted to step S112, on the other hand if it is not so, that is, if $F_4=1$, the procedure is shifted to step S111. At the step 109, the control flag $F_4$ is set to $F_4=1$, then the procedure is shifted to the step S112.

At the step 112, the difference $\Delta V_W$ of rotating speed between the rear and front wheels is computed from the front wheel rotation detection value nF and the rear wheel rotation detection value nR which are read at the step S102, in accordance with the aforementioned equation (1). At next step S113, whether the difference $\Delta V_W$ of rotating speed between the rear and front wheels computed at the step S112 is greater than "0" ($\Delta V_W>0$) or not is determined, and if $\Delta V_W>0$, the procedure is shifted to step S114, on the other hand if it is not so, that is, if $\Delta V_W \leq 0$, the procedure is shifted to step S115.

At the step S114, referring to the vehicle speed (pseudo vehicle speed $V_{FF}$)-front and rear wheel rotating speed difference threshold curve of the graph for the case of $\Delta V_W>0$ shown in FIG. 14, the front and rear wheel rotating speed difference threshold $\Delta V_{W0}$ is determined in accordance with the pseudo vehicle speed $V_{FF}$, then the procedure is shifted to step S116. At the step S116, whether the difference $\Delta V_W$ of rotating speed between the rear and front wheels computed at the step S112 is equal to or greater than the threshold $\Delta V_{W0}$ of front and rear wheel rotating speed difference determined at the step S114 or not is determined, and if the difference $\Delta V_W$ is equal to or greater than the threshold $\Delta V_{W0}$, the procedure is shifted to step S117, on the other hand if it is not so, the procedure is shifted to stop S118.

At the step S118, a count value n3 of the counter (timer) n3 is reset to n3=0, then the procedure is shifted to the step S101*b*. At the step S117, the count value n3 of the counter n3 is added by "1", then the procedure is shifted to step S119. At the step S119, the time period in which the determination of inhibiting of the directly connecting four wheel drive condition is continued, is computed by multiplying the count value n3 of the counter n3 by the predetermined sampling time $\Delta T_S$, moreover whether the computed time period $n3 \cdot \Delta T_S$ is equal to or greater than the predetermined period $t_3$ or not is determined, and if $n3 \cdot \Delta T_S \geq t_3$, the procedure is shifted to step S120, on the other hand if it is not so, the procedure is returned to a main program. At the step S120, the count value n3 of the counter n3 is reset to n3=0. At next step S121, the directly connecting four wheel drive condition inhibiting signal $S_N$ is sent out. At next step S122, the control flag $F_1$ is set to $F_1=1$, then the procedure is shifted to the step S101*b*.

On the other hand, at the step S115, referring to the vehicle speed (pseudo vehicle speed $V_{FF}$)-front and rear wheel rotating speed difference threshold curve of the graph for the case of $\Delta V_W \leq 0$ shown in FIG. 15, the front and rear wheel rotating speed difference threshold $\Delta V_{W0}$ is determined in accordance with the pseudo vehicle speed $V_{FF}$, then the procedure is shifted to stop S123. At the step S123, whether the difference $\Delta V_W$ of rotating speed between the rear and front wheels computed at the step S112 is equal to or smaller than the threshold $\Delta V_{W0}$ of front and rear wheel rotating speed difference determined at the step S115 or not is determined, and if the difference $\Delta V_W$ is equal to or smaller than the threshold $\Delta V_{W0}$, the procedure is shifted to the step S117, on the other hand if it is not so, the procedure is shifted to the step S118.

At the step S111 subsequent to the step S110, whether the control flag $F_2$ is $F_2=1$ or not is determined, and if the control flag $F_2$ is $F_2=1$, the procedure is shifted to step S124, on the other hand if it is not so, that is, if $F_2=1$, the procedure is shifted to step S125. At the step 124, the standard value $V_{FFK}$ is determined as the pseudo vehicle speed $V_{FF}$ computed at the step 103, then the standard value $V_{FFK}$ is memorized in the RAM of the memory device 7*c*. At next step S126, the control flag $F_2$ is set to $F_2=1$, then the procedure is shifted to step S127. At the step S125, the current standard value $V_{FFK}$ memorized in the RAM of the memory device 7*c* is read therefrom, then the procedure is shifted to the step S127.

At the step S127, from the standard value $V_{FFK}$ determined at the step S124 or read at the step S123 and the predetermined variance value $\Delta V_{FF}$, a variance range of the pseudo vehicle speed $V_{FF}$ is determined, in accordance with the following equation (4), moreover wheather the pseudo vehicle speed $V_{FF}$ computed at the step S103 is in the variance range or not is determined, and if the pseudo vehicle speed $V_{FF}$ is in the variance range, the procedure is shifted to step S128, on the other hand if it is not so, the procedure is shifted to step S129.

$$(V_{FFK} - \Delta V_{FF}) \leq V_{FF} \leq (V_{FFK} + \Delta V_{FF}) \tag{4}$$

At the step S128, a count value n1 of the counter (timer) n1 is added by "1", then the procedure is shifted to step S130. At the step S130, the time period in which the standard value $V_{FFK}$ is continued to be set to a certain value, is computed by multiplying the count value n1 of the counter n1 by the predetermined sampling time $\Delta T_S$, moreover whether the computed time period $n1 \cdot \Delta T_S$ is equal to or greater than the predetermined period $t_1$ or not is determined, and if $n1 \cdot \Delta T_S \geq t_1$, the procedure is shifted to step S131, on the other hand if if it is not so, the procedure is shifted to the step S101b. At the step S131, the count value n1 of the counter n1 is reset to n1=0. At next step S132, the control flag $F_2$ is reset to $F_2$=0, and at next step S133, the control flag $F_3$ is set to $F_3$=1, then at next step S134, a count value n2 of the counter (timer) n2 is added by "1".

At next step S135, the time period passed from change of drive condition from the directly connecting four wheel drive condition to the automatic four wheel drive condition for the determination of the different diameter wheel using situation, is computed by multiplying the count value n2 of the counter n2 by the predetermined sampling time $\Delta T_S$, moreover whether the computed time period $n2 \cdot \Delta T_S$ is equal to or greater than the predetermined period $t_2$ or not is determined, and if $n2 \cdot \Delta T_S \geq t2$, the procedure is shifted to step S136, on the other hand if if it is not so, the procedure is shifted to the step S101b. At the step S136, the count value n2 of the counter n2 is reset to n2=0, and at next step S137, the control flag $F_3$ is reset to $F_3$=0, then the procedure is shifted to the step S109.

On the other hand, at the step S129 subsequent to the step S127, the count value n1 of the counter n1 is reset to n1=0, then the procedure is shifted to step S138, At the step 138, the standard value $V_{FFK}$ is renewed by the pseudo vehicle speed $V_{FF}$ computed at the step 103, and the renewed standard value $V_{FFK}$ is memorized in the RAM of the memory device 7c, then the procedure is shifted to step S139. At the step S139, the control flag $F_2$ is set to $F_2$=1, then the procedure is shifted to the step S101b.

Meanwhile, in the second computing process shown in FIG. 17, at first, at step S201, the drive mode detection value M is read from the drive mode switch 21. At next step S202, whether the drive mode detection value M read at the step S201 is "AUTO4" or not is determined, and it the drive mode detection value M is "AUTO4", the procedure is shifted to step S203, on the other hand if it is not so, that is, if M=2 or M=LOCK4, the procedure is shifted to step S204. At the step S203, the front wheel rotation detection value nF and the rear wheel rotation detection value nR are read from the front wheel rotation sensor 17F and the rear wheel rotation sensor 17R. Then at next step S205, the difference $\Delta V_W$ of rotating speed between the rear and front wheels is computed from the front wheel rotation detection value nF and the rear wheel rotation detection value nR which are read at the step S203, in accordance with the aforementioned equation (1).

At next step S206, referring to the characteristic curve shown in FIG. 13, the front wheel side torque distribution instruction value $T_2$ is determined in accordance with the difference $\Delta V_W$ of rotating speed between the front and rear wheels computed at the step S205, then at next step S207, whether the control flag $F_1$ in the first computing process shown in FIG. 16 is $F_1$=1 or not is determined, and if $F_1$=1, the procedure is shifted to step S208, an the other hand if it is not so, the procedure is shifted to step S209.

At the step S208, whether the front wheel side torque distribution instruction value $T_2$ determined at the step S206 is equal to or greater than the predetermined value H (an upper limit leas than "50") or not is determined, and if $T_2 \geq B$ the procedure is shifted to step S210, on the other hand if it is not so, the procedure is shifted to step S211. At the step S209, whether the control flag $F_3$ in the first computing process shown in FIG. 16 is $F_3$=1 or not is determined, and is $F_3$=1, the procedure is shifted to step S212, on the other hand if it is not so, the procedure is shifted to the step S211. At the step S210, the front wheel side torque distribution instruction value $T_2$ is determined as the predetermined value B, then the procedure is shifted to the step S211. At the step S212, the front wheel side torque distribution instruction value $T_2$ is determined as the predetermined value $A_0$ (the instruction value to achieve a minimum torque by the automatic four wheel drive condition), then the procedure is shifted to the step S211.

On the other hand, at the step 5204, whether the drive mode detection value M read at the step S201 is "2" or not is determined, and if M=2, the procedure is shifted to step S213, on the other hand if it is not so, the procedure is shifted to step S214. At the step S213, the front wheel side torque distribution instruction value $T_2$ is determined as "0", then the procedure is shifted to the step S211. At the step S214, whether the control flag $F_1$ in the first computing process shown in FIG. 16 is $F_1$=1 or not is determined, and if $F_1$=1, the procedure is shifted to step S215a, on the other hand if it is not so, the procedure is shifted to step S215b.

At the step S215a, the last drive mode detection value $M_0$ memorized in the RAM of the memory device 7c is read therefrom, then the procedure is shifted to the step S217, and at the step S217, whether the last drive mode detection value $M_0$ read at the step S215a is "2" or not is determined, and if $M_0$=2, the procedure is shifted to the step S213, on the other hand if it is not so, the procedure is shifted to the step S203.

At the step S215b, whether the control flag $F_4$ in the first computing process shown in FIG. 16 is $F_4$=1 or not is determined, and if $F_4$=1, the procedure is shifted to the step S215a, on the other hand if it is not so, the procedure is shifted to step S216. At the step S216, whether the control flag $F_3$ in the first computing process shown in FIG. 16 is $F_3$=1 or not is determined, and if $F_3$=1, the procedure is shifted to the step S212, on the other hand if it is not so, the procedure is shifted to step S218. At the step S218, the front wheel side torque distribution instruction value $T_2$ is determined as "50", then the procedure is shifted to the step S211.

At the step S211, the front wheel side torque distribution instruction value $T_2$ determined at the steps S206, S210, S212, S213 or S218 is sent out, then at next step S219, the last drive mode detection value $M_0$ is determined as the current drive mode detection value M read at the step 201, and memorized in the RAM of the memory device 7c, then the procedure is returned to the main program.

Thus, by the output interface circuit 7d of the microcomputer 7, the front wheel side torque distribution instruction value $T_2$ determined by the above-mentioned procedure is converted to the control signal $CS_0$ consisting of an analog voltage value indicating the duty ratio D for achieving the clutch pressure $P_C$ in accordance with the front wheel side torque distribution instruction value $T_2$, then the control signal $CS_0$ is input to the drive circuit 31a, while the control signal $CS_1$ is input to the drive circuit 31b if the instruction value $T_2$=0. Thereby, the drive circuit 31a supplies the exciting current ia having the duty ratio D corresponding to the control signal $CS_0$, to the solenoid 128d of the duty control solenoid valve 128 in the hydraulic pressure supply device 16, while the drive circuit 31b supplies the exciting current $i_1$ to the solenoid 120d of the solenoid valve 120 in the hydraulic pressure supply device 16 if the control signal $CS_1$ is input. Incidentally, if the control signal $CS_1$ is not input, the drive circuit 31b does not supply the exciting current $i_1$.

As a result of this, in case of the front wheel side torque distribution instruction value $T_2$=0, the inlet port 120A of the solenoid selector valve 120 is communicated to the outlet port 120B thereof, then the control pressure is supplied from the solenoid selector valve 120 to the external pilot port $126_{P1}$, so that the pilot selector valve 126 becomes the condition shown in the cross-sectional view in the right half of FIG. 9, this enables feeding of a regulated pressure from the clutch pressure regulating valve 122 to the friction clutch 66 through the pilot selector valve 126. Meanwhile, the duty control solenoid valve 128 supplies the pilot control pressure to the external pilot port $122_{P2}$ of the clutch pressure regulating valve 122 in accordance with the control signal $CS_0$ by moving of the spool from the normal position 128b to the operating position 128c opposing to the return spring 128a, thereby the clutch pressure regulating valve 122 regulates the supply pressure in accordance with the control signal $CS_0$, so that the regulated pressure, that is, the supply pressure $P_C$ in accordance with the front wheel aide torque distribution instruction value $T_2$, is supplied from the clutch pressure regulating valve 122 to the friction clutch 66 through the pilot selector valve 126.

The regulated supply pressure $P_C$ is supplied from the hydraulic pressure supply device 16 to the inlet port 74 in the transfer 22, thereby, the friction plater 66b and the friction disks 66d frictionally contact with each other in accordance with the supplied clutch pressure $P_C$, and a drive torque (drive force) in accordance with the friction force drives the clutch hub 66c of the friction clutch 66 to rotate the clutch hub 66c. Then the drive torque (drive force) is transmitted through the gear train to the front wheel side output shaft 24, and further transmitted through the front wheel side drive force transmitting system to the front wheels 12FL, 12FR, so that a drive force transmitted to the rear wheels 12RL, 12RR is reduced due to the drive force transmitted to the front wheels, thus, by the second computing process shown in FIG. 17, a four wheel drive condition with a desirable torque distribution can be achieved.

On the other hand, in case of the front wheel side torque distribution instruction value $T_2$=0, since the control signal $CS_1$ is not supplied, the inlet port 120A of the solenoid selector valve 120 is not communicated to the outlet port 120A, so that the control pressure is supplied from the solenoid selector valve 120 to the external pilot port $126_{P1}$, therefore the pilot selector valve 126 becomes the condition shown in the cross-sectional view in the left half of FIG. 9, this inhibits feeding of a regulated pressure from the clutch pressure regulating valve 122 to the friction clutch 66 through the plot selector valve 126. Meanwhile, since the duty ratio D of the control signal $CS_0$ sent to the duty control solenoid valve 128 becomes lower than the duty ratio $D_1$, the spool in the solenoid valve 128 stays at the normal position 128b or is moved from the operating position 128c to the normal position 128b, so that the clutch pressure $P_C$ from the clutch pressure regulating valve 122 becomes lower than the clutch pressure $P_1$ shown in FIG. 10, and is not regulated in accordance with the the front wheel side torque distribution instruction value $T_2$.

Therefore, in this case, since the clutch pressure $P_C$ is not supplied from the hydraulic pressure supply device 16 to the inlet port 74 in the transfer 22, thereby, the friction plates 66b and the friction disks 66d do not frictionally contact with each other as explained before. Thus, the drive torque (drive force) is not transmitted to the front wheel side output shaft 24, so that drive condition of the vehicle becomes in the two wheel drive condition.

Meanwhile, the determined drive condition signal $S_K$ is sent to the indicator 25 through the output interface circuit 7d, then an actual drive condition in accordance with tne drive condition signal $S_K$ is indicated by an indicating data. Further, when the inhibiting of the directly connecting four wheel drive condition is determined, the directly connecting four wheel drive condition inhibiting signal $S_N$ is sent to the warning device 27 through the output interface circuit 7d, then the situation that the directly connecting four wheal drive condition being inhibited due to using of a different diameter wheel is notified to the driver by lighting on and off of a lamp and/or sound. Moreover, when inhibiting of the directly connecting four wheel drive condition is determined and executed since changing of drive condition from the directly connecting four wheel drive condition to the automatic four wheel drive condition is executed for the determination of different diameter wheel using situation, the directly connecting four wheel drive condition inhibiting signal $S_N$ is sent to the indicator 25, so that a data indicating the automatic four wheel drive condition is selected, therefore the changing of drive condition to the automatic four wheel drive condition is notified to the driver.

Next, actions of the four wheel drive system of this embodiment are explained below, which are executed by the first and second computing process shown in FIGS. 16, 17.

First, assumed is a case that, during the vehicle with the four wheel drive system of this embodiment using a small diameter emergency wheel as one of the rear wheels corresponding to the main drive wheels, is running at a constant speed an high $\mu$ (friction coefficient) road in the two wheel drive made, a vehicle speed as the pseudo vehicle speed $V_{FF}$ becomes equal to or over the predetermined value $V_{FF2}$, and at this time a driver of the vehicle selects the directly connecting four wheel drive mode by an operation of the select switch. It is further assumed that the front and rear wheel rotation sensors 17F, 17R are normally operating.

In this case, since the vehicle is in the two wheel drive condition and the select lever of the subsidiary speed change mechanism 58 has not been operated at the time of operation of the select switch, the shift sleeve 64b is in the high speed shift position H. Therefore, at the step S100 in the first computing process shown in FIG. 16, a determination is made that the detection signal $S_H$ is sent from the high speed shift position sensor 86 and besides the detection signal $S_L$ is not sent from the low speed shift position sensor 88, and at the step 101a, a determination is made that neither of the failure signals $S_{FF}$, $S_{FR}$ is sent, so that the procedure is shifted to the step S102 in which the front wheel rotation detection value nF and the rear wheel rotation detection value nR are read, then at the next step S103, the pseudo vehicle speed $V_{FF}$ is computed is accordance with the equation (3). Further, at the steps S104, S105, determinations are made that the computed pseudo vehicle speed $V_{FF}$ is greater than the predetermined value $V_{FF1}$ and besides equal to or greater than the predetermined value $V_{FF2}$, so that the procedure is shifted to the step S107.

At a first sampling time after the condition for determining the different wheel using situation is fulfilled as mentioned above, if it is done before a determination is made that the directly connecting four wheel drive condition is to be inhibited, the procedure is shifted from the step S107 to the step S108, then since the predetermined hydraulic pressure detection signal $S_{A1}$ is not sent from the hydraulic pressure switch 23 except that the hydraulic pressure $A_1$ for the directly connecting four wheel drive condition is achieved at the time, the procedure is shifted from the step S108 to the step S109, thereby the control flag $F_4$ for indicating the starting of determination of the different wheel using situation is set to "1" (i.e. $F_4=1$).

It is noted that if the hydraulic pressure $A_1$ for the directly connecting four wheel drive condition is achieved with a detection of M=LOCK4 before the control flag $F_4$ becomes $F_4=1$ since a certain time is required to fulfill the condition for determining the different wheel using situation, the predetermined hydraulic pressure detection signal $S_{A1}$ is sent from the hydraulic pressure switch 23, so that the procedure is shifted from the step S108 to the step S111 through the step S110, thereby the determination of different wheel using situation is executed by changing of drive condition from the directly connecting four wheel drive condition to the automatic four wheel drive condition, by means of the same way as a case mentioned below in which the directly connecting four wheel drive mode is selected from starting of running of the vehicle.

When the control flag $F_4$ is set to $F_4=1$ at the step S109, the procedure is shifted from the step S109 to the step S113 through the step S112, thereby at the step S113, since the small diameter wheel is used as the rear wheel, a determination is made as $\Delta V_W > 0$, so that the procedure is shifted to step S114, and at the step S114, referring to the threshold curve shown in FIG. 14, the front and rear wheel rotating speed difference threshold $\Delta V_{W0}$ is determined in accordance with the pseudo vehicle speed $V_{FF}$, moreover at the step S116, the difference $\Delta V_W$ of rotating speed between the rear and front wheels is compared with the threshold $\Delta V_{W0}$ of front and rear wheel rotating speed difference.

At this time, if the difference $\Delta V_W$ becomes $\Delta V_W \geq \Delta V_{W0}$ in accordance with the difference of diameter between the small diameter wheel and the other wheels and with the pseudo vehicle speed $V_{FF}$, a determination is made that the difference $\Delta V_W$ is in the directly connecting four wheel drive condition inhibiting range, and the procedure is shifted to the step S117, then until the passed time $n3 \cdot \Delta T_S$ from starting of the determination of inhibiting of the directly connecting four wheel drive condition becomes the predetermined period $t_3$, the procedure is returned from the step S119 to the main program, remaining $F_4=1$, thereby the determination of inhibiting of the directly connecting four wheel drive condition is executed as long as the aforementioned condition is fulfilled.

Meanwhile, since the control flag $F_1$ becomes inevitably $F_1=0$ in case of $F_4=1$, in the second computing process shown in FIG. 17, the procedure is shifted in order of the steps S214, S215b, S215a, S217 and S213 as long as $F_4=1$, thereby at the step S211, $T_2=0$ is send out. It is noted that, during the procedure, if a determination is made that the difference $\Delta V_W$ is out of the directly connecting four wheel drive condition inhibiting range, the procedure is shifted from the step S116 to the step S118, then $F_4$ is set to $F_4=0$, and the procedure is returned to the main program, remaining $\Delta F_1=0$.

In this case, for example, the determination that the difference $\Delta V_W$ being out of the directly connecting four wheel drive condition inhibiting range is continued (repeated) due to no increase of the pseudo vehicle speed $V_{FF}$, so that, in the second computing process shown in FIG. 17, the procedure is shifted in order of the steps S215b, S216 and S218, thereby the front wheel side torque distribution instruction value $T_2=0$ which achieves the directly connecting four wheel drive condition, is sent out at the step S211, or the determination whether the difference $\Delta V_W$ being in the directly connecting four wheel drive condition inhibiting range or not is made again due to higher threshold $\Delta V_{W0}$ caused by increase of the pseudo vehicle speed $V_{FF}$.

When the determination that the difference $\Delta V_W$ being in the directly connecting four wheel drive condition inhibiting range is continued equal to or longer than the predetermined period $t_3$, the procedure is shifted from the step S119 to the stop S120, and the count value n3 of the counter n3 is reset to n3=0, then at the next step S121, the directly connecting four wheel drive condition inhibiting signal $S_N$ is sent out, and at the next step 5122, the control flag $F_1$ is set to "1" ($F_1=1$), further at the step S101b, the control flag $F_4$ is reset to "0" ($F_4=0$)

Thereby, in the second computing process shown in FIG. 17, the procedure is shifted from the step s202 to the step S214 through the step S204 since the drive mode detection value M read at the step S201 is "LOCK4", then at the step 214, a determination is made as $F_1=1$, so that the procedure is shifted to the step S215a, and the last drive mode detection value $M_0$ read at this time is $M_0=2$, so that the procedure is shifted from the step S217 to the step S213, and the front wheel side torque distribution instruction value $T_2$ is determined as "0", then at the step S211, $T_2=0$ is sent out.

As a result of this, as mentioned before, the control signal $CS_0$ corresponding to the front wheel side torque distribution instruction value $T_2$ indicating $T_2=0$ is sent to the drive circuit 31a, while the control signal $CS_1$ is not sent to the drive circuit 31b, so that the exciting current $i_0$ having the duty ratio D corresponding to the front wheel side torque distribution instruction value $T_2=0$ is supplied from the drive circuit 31a to the solenoid 120d of the duty control solenoid valve 128, while the exciting current $i_1$ is not supplied from the drive circuit 31b. Thereby, the solenoid selector valve 120, the pilot selector valve 126, the duty control solenoid valve 128 and the clutch pressure regulating valve 122 hold the clutch supply pressure $P_C$ lower than the predetermined hydraulic pressure $P_1$.

Thus, as mentioned before, since the friction plates 66b and the friction disks 66d do not frictionally contact with each other, the drive torque (drive force) is not transmitted to the front wheel side output shaft 24, so that the two wheel drive condition is continued, despite the directly connecting four wheel drive mode being selected by means of the operation of select switch.

Besides, the directly connecting four wheel drive condition inhibiting signal $S_N$ is sent to the warning device 27 through the output interface circuit 7d, then the situation that the directly connecting four wheel drive condition being inhibited due to using of a different diameter wheel is notified to the driver by means of the warning device 27, by lighting on and off of a lamp and/or sound. Moreover, the drive condition signal $S_K$ indicating the two wheel drive condition is sent to the indicator 25, so that "2WD" (a data indicating the two wheel drive condition) is indicated by the indicator 25.

Next, assumed is a case that, during the vehicle with the four wheel drive system of this embodiment using a small diameter emergency wheel as one of the front wheels corresponding to the subsidiary drive wheels, is running at a constant speed an high μ (friction coefficient) road in the automatic four wheel drive mode in which the front wheel side torque distribution has been less than 50% (i.e. in a drive condition except the directly connecting four wheel drive condition), a vehicle speed as the pseudo vehicle speed $V_{FF}$ becomes equal to or over the predetermined value $V_{FF2}$, and at this time a driver of the vehicle selects the directly connecting four wheel drive mode by an operation of the select switch. It is further assumed that the front and rear wheel rotation sensors 17F, 17R are normally operating, while the shift sleeve 64b of the subsidiary speed change mechanism 58 is in the high speed shift position H, and the select lever of the subsidiary speed change mechanism 58 is not operated at the time of operation of the select switch.

In this case, at the step S100 in the first computing process shown in FIG. 16, a determination is made that the detection signal $S_H$ is sent from the high speed shift position sensor 86 and besides the detection signal $S_L$ is not sent from the low speed shift position sensor 88, and at the stop 101a, a determination is made that neither of the failure signals $S_{FF}$, $S_{FR}$ is sent, so that the procedure is shifted to the step S102 in which the front wheel rotation detection value nF and the rear wheel rotation detection value nR are read, then at the steps S104, S105, determinations are made that the pseudo vehicle speed $V_{FF}$ computed at the step S103 is greater than the predetermined value $V_{FF1}$ and besides equal to or greater than the predetermined value $V_{FF2}$, so that the procedure is shifted to the stop S107, similarly to the aforementioned case.

At a first sampling time after the condition for determining the different wheel using situation is fulfilled as mentioned above, if it is done before a determination is made that the directly connecting four wheel drive condition is to he inhibited, the procedure is shifted from the step S107 to the step S108, then since the predetermined hydraulic pressure detection signal $S_{A1}$ is not sent from the hydraulic pressure switch 23 except that the hydraulic pressure $A_1$ for the directly connecting four wheel drive condition is achieved at the time, the procedure is shifted from the step S108 to the step S109, thereby the control flag $F_4$ for indicating the starting of determination of the different wheel using situation is set to "1" (i.e. $F_4$=1).

It is noted that if the hydraulic pressure $A_1$ for the directly connecting four wheel drive condition is achieved with a detection of M=LOCK4 before the control flag $F_4$ becomes $F_4$=1 since a certain time is required to fulfill the condition for determining the different wheel using situation, the predetermined hydraulic pressure detection signal $S_{A1}$ is sent from the hydraulic pressure switch 23, so that the procedure is shifted from the step S108 to the step S111 through the step S110, thereby the determination of different wheel using situation is executed by changing of drive condition from the directly connecting four wheel drive condition to the automatic four wheel drive condition, by means of the same way as a case mentioned below in which the directly connecting four wheel drive mode is selected from starting of running of the vehicle.

When the control flag $F_4$ is set to $F_4$=1 at the Step S109, the procedure is shifted from the step S109 to the step S113 through the step S112, thereby at the step S113, since the small diameter wheel is used as the front wheel, a determination is made as $\Delta V_W \leq 0$, so that the procedure is shifted to step S115, and at the step S115, referring to the threshold curve shown in FIG. 15, the front and rear wheel rotating speed difference threshold $\Delta V_{W0}$ is determined in accordance with the pseudo vehicle speed $V_{FF}$, moreover at the step S123, the difference $\Delta V_{W0}$ of rotating speed between the rear and front wheels is compared with the threshold $\Delta V_{W0}$ of front and rear wheal rotating speed difference.

At this time, if the difference $\Delta V_W$ becomes $\Delta V_W \leq \Delta V_{W0}$ in accordance with the difference of diameter between the small diameter wheel and the other wheels and with the pseudo vehicle speed $V_{FF}$, a determination is made that the difference $\Delta V_W$ is in the directly connecting four wheel drive condition inhibiting range, and the procedure is shifted to the step S117, then until the passed time $n3 \cdot T_S$ from starting of the determination of inhibiting of the directly connecting four wheel drive condition becomes the predetermined period $t_3$, the procedure is returned from the step S119 to the main program, remaining $F_4$=1, thereby the determination of inhibiting of the directly connecting four wheel drive condition is executed as long as the aforementioned condition is fulfilled.

Meanwhile, since the control flag $F_1$ becomes inevitably $F_1$=0 in case of $F_4$=1, in the second computing process shown in FIG. 17, the procedure is shifted in order of the steps S214, S215b, S215a, S217 and S203 as long as $P_4$=1, thereby, with the procedure at the step S203 and the steps below, the automatic four wheel drive condition is continued. It is noted that, during the procedure, if a determination is made that the difference $\Delta V_W$ is out of the directly connecting four wheel drive condition inhibiting range, the procedure is shifted from the step S123 to the step S118, then $F_4$ is set to $F_4$=0, and the procedure is returned to the main program, remaining $F_1$=0.

In this case, for example, the determination that the difference $\Delta V_W$ being out of the directly connecting four wheel drive condition inhibiting range is continued (repeated) due to no increase of the pseudo vehicle speed $V_{FF}$, so that, in the second computing process shown in FIG. 17, the front wheel side torque distribution instruction value $T_2$=50 which achieves the directly connecting four wheel drive condition, is sent out at the step S211 by the same way as the aforementioned case, or the determination whether the difference $\Delta V_W$ being in the directly connecting four wheel drive condition inhibiting range or not is made again due to higher threshold $\Delta V_{W0}$ caused by increase of the pseudo vehicle speed $V_{FF}$.

When the determination that the difference $\Delta V_W$ being in the directly connecting four wheel drive condition inhibiting range is continued equal to or longer then the predetermined period $t_3$, the procedure is shifted from the step S119 to the step S120, and the court value n3 of the counter n3 is reset to n3=0, then at the next step S121, the directly connecting four wheel drive condition inhibiting signal $S_N$ is sent out, and at the next step S122, the control flag $F_1$ l is set to "1" ($F_1$=1), further at the step S101b, the control flag $F_4$ is reset to "0" ($F_4$=0).

Thereby, in the second computing process shown in FIG. 17, the procedure is shifted from the step s202 to the step S214 through the step S204 since the drive mode detection value H read at the step S201 is "LOCK4", then at the step 214, a determination is made as $F_1$=1, so that the procedure is shifted to the step S215a, and the last drive mode detection value $M_0$ read at this time is $M_0$=AUTO4, so that the procedure is shifted from the step s217 to the step S203. Then, at the step S205, the difference $\Delta V_W$ of rotating speed between the rear and front wheels is computed from the front wheel rotation detection value nF and the gear wheel rotation detection value nR read at the step S203, and at the next step S206, referring to the characteristic curve shown in FIG. 13, the front wheel side torque distribution instruction value $T_2$ is determined in accordance with the difference $\Delta V_W$ of rotating speed between the front and rear wheels computed at the step 205, subsequently, the procedure is shifted to the step S207. Since $F_1=1$ at this time, the procedure is further shifted from the step S207 to the step S208, and at the step S208, if the front wheel side torque distribution instruction value $T_2$ determined at the step S206 is "50" indicating the directly connecting four wheel drive condition, the procedure is shifted to the step S210, and at the step S210, the front wheel side torque distribution instruction value $T_2$ is determined as $T_2=B$ (the upper limit loss than "50"), then the procedure is shifted to the step S211, on the other hand if the front wheel side torque distribution instruction value $T_{2 \neq 50}$ at the step S208, the procedure is shifted to the step S211 as it is, thereby, at the step S211, $T_2=8$ or $T_2$ (loss than "50") determined at the step S206 is sent out.

As a result of this, an mentioned before, the control signal $CS_0$ corresponding to the front wheel side torque distribution instruction value $T_2$ indicating $T_{2\ (T2}<50)$ is sent to the drive circuit 31a, while the control signal $CS_1$ is sent to the drive circuit 31b, so that the exciting current $i_0$ having the duty ratio D corresponding to the front wheel side torque distribution instruction value $T_2$ ($T_2<50$) is supplied from the drive circuit 31a to the solenoid 128d of the duty control solenoid valve 128, while the exciting current $i_1$ corresponding to the current value $I_K$ is supplied from the drive circuit 31b to the solenoid 120d of the solenoid selector valve 120. Thereby, as mentioned before, the solenoid selector valve 120, the pilot selector valve 125, the duty control solenoid valve 128 and the clutch pressure regulating valve 122 hold the condition in which the clutch supply pressure $P_C$ in accordance with the front wheel side torque distribution instruction value $T_2$ ($T_2<50$) is supplied from the pilot selector valve 125.

Thus, as mentioned before, since the friction plates 66b and the friction disks 66d frictionally contact with each other generating a friction force in accordance with the clutch supply pressure $P_C$, the drive torque (drive force) in accordance with the friction force drives the clutch hub 66c of the friction clutch 56 to rotate the clutch hub 66c. Then the drive torque (drive force) is transmitted through the gear train to the front wheel side output shaft 24, and further transmitted through the front wheel side drive force transmitting system to the front wheels 12FL, 12FR, so that a drive force transmitted to the rear wheels 12RL, 12RR is reduced due to the drive force transmitted to the front wheels, thus, the automatic four wheel drive condition except the directly connecting four wheel drive condition is continued, in accordance with the front wheel side torque distribution instruction value $T_2$ ($T_2<50$).

Beside, the directly connecting four wheel drive condition inhibiting signal $S_N$ is sent to the warning device 27 through the output interface circuit 7d, then the situation that the directly connecting four wheel drive condition being inhibited due to using of a different diameter wheel is notified to the driver by means of the warning device 27, by lighting on and off of a lamp and/or sound. Moreover, the drive condition signal $S_K$ indicating the automatic four wheal drive condition is sent to the indicator 25, go that "AUTO4WD" (a data indicating the automatic four wheel drive condition) is indicated by the indicator 25.

Further, assumed is a case that, during the vehicle with the four wheel drive system or this embodiment using a small diameter emergency wheel as one of the front wheels corresponding to the subsidiary drive wheels and having been in the directly connecting four wheel drive condition from starting of running, is running at a constant speed on high $\mu$ (friction coefficient) road, a vehicle speed as the pseudo vehicle speed $V_{FF}$ becomes equal to or over the predetermined value $V_{FF2}$. It is further assumed that the front and rear wheel rotation sensors 17P, 17R are normally operating, while the shift sleeve 64b of the subsidiary speed change mechanism 58 is in the high speed shift position H, and the select lever of the subsidiary speed change mechanism 38 is not operated at the time of operation of the select switch.

In this case, at the step S100 in the first computing process shown in FIG. 16, a determination is made that the detection signal $S_H$ is sent from the high speed shift position sensor 86 and besides the detection signal $S_L$ is not sent from the low speed shift position sensor 88, and at the step 101a, a determination is made that neither of the failure signals $S_{FF}$, $S_{FR}$ is sent, so that the procedure is shifted to the step S102 in which the front wheel rotation detection value nF and the rear wheel rotation detection value nR are read, then at the steps S104, S105, determinations are made that the pseudo vehicle speed $V_{FF}$ computed at the step S103 is greater than the predetermined value $V_{FF1}$ and besides equal to or greater than the predetermined value $V_{FF2}$, so that the procedure is shifted to the step S107, similarly to the aforementioned case.

At a first sampling time after the condition for determining the different wheel using situation is fulfilled as mentioned above, if it is done before a determination is made that the directly connecting four wheel drive condition is to be inhibited, the procedure is shifted from the step S107 to the step S108. Though, in this case, the vehicle is running in the directly connecting four wheel drive mode, consequently, since the predetermined hydraulic pressure detection signal $S_{A1}$ is sent from the hydraulic pressure switch 23 at this time, the procedure is shifted from the step S118 to the step S111 through the step S110. Therefore, by the procedure at the steps S111, S124 to S139, the changing of drive condition to the automatic four wheel drive condition is executed after the determination has been made whether changing of drive condition from the directly connecting four wheel drive condition to the automatic four wheel drive condition can be executed or not, then, after the changing of drive condition to the automatic four wheel drive condition has been executed, and besides, after the predetermined period $t_2$ enough to cause a difference of rotating speed between the front and rear wheels has been passed from the changing of drive condition to the automatic four wheel drive condition, the determination of different wheel using situation is executed in the automatic four wheel drive condition.

That is, when a condition in which variance of the pseudo vehicle speed $V_{FF}$ being in the predetermined range ($\pm \Delta V_{FF}$) is continued equal to or longer than the predetermined period $t_1$ the procedure is shifted from the step S130 to the step S133 through the steps S131, S132, and at the step S133, the control flag $F_3$ is set to $F_3=1$, thereby, in the second computing process shown in FIG. 17, the procedure is shifted from the step S216 to the step S212, then at the step S212, the front wheel side torque distribution instruction value $T_2$ is determined as the instruction value $A_0$ to achieve a minimum torque by the automatic four wheel drive condition, and at the next step S211, $T_2=A_0$ is sent out.

As a result of this, the exciting current $i_0$ supplied from the drive circuit 31a becomes corresponding to the front wheel side torque distribution instruction value $T_2=A_0$, thereby, as mentioned before, owing to the solenoid selector valve 120, the pilot selector valve 126, the duty control solenoid valve 128 and the clutch pressure regulating valve 122, the clutch supply pressure $P_C$ in accordance with the front wheel side torque distribution instruction value $T_2=A_)$ is supplied to the clutch 66, so that the minimum torque by the automatic four wheel drive condition corresponding to the value $A_0$ is distributed to the front wheels.

When the predetermined period $t_2$ is passed during the above-mentioned automatic four wheel drive condition with minimum torque, the procedure is shifted from the step S135 to the step S137 through the step S136, at the step S137, the control flag $F_3$ is reset to $F_3=0$, then the procedure is shifted to the step S109, and the control flag $F_4$ is set to $F_4=1$, thereby, the determination of different wheel using situation is executed in the automatic four wheel drive condition. By the determination of different wheel using situation, when a determination is made that the vehicle is to be inhibited from the directly connecting four wheel drive condition, since the control flag $F_1$ is set to $F_1=1$ as mentioned before, if the front wheel side torque distribution instruction value $T_2$ determined at the step 206 in accordance with the difference $\Delta V_W$ of rotating speed between the front and rear wheels is less than "50", the front wheel side torque distribution instruction value $T_2$ is determined as it is, while if the front wheel side torque distribution instruction value $T_2$ is determined as $T_2=50$ at the step 206, the front wheel side torque distribution instruction value $T_2$ is determined as $T_2=B$ (the upper limit less than "50") at the step S210, then, in one way or another, the front wheel side torque distribution instruction value $T_2$ less than 50 is sent out at the step S211, so that a drive condition of the vehicle becomes or continues the automatic four wheel drive condition.

Besides, the directly connecting four wheel drive condition inhibiting signal $S_N$ is sent to the warning device 27 through the output interface circuit 7d, then the situation that the directly connecting four wheel drive condition being inhibited due to using of a different diameter wheel is notified to the driver by means of the warning device 27, by lighting on and off of a lamp and/or sound. Moreover, the drive condition signal $S_K$ indicating the automatic four wheel drive condition is sent to the indicator 25, so that "AUTO4WD" (a data indicating the automatic four wheel drive conditions) is indicated by the indicator 25.

Thus, with this embodiment, during running of a vehicle, when a determination is made that the detected difference $\Delta V_W$ of rotating speed between the front and rear wheels has been in the directly connecting four wheel drive condition inhibiting range for the predetermined period due to the different diameter wheel using situation, changing from other drive conditions to the directly connecting four wheel drive condition is inhibited and the driving condition up to the present is continued, and besides, if the drive condition up to the present is the directly connecting four wheel drive condition, the drive condition is changed to the automatic four wheel drive condition. Thereby, in case of using of the different diameter wheel, a deterioration of stability and an increase of load of power train system caused by the directly connecting four wheel drive condition can be prevented. Further, when the front and/or rear wheel rotation sensors are operating abnormally, the directly connecting four wheel drive condition inhibiting operation is not carried out, so that, the determination relating to the directly connecting four wheel drive condition inhibiting range can be carried out exactly, thereby, a needless inhibiting of the directly connecting four wheel drive condition can be prevented.

Further, with this embodiment, the directly connecting four wheel drive condition is not always inhibited despite the different diameter wheel using situation, a requirement of the directly connecting four wheel drive condition is considered, and the directly connecting four wheel drive condition inhibiting range for the different diameter wheel using situation is determined by using the front and rear wheel rotating speed difference threshold $\Delta V_{W0}$ of the difference $\Delta V_W$ determined in accordance with a vehicle speed, Therefore, when the degree of deterioration of stability and increase of load of power train system caused by the directly connecting four wheel drive condition is seemed to be small, despite the different diameter wheel using situation, the directly connecting four wheel drive condition is allowed, so that the four wheel drive system of this embodiment is very practical.

Therefore, in this embodiment, the steps S102, S112 to S120 and S123 in FIG. 16 with the front and rear wheel rotation sensors 17F, 17R constitute the different wheel using situation detecting means. The step S121 in FIG. 16 and the steps S214, S215a, S207, S208 and S210 in FIG. 17 correspond to the directly connecting four wheel drive condition inhibiting means. The step S108 in FIG. 16 with the hydraulic pressure switch 23 constitutes the directly connecting four wheel drive condition detecting means. The step S133 in FIG. 16 and the steps S216, S209 and S212 in FIG. 17 correspond to the drive force distribution changing means. The drive mode switch 21 and the step S201 constitute the drive mode detecting means. The controller 18 corresponds to the drive force distribution control means. Further, the transfer 22 and the hydraulic pressure supply device 16 correspond to the drive force distribution adjusting means, It is noted that, though the detailed explanation is made about a four wheel drive vehicle based an a rear wheel drive vehicle in the aforementioned embodiment, the present invention is not limited to such a rear wheel drive based four wheel drive vehicle, but can be applied to a four wheel drive vehicle based on a front wheel drive vehicle. In such a case, the difference $\Delta V_W$ of rotating speed between the front and rear wheels is computed by $\Delta V_W=nF-nR$, and the characteristic curve in FIG. 13 is changed to the one corresponding to this case.

Figure 18:
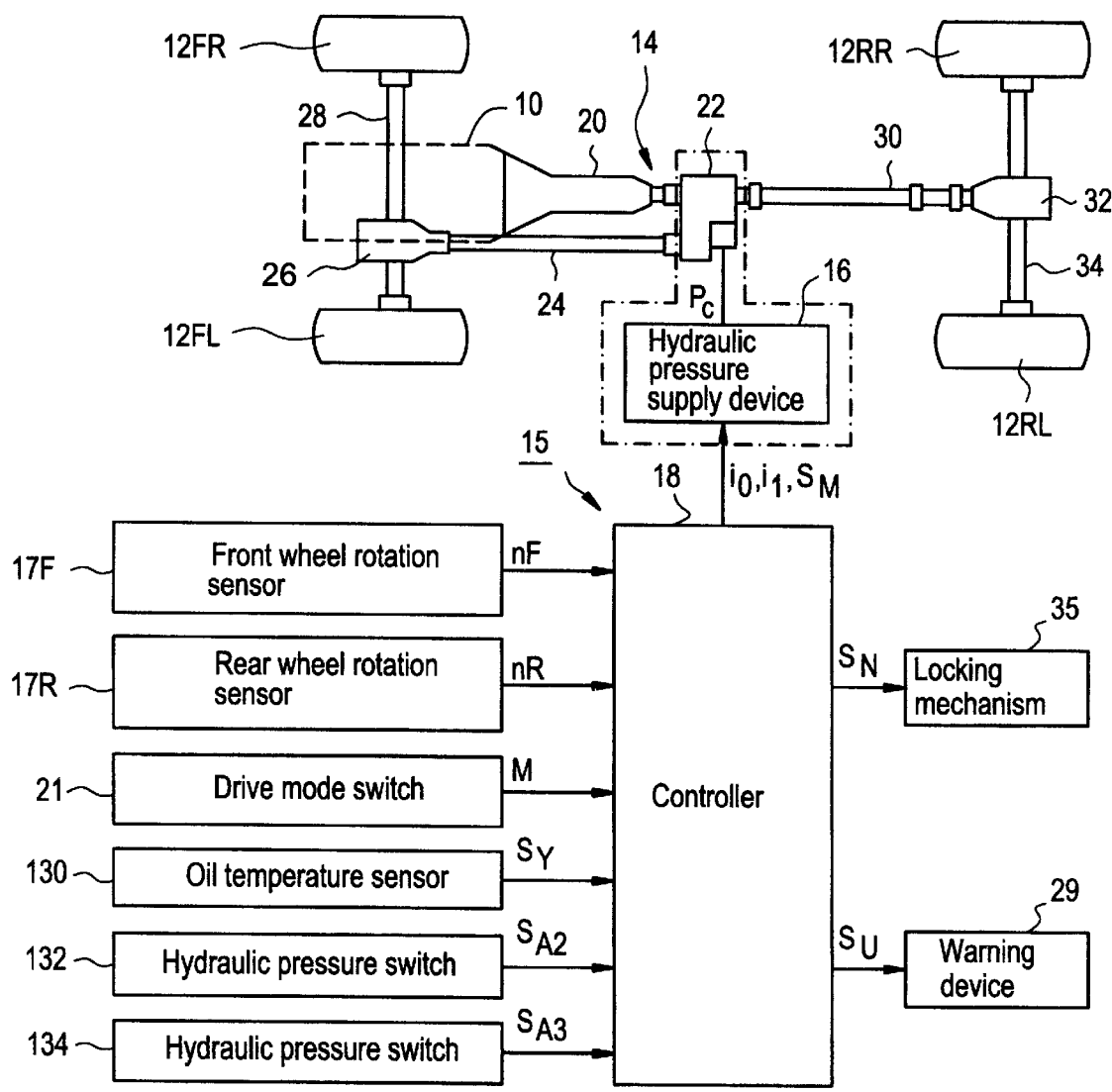
FIG. 18 is a schematic view illustrating the basic arrangement of transmission system of a vehicle according to another preferred embodiment of the present invention.

FIG. 18 shows a part-time four wheel drive system for an automotive vehicle of another preferred embodiment of the present invention, based upon an FR (front-engine and rear-drive) system. The four wheel drive system enables a driver of the vehicle to select a drive mode by operation of a select switch (not-shown), among a two wheel drive mode in which a drive force distribution between main drive wheels (i.e. rear wheels) and subsidiary drive wheels (i.e. front wheels) is fixed as 100%:0%, an automatic four wheel drive mode in which a drive force distribution between the main drive wheels and the subsidiary drive wheels is automatically determined in accordance with a difference of rotating speed between the front and rear wheels, and a directly connecting four wheel drive mode in which a drive force distribution between the main drive wheels and the subsidiary drive wheels is fixed as 50%:50%. The four wheel drive system comprises a subsidiary speed change mechanism, and enables the driver to select a shift position of the subsidiary speed change mechanism by operation of a select lever (not-shown). It is noted that the select lever of the subsidiary speed change mechanism is provided with a below-mentioned locking mechanism which inhibits the select lever (shift lever) from being shifted to a low speed shift position in accordance with a predetermined control signal.

The four wheel drive system of this embodiment has a constitution similar to that of the aforementioned embodiment shown in. FIGS. 5 to 9. That, is, the four wheel drive system incorporates an engine 10 as a rotary drive source, a drive force transmission system 14 which is capable of changing of the distribution ratio of drive force transmitted to front left to rear right wheels 12FL to 12RR, and a drive force distribution control device 13 for controlling the changing of the drive force distribution ratio by the transmission system 14.

The transmission system 14 comprises a speed change gear 20 for shifting the drive force from the engine 10 with a selected gear ratio, and a transfer 22 for distributing the drive force from the speed change gear 20, between the front wheels 12FL, 12FR and the rear wheels 12RL, 12RR. In the transmission system 14, a front wheel side drive force into which the transfer 22 distributes the drive force, is transmitted to the front wheels 12FL, 12FR by way of a front wheel side output shaft 24, a front differential gear 26 and front side drive shafts 28. Meanwhile, a rear wheel side drive force is transmitted to the rear wheels 12RL, 12RR by way of a propeller shaft (rear wheel vide output shaft) 30, a rear differential gear 32 and drive shafts 34. Therefore, in the four wheel drive system of the embodiment, the rear wheels 12RL, 12RR are the main drive wheels while the front wheels 12FL, 12FR are the subsidiary drive wheels as mentioned above. Incidentally, the speed change gear 20 may be a conventional automatic transmission.

Referring to FIG. 6 which shows the interior structure of the transfer 22 having a transfer casing 40 in which an input shaft 42 and a first output shaft 44 are laid, being axially opposed to each other, the input shaft 42 is rotatably supported to a front casing section 40a of the transfer casing 40 by means of a radial bearing 46, while the first output shaft 44 is rotatably supported to a rear casing section 40b of the transfer casing 40 by means of a radial bearing 48, and accordingly, the shafts 42, 44 can be rotated, relative to each other. A second output shaft 54 is rotatably supported by means of bearings 50, 52 which are fitted respectively in the front and rear casing sections 40a, 40b, in parallel with the input shaft 42 and the first output shaft 44. It is noted that the input shaft 42 is coupled to an output shaft 56 of the speed change gear 20, the first output shaft 44 is coupled to the rear wheel side output shaft 30, and the second output shaft 54 is coupled to the front wheel side output shaft 24.

Further, the aforementioned subsidiary speed charge mechanism 58 and a variable torque distribution mechanism (a two and four wheel drive change-over mechanism) 60 for changing a drive condition between a two wheel drive condition and a four wheel drive condition and for adjusting a transmitting torque, are provided to the input shaft 42 and the first-output shaft 44, respectively.

The subsidiary speed change mechanism 58 is composed of a planetary gear mechanism 62 and a meshing clutch type high and low speed change-over mechanism 64 which is laid, coaxial with this planetary gear mechanism 62.

The planetary gear mechanism 62 is composed of a sun gear 62 formed around the outer periphery of the input shaft 42, an internal gear 62b fixed in the front casing section 40a, pinion gears 62c meshed with the sun gear 62a and the internal gear 62b, and a pinion carrier 62d which rotatably supports the pinion gears 62c.

Further, the high and low speed change-over mechanism 64 is composed of a shift sleeve 64b which is axially slidable due to the spline-coupling between internal teeth 54b1 and a plurality of key grooves formed around an outer periphery of the first-output shaft 44 and which has external tooth 64b2 formed around its outer periphery, a high speed shift gear 64c formed around an outer periphery of the input shaft shaft 42 and adapted to be meshed with the internal tooth 64b1 of the shift sleeve 64b, and a low speed shift gear 64d formed on the inner peripheral part or the pinion carrier 62d and adapted to be meshed with the external teeth 64b2 of the shift sleeve 64b.

FIG. 7 shows an enlarged view of a part relating to the high and low speed changeover mechanism 64. In the high and low speed change-over mechanism 64, when the shift sleeve 64b is slid to a high speed sift position H as indicated by the real line shown in the upper half of FIG. 7, the high speed shift gear 64c is meshed with the internal teeth 64b1. On the other hand, when the shift sleeve 64b is slid to a low speed shift position L as shown in the lower half of FIG. 7, the low speed shift scar 64d is meshed with the external teeth 64b2. Further, when the shift sleeve 64b is slid to a neutral position N as indicated by the two-dot chain line shown in the upper half of FIG. 7, the internal teeth 64b1 and the external teeth 64b2 are not meshed with any of other gears in the high and low speed change-over mechanism 64.

Referring again FIG. 6, the variable torque distribution mechanism 60 is composed of a wet type multi-disc friction clutch (which will be hereinbelow denoted as "friction clutch" or "clutch" simply) 66 as a variable torque clutch for changing the distribution ratio of drive force between the front and rear wheels in accordance with supplied hydraulic pressure, a first sprocket 68 rotatably fitted on the first output shaft 44, a second sprocket 70 coupled coaxially with the second output shaft 54, and a chain 72 wound on and stretched between the first and second sprockets 68, 70.

The friction clutch 66 is composed of a clutch drum 66a coupled to the first sprocket 68, friction plates 66b spline-coupled to the clutch drum 66a, a clutch hub 66c spline-coupled with the outer periphery of the first input shaft 44, friction discs 66d integrally coupled with the clutch hub 66c and interposed between the clutch plates 66b, a rotary member 66e arranged around the cater periphery of the first output shaft 44 and adapted to be moved toward the clutch drum 66a so as to bring the friction plates 66b and the friction discs 66d into contact with one another, pins 66c integrally coupled to the clutch hub 66c so an to engage the clutch hub 66c with the rotary member 66c, a clutch piston 66h mounted to the internal wall of the rear casing section 40b and adapted to be axially moved, a thrust bearing 66f for transmitting the axial movement of the clutch piston 66g to the rotary member 66c, a cylinder chamber 66h defined between the inner walls of the clutch piston 66g and the rear casing section 40b, and a return spring 66j urging the rotary member 66e toward the clutch piston 66g.

In the friction clutch 66, when the clutch pressure $P_C$ is fed from a hydraulic pressure supply device 16 shown in FIG. 5 to an inlet port 74 formed in the rear casing section 40b and communicated with the cylinder chamber 66h, the clutch piston 66g is moved to the left in FIG. 6 by a pressing force generated in the cylinder chamber 66h, and accordingly, the movement of the clutch piston 66g is transmitted to the rotary member 66e through the thrust bearing 66f. Thus, tne friction plates 66b and the friction discs 66d which have been separated from one another are brought into contact with one another since the friction discs 66d is moved, and accordingly, a fastening force in accordance with the clutch pressure $P_C$ is effected by the friction force therebetween. Therefore, the rotary drive force of the first output shaft 44 is transmitted to the second output shaft 54 through the first sprocket 68, the chain 72 and the second sprocket 70 at a predetermined torque distribution ratio in accordance with the fastening force of the friction clutch 66.

On the other hand, when the clutch pressure $P_C$ to be fed, is lowered so that the rotary member 66e and the clutch piston 66g is moved toward the right in FIG. 6 by the urging force of the return spring 66j, resulting in separation between the friction plates 66b and the friction discs 66d, no rotary drive force of the first output shaft 44 is transmitted to the second output shaft 54.

Further, a four wheel drive gear 80 is incorporated to the first sprocket 68 around the outer periphery thereof beside the shift sleeve 64b. When the shift sleeve 64b is slid to the aforementioned low speed shift position L as shown in the lower half of FIG. 7, the four wheel drive gear 80 is meshed with the internal tooth 64b1, in addition to the meshing between the external teeth 64b2 and the low speed shift gear 64d. With this arrangement, the shift sleeve 64 and the four wheel drive gear 80 constitute a dog clutch for forcing the first output shaft 44 and the second output shaft 54 to be coupled with each other at the low speed shift position. That is, when the low speed shift position L is selected by the select lever, the vehicle becomes in the four wheel drive condition since a drive torque is inevitably distributed to the front wheels.

The shift sleeve 64b in the high and low speed change-over mechanism 64 of the meshing clutch type, is slid to the high speed shift position H, the neutral position N or the low speed shift position L through a fork (only the front end part 84 of the fork is shown in FIGS. 6, 7) by manual operation of the select lever of the subsidiary speed change mechanism 58. In this arrangement, a high speed shift position sensor 86 for detecting the shift sleeve 64b which has been slid to the high speed shift position H, and a low speed shift position sensor 88 for detecting the shift sleeve 64b which has been slid to the low speed shift position L are located in the front casing section 40a. The high speed shift position sensor 86 and the low speed shift position sensor 88 send respectively a detection signal $S_H$ and a detection signal $S_L$ to the controller 18 at any suitable time, so that the controller 18 is capable of carrying out a predetermined control procedure based on the shift positions of the subsidiary speed change mechanism.

Further, in this embodiment, the aforementioned locking mechanism 35 shown in FIG. 18 for inhibiting the select lever (shift lever) from being shifted to a low speed shift position in accordance with a predetermined control signal $S_N$, is provided on a moving path of the shift lever of the subsidiary speed change mechanism. The locking mechanism 35 may consist of e.g. a mechanism by which a pin is pushed out into the moving path of the shift lever when the control signal $S_N$ is ON, and the pin is drawn back from the moving path of the shift lever when the control signal $S_N$ is OFF.

FIG. 8 shows a block diagram illustrating a constitution of hydraulic circuit of the above-mentioned hydraulic pressure supply device 16 for controlling the operation of the friction clutch 66.

The hydraulic pressure supply device 16 includes, as hydraulic pressure sources, a reversible rotation type main pump directly coupled to the first output shaft 44 which, in turn, in coupled to the output shaft 56 of the speed change gear 20 through the input shaft 42, and a one-way rotation type subpump 104 connected in parallel with the main pump 100 and rotated by an electric motor 102 as a power source. The main pump 100 and the subpump 104 suck up hydraulic oil from an oil tank 105 through strainers 106a, 108a, and delivers the same into discharge lines 106b, 108b. A manifold line 110a to which the discharge lines 106b, 108b converge, is connected with an oil filter element 112 which, in turn, is connected at the upstream side thereof (the main pump 100 and the subpump 104 side) with one end of a relief passage 116 connected at the ether end thereof to a lubrication system 114.

The oil filter element 112 is also connected on the downstream side thereof (the transfer 22 side) with a line pressure regulating valve 118, and lines 110b, 110c, 110e branching off from the, manifold line 110a are connected with the inlet sides of a solenoid selector value 120, a clutch pressure regulating valve 122 and a pressure reducing valve 124, respectively. The clutch pressure regulating valve 122 is connected on the outlet side thereof with the inlet aide of a pilot selector valve 126 for feeding the clutch pressure $P_C$ to the friction clutch 66 of the transfer 22 when a pilot pressure is fed thereto from the solenoid selector valve 120, and the pressure reducing valve 124 is connected on the outlet side thereof with the inlet side of a duty control solenoid valve 128.

It is noted that a temperature sensor 130 for detecting a temperature of hydraulic oil is located in the oil tank 105, and further, a hydraulic pressure switch 132 for detecting a pressure to which the line pressure regulating valve 118 decreases the line pressure, and a hydraulic pressure switch 134 for detecting the clutch pressure $P_C$ delivered from the pilot selector valve 126, are also provided, these sensor and switches sending their detection signals to the controller 18.

Incidentally, the hydraulic pressure supply device 16 is located in the transfer 22 in the case of an actual vehicle, the main pump 100 for sucking up hydraulic oil from the oil tank 105 is coupled to the first output shaft 44 through a first gear 136a and a second gear 136b as shown in FIG. 6, and the subpump 104 is coupled to the electric motor 102 externally attached to the transfer casing 40.

Next, detailed description will be made about constitutions and actions of the components of the hydraulic pressure supply device 16, with reference mainly to FIG. 8.

The main pump 100 on normal rotation sucks up hydraulic oil from the oil tank 105 through the strainer 106a connected to one end of a suction line 106c, and the subpump 104 also sucks up hydraulic oil from the oil tank 105 through the strainer 108a connected to one end of a suction line 108c. Further, check valves 106d, 108d are connected in the pump discharge lines 106b, 108b connected to the manifold line 110a, respectively, and a bypass passage 140 is connected between the discharge line 106b of the main pump 100 and the suction line 108c of the subpump 104. The bypass passage 140 is composed of a bypass line 140a and a triple-check valve 140b interposed in the bypass line 140a. The check valve 140b is opened when a pressure in the discharge line 106b becomes negative due to counter rotation of the main pump 100, thus a communication passage through which hydraulic oil flows in the arrow indicated by the broken line is established, A relief passage 116 connected to the manifold line 110a at upstream side of the oil filter element 112, is composed of a relief line 116a connected at the other end to the lubrication system 114, and a spring-loaded twin-check valve 116b interposed in the relief line 116a. If a filter in the oil filter element 112 clogs, so that the pressure at upstream side of the oil element 112 exceeds a predetermined pressure, the check valve 116b opens so as to establish a communication passage through which hydraulic oil flows in the arrow indicated by the broken line.

The line pressure regulating valve 118 consists of an internal pilot and spring-operated type pressure reducing valve, including a spool slidably fitted in a cylindrical valve housing having an inlet port 118A connected to the manifold line 110a, an outlet port 118B connected to the lubrication system 114, and internal pilot ports $118_{p1}$, $118_{p2}$ to which primary and secondary pressures are fed from the inlet and outlet ports 118A, 118b through fixed restrictors, the spool being urged toward one end side of the valve housing by a return spring 118a.

A supply pressure $P_L$ raised by the main pump 100 or the subpump 104 is regulated to a predetermined pressure by the line pressure regulating valve 118, and then is fed to the solenoid selector valve 120, the clutch pressure regulating valve 122 and the pressure reducing valve 124. It is noted that hydraulic oil which is discharged from the output port 118B when the pressure $P_L$ is reduced to the predetermined pressure, is returned to the lubrication system 114.

The clutch pressure regulating valve 122 consists of an internal and external pilot and spring-operated type pressure regulating valve, including a spool slidably fitted in a cylindrical valve housing having an inlet port 122A connected. to the line 110c, an outlet port 122B connected to the pilot selector valve 126, an internal pilot port $122_{p1}$ to which secondary pressure is fed as a pilot pressure from the outlet port 122B through a fixed restrictor, and an external pilot port $122_{P2}$ to which a control pressure is fed from the duty control solenoid valve 129, the spool being urged toward one end side of the valve housing by a return spring 122a. The clutch pressure regulating valve 122 does rot feed a secondary pressure since a communication passage between the inlet port 122A and the outlet port 122B is blocked when no pilot control pressure is fed from the duty control solenoid valve 128. On the other hand, when the pilot control pressure is fed from the duty control solenoid valve 128, the spool is moved under control, so that a secondary pressure in accordance with the pilot control pressure, is fed as the clutch pressure $P_C$ from the outlet port 122B.

The pressure reducing valve 124 consists of an internal pilot and spring-operated type and constant secondary pressure type pressure reducing valve, including a spool slidably fitted in a cylindrical valve housing having an inlet port 124A connected to the line 110e, an outlet port 124D, connected to the duty control solenoid valve 128, an internal pilot port 124P to which a secondary pressure is fed, as a pilot control pressure, through a fixed restrictor from the outlet port 124B, and a drain port 124P, the spool being urged to one end side of the valve housing by a return spring 124a. When the spool is moved under control to a predetermined position by the pilot control pressure fed to the internal pilot port 124P, a primary pressure fed from the inlet port 124A is fed, as a control pressure reduced and regulated to a predetermined pressure, to the duty control solenoid valve 128.

The duty control solenoid valve 128 is of a three port and two position type, having an inlet port 128A connected to the pressure reducing valve 124, and a drain port 128D connected to a drain, an outlet port 128B connected to the external pilot port $122_{p2}$ of the clutch pressure regulating valve 122, a return spring 128a, and a spool located in the valve. The spool is moved under control between a normal position 128b where the outlet port 128B is communicated to the drain port 128D, and an operating position 128c where the inlet port 128A is communicated with the outlet port 128B. In the duty control solenoid valve 128, when the controller 18 supplies an exciting current $i_0$ having a required duty ratio to a solenoid 128d, the spool is moved under control from the normal position 128b to the operating position 128c, overcoming the return spring 128a during a period in which the exciting current $i_0$ is supplied, thereby the pilot control pressure in accordance with the duty ratio is fed to the clutch pressure regulating valve 122. Accordingly, the clutch pressure regulating valve 122 feeds the clutch pressure $P_C$ in accordance with a pilot control pressure which is fed to the external pilot port $122_{p2}$ from the duty control solenoid valve 128, and as a result, the clutch fastening force of the friction clutch 66 is controlled so as to distribute a drive torque to the front wheels in accordance with the clutch pressure $P_C$.

The spring off-set type solenoid selector valve 120 is of a three port and two position type, having an inlet port 120A to which the line pressure is fed, an outlet port 120B connected to the external pilot port $126_{p1}$ of the pilot selector valve 125, a drain port 120D connected to a drain, and a spool located in the valve. The spool is moved under control between a normal position 120b where the inlet port 120A is blocked while the outlet port 120B is communicated with the drain port 120D, and an operating position 120c where the inlet port 120A is communicated with the outlet port 120B while the drain port 120D is blocked. In the solenoid selector valve 120, when the controller is supplies an exciting current $i_1$ to a solenoid 120d, the spool is moved under control to the operating position 120c, overcoming the return spring 120a during a period in which the exciting current $i_1$ is supplied, thereby a pilot control pressure is fed to the external pilot port $126_{p1}$ of the pilot selector valve 126. On the other hand, when the exciting current it from the controller 18 is turned off, the spool is returned to the normal position 120b by the urging force of the return spring 120a, thereby the pilot control pressure having been fed to the external pilot port $126_{p1}$ is exhausted through the drain port 120D.

FIG. 9 shows a difference of operating conditions of the pilot selector valve 126 in the two wheel drive mode and the automatic four wheel drive mode. As shown in FIG., 9, the pilot selector valve 126 includes a spool 126a which is slidably fitted in a cylindrical valve housing 126i having an inlet port 126A to which the secondary pressure is fed from the clutch pressure regulating valve 122, an outlet port 126B from which the secondary pressure is fed to the friction clutch 66 of the transfer 22, an external pilot port $126_{p1}$ to which a control pressure is fed when the solenoid 120 of the solenoid selector valve 120 is energized, and a drain port 126D connected to a drain, the spool being urged to one end side of the valve housing by a return spring 126a. It is noted that the control pressure fed from the external pilot port $126_{p1}$ is fed opposite to the urging force of the return spring 126a.

The spool 126e in the pilot selector valve 126 is moved under control to a two wheel drive mode (2WD mode) position where the inlet port 126A and the outlet port 126B are blocked while the outlet port 126B is communicated with the drain port 126D a shown in the cross-sectional view in the left half of FIG. 9 when no pilot control pressure is fed to the external pilot port $126_{p1}$. On the other hand, when a solenoid 120d of the solenoid selector valve 120 is energized (turned on) so that the spool of the solenoid selector valve 120 is moved under control to the operating position 120c where the pilot control pressure is fed to the external pilot port $126_{P1}$, the spool 126e is moved to a four wheel drive (4WD) mode position where the inlet port 126A is communicated with the outlet port 126B as shown in the cross-sectional view in the right half of FIG. 9.

Thus, by driving the pilot selector valve 126 with the pilot control pressure from the solenoid selector valve 120, the spool 126e can be driven by a high pilot control pressure, and accordingly, it is possible to ensure the slide movement of the spool 126e even though a slide resistance to the spool 126e is high due to dust, chips or the like sticking to a slide passage for the spool 126e in the valve housing 126i.

FIG. 10 shows a characteristic curse exhibiting a relationship between the duty ratio 13 of the exciting current is supplied to the solenoid 128d of the duty control solenoid valve 128 and the supply pressure corresponding to the clutch pressure $P_C$ in the hydraulic pressure supply device 16. As shown in FIG. 10, the clutch pressure $P_C$ which increases parabolically in accordance with an increase in the duty ratio D is fed from the pilot selector valve 126 to the friction clutch 65. Thereby, a predetermined friction force is generated between the friction plates 66b and the friction disks 66d in accordance with the clutch pressure $P_C$ fed from the hydraulic pressure supply device 15 to the friction clutch 65, so that the drive torque is distributed for and transmitted to the front wheels and the rear wheels, in accordance with a fastening force caused by the generated friction force.

FIG. 11 shows a characteristic curve exhibiting a relationship between the clutch pressure $P_C$ fed to the friction clutch 66 and the transmission torque ΔT transmitted to the front wheels. As shown in FIG. 11, the transmission torque ΔT increases linearly as the supply pressure corresponding to the clutch pressure $P_C$ increases. That is, in the transfer 22, the distribution ratio of the drive torque between the front wheels and the rear wheels can be continuously varied in accordance with the duty ratio D of the exciting current $i_0$ from 0:100 to 50:50. In concrete expression, the distribution ratio becomes 0%:100% when the clutch pressure $P_C$ is fed with duty ratio $D_1$, while the distribution ratio becomes 50%:50% when the clutch pressure $P_C$ is fed with duty ratio $D_2$. It is noted that when the duty ratio D is below the duty ratio $D_1$, no drive force is transmitted to the frontwheels despite the friction plate. 66b and the friction disks 66d of the friction clutch 66 being in contact with each other.

Returning now to FIG. 18, the aforementioned drive force distribution control device 15 includes a front wheel rotation sensor 17F, a rear wheel rotation sensor 17R, a drive mode switch 21 for detecting a drive mode selected by the select switch, and a controller 18 which supplies the above-mentioned exciting current $i_0$, $i_1$ for the hydraulic pressure supply device 16 and the control signal SN for the locking mechanism 25, based on detection signals from the sensors and the switch.

The controller 18 in this embodiment further controls the hydraulic pressure supply device 16 to enable the hydraulic pressure supply device 16 to hold the hydraulic pressures to be predetermined hydraulic pressures. For this control, the controller 18 includes the oil temperature sensor 130 and the hydraulic pressure switches 132, 134 required for the control, and sends a motor control signal Sm to the hydraulic pressure supply device 16 based on the pressure detection signals from the sensor and switches.

Figure 1:
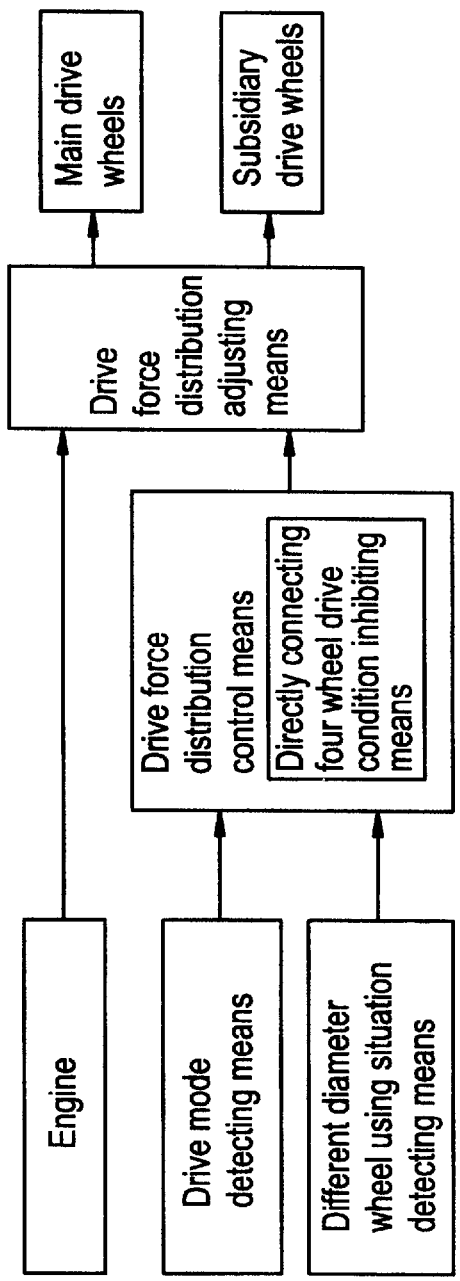
FIG. 1 is a block diagram showing a basic arrangement of a preferred embodiment of a four wheel drive system for an automotive vehicle according to the present invention.
Figure 2:
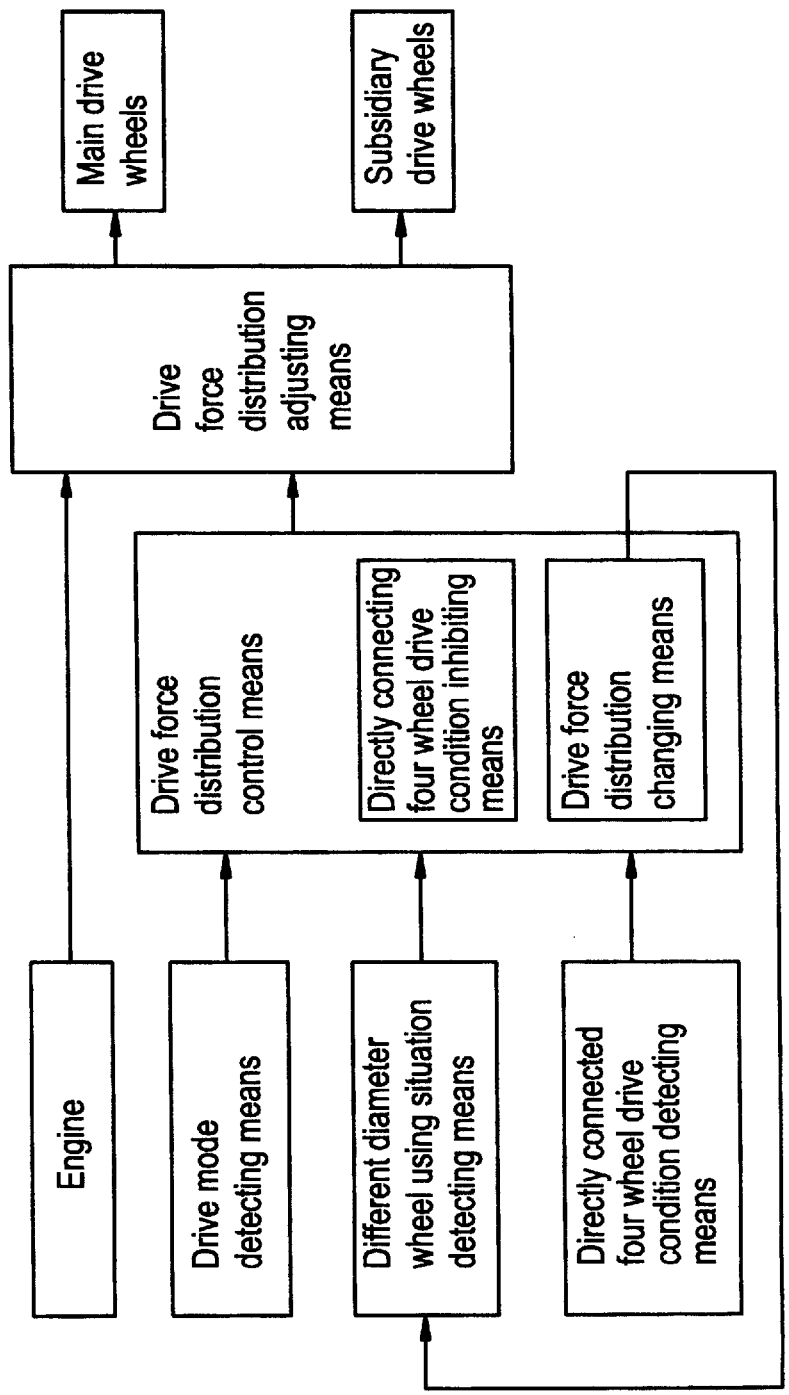
FIG. 2 is a block diagram showing a basic arrangement of a further preferred embodiment of a four wheel drive system for an automotive vehicle according to the present invention.
Figure 3:
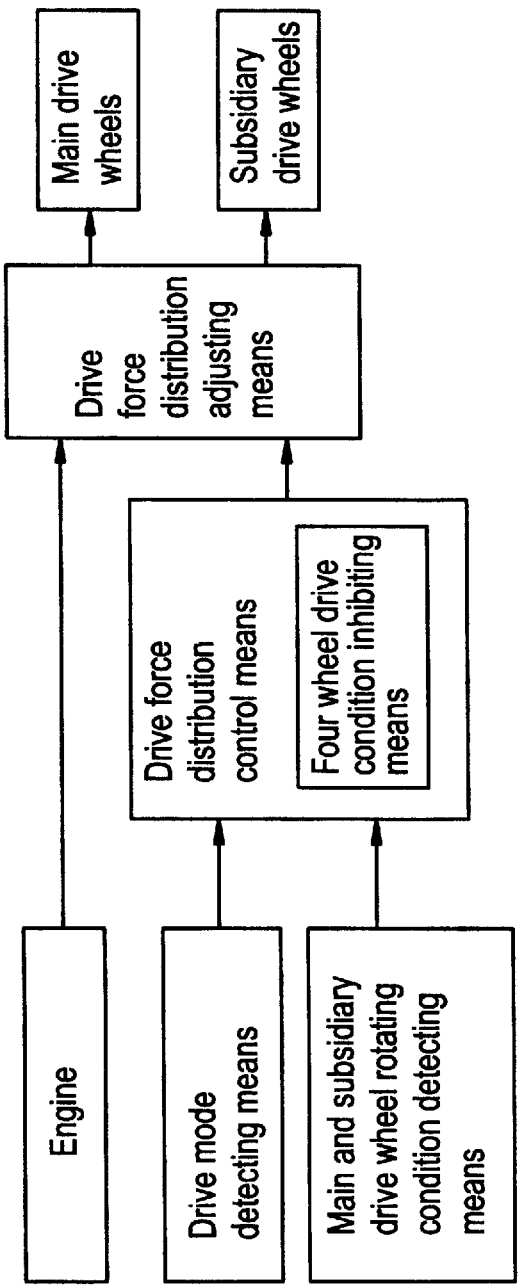
FIG. 3 is a block diagram showing a basic arrangement of another preferred embodiment of a four wheel drive system for an automotive vehicle according to the present invention.
Figure 4:
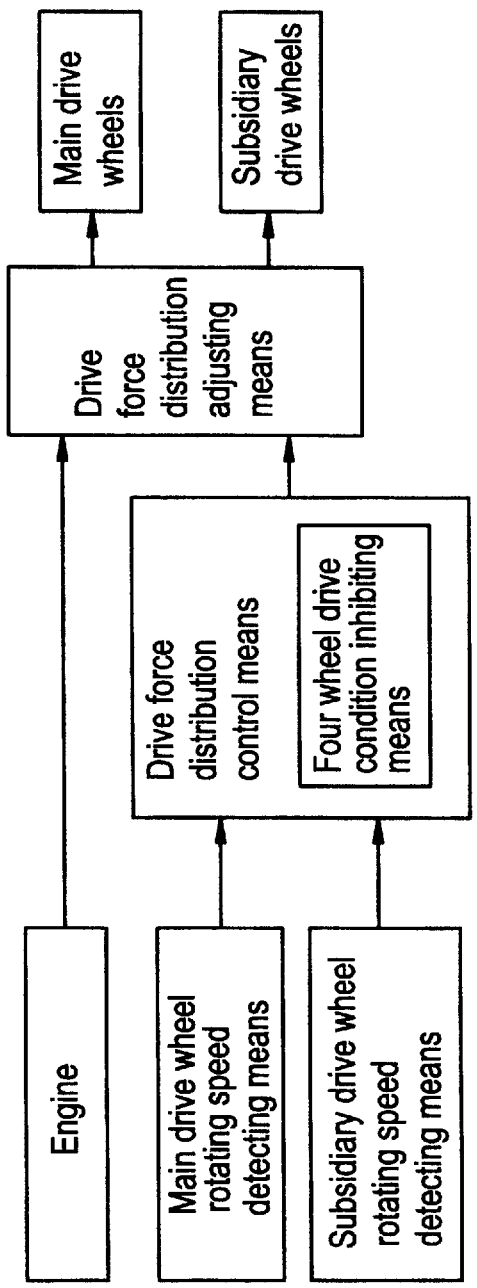
FIG. 4 is a block diagram showing a basic arrangement of another preferred embodiment of a four wheel drive system for an automotive vehicle according to the present invention.

Further, as shown in FIG. 1B, the four wheel drive system of this embodiment comprises a warning device 29 for warning to the driver by lighting on and off of a lamp and/or sound that the hydraulic pressure supply device 16 cannot hold the hydraulic pressures to be predetermined hydraulic pressures, based on the pressure detection signals from the oil temperature sensor 130 and the hydraulic pressure switches 132, 134.

The front wheel aide output shaft 24 and the rear wheel side output shaft 30 are provided respectively at predetermined positions beside these output shafts with the front wheel rotation sensor 17F and the rear wheel rotation sensor 17R which detect a rotating speed of the corresponding output shaft respectively by way of optical detection or magnetic detection and send a front wheel rotation detection value nF and a rear wheel rotation detection value nR as a circumferential speed i.e a rotating speed of the corresponding wheels to the controller 18 individually with a pulse signal or a sine curve signal in accordance with the rotating speed. As the front and rear wheel rotation sensors 17F, 17R, for example, a rotation sensor which is mentioned in a prior Japanese patent application filed by the present applicant and laid-open No. 01-195126 in Japan, can be utilized, The drive mode switch 21 for detecting a drive mode M selected by the select switch, sends a signal indicating a drive mode detection value M=2 when the two wheel drive mode is selected, a signal indicating a drive mode detection value M=AUT04 when the automatic four wheel drive mode is selected, and a signal indicating a drive made detection value M=LOCK4 when the directly connecting four wheel drive mode is selected.

Figure 19:
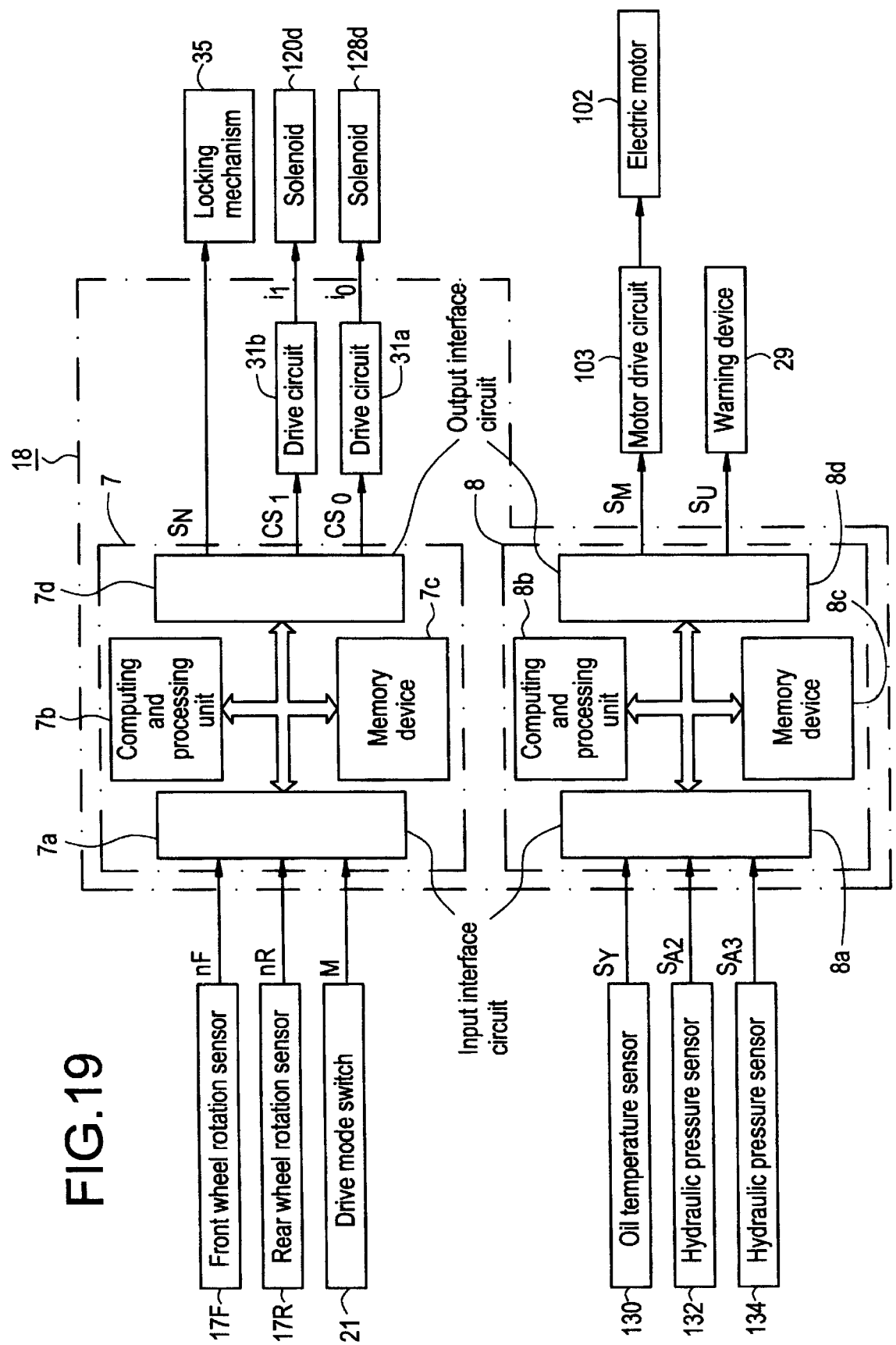
FIG. 19 is a block diagram illustrating a detailed constitution of a controller in the vehicle transmission system.

FIG. 19 shows details of the controller 18. As shown in FIG. 19, the controller 18 is composed of a microcomputer 7 for processing the control of distribution of drive force, a microcomputer 8 for processing the control of drive of the motor 102 for holding the predetermined hydraulic pressures, a drive circuit 31a for supplying an exciting current $1_0$ having a predetermined ratio D to the solenoid 128d of the duty control solenoid valve 128 in the hydraulic pressure device 16 in accordance with a control signal $CS_0$ from the microcomputer 7, a drive circuit 31b for supplying an exciting signal $i_1$ which is turned on and off in accordance with a control signal $CS_1$ from, the microcomputer 7, to the solenoid 120d of the solenoid selector valve 120 in the hydraulic pressure supply device 16, and a motor drive circuit 103 for controlling a speed of the electric motor 102 in the hydraulic pressure device 16 to a speed in accordance with a motor control signal $S_M$ from the microcomputer S by means of chopper control, The microcomputer 7 is composed of an input interface circuit 7a having an A-D converting function for reading detection signals, as detection values, from the sensors 17F, 17R and 21, a computing and processing unit 7b for performing predetermined computation and process for the control of distribution of drive force in accordance with a given program, a memory device 7c including ROM, RAM and the like, and an output interface circuit 7d having an D-A converting function for sending a front wheel side torque distribution instruction value $T_2$ obtained by the computing and processing unit 7b, as a control signal $CS_0$ for achieving a clutch pressure $P_C$ in accordance with the front wheel side torque distribution instruction value $T_2$, and a control signal $CS_1$ for determining whether the clutch pressure $P_C$ is to he supplied or not. That is, the control signal $CS_1$ is sent in case of that the front wheel side torque distribution instruction value $T_2$ obtained by the computing and processing unit 7b is not "0", on the other hand, the control signal $CS_1$ is not sent in care of that the front wheel side torque distribution instruction value $T_2$ obtained by the computing and processing unit 7b is "0" or the front wheel side torque distribution instruction value $T_2$ is not sent.

In the memory device 7c, a table corresponding to the characteristic curve exhibiting a relationship between tne duty ratio D of the exciting current $i_0$ supplied to the solenoid 128d of the duty control solenoid valve 129 and the supply pressure for the friction clutch 66 corresponding to the clutch pressure $P_C$ shown in FIG. 10, and a table corresponding to the characteristic curve exhibiting a relationship between the clutch pressure $P_C$ fed to the friction clutch 66 and the transmission torque ΔT transmitted to the front wheels shown in FIG. 11 are memorized as fixed data. By the output interface circuit 7d utilizing the tables in the memory device 7c, the front wheel side torque distribution instruction value $T_2$ obtained by the computing and processing unit 7b is transformed to the front wheel side transmission torque ΔT, the front wheel side transmission torque ΔT is transformed to the clutch pressure $P_C$ based on the characteristic curve in FIG. 11, the clutch pressure $P_C$ is transformed to the duty ratio D, and then the control signal $CS_0$ indicating the duty ratio D is sent to the drive circuit 31a.

On the other hand, the microcomputer 8 is composed of an input interface 8a having an A-D converting function for reading detection signals as detection values from the sensor 130 and the switches 132, 134, a computing and processing unit 8b, a memory device 8c including ROM, RAM and the like, an output interface circuit 8d having a D-A converting function For sending a motor speed instruction value obtained by the computing and processing unit 8b, as, for example, an analog voltage signal $S_M$.

Further, the microcomputer 7 determines a front wheel side torque distribution instruction value $T_2$ in accordance with computation and process shown in FIG. 20 and explained below, based on the front wheel rotation detection value nF from the front wheel rotation sensor 17F, the rear wheel rotation detection value nR from the rear wheel rotation sensor 17R and the drive mode detection value M (2, AUTO4, or LOCK4) from the drive mode switch 21, then sends the control signals $CS_0$, $CS_1$ in accordance with tne determined front wheel torque distribution instruction value $T_2$, to the drive circuits 31a, 31b. In addition to this, the microcomputer 7 sends the control signal $S_N$ of ON or OFF to the locking mechanism 35, in accordance with the above-mentioned computation and process.

The drive circuit 31a includes, for example, a pulse width modulation circuit for supplying an exciting current $i_0$ having a duty ratio D corresponding to the instruction value of the control signal $CS_0$ which is an analog voltage signal sent from the microcomputer 7, to the solenoid 128d of the duty control solenoid valve 128.

The drive circuit 31b converts the control signal $CS_1$ sent from the microcomputer 7 into an exciting current $i_1$ having a current value $I_k$ which can excite the solenoid 120d of the solenoid valve 120, and supplies the exciting current $i_1$ to the solenoid 120d.

The computing process carried out by the microcomputer B in the controller 18 of the embodiment, that is, the control for enabling the hydraulic pressure supply device 18 to feed a predetermined hydraulic pressure is as follows. When the hydraulic pressure switch 132 detects such a condition that the line pressure $P_L$ downstream of the oil element 112 in the manifold pipe 110 is lower than a predetermined value, the control signal $S_M$ indicating a rotational speed instruction value determined in accordance with an oil temperature detection value $S_y$ from the oil temperature sensor 130, is computed by a computing process which is not shown, in order to control the discharge pressure (oil volume) from the subpump 104, and is then sent to the motor drive circuit 103 for controlling the rotating speed of the electric motor 102 to maintain the line pressure $P_L$ fed by the hydraulic pressure device 16 at a predetermined pressure.

In connection to the above-mentioned control, for example, when the detection signal $S_{A2}$ Indicating that the line pressure $P_L$ becomes equal to or over the predetermined value $A_2$ is not sent from the hydraulic pressure switch 132, or the detection signal $S_{A3}$ indicating that the line pressure $P_L$ becomes equal to or over the predetermined value $A_3$ is not sent from the hydraulic pressure switch 134, the microcomputer 8 carries out a control to increase the discharge pressure (oil volume) from the subpump 104 by increasing the rotating speed of the electric motor 102 with the control pulse signal $S_M$, then if the detection signals $S_{A2}$, $S_{A3}$ are not sent from the hydraulic pressure switches 132, 134 despite of such a control during a predetermined period, the hydraulic pressure supply device 16 is determined to be abnormal, so that an abnormal detection signal $S_U$ is sent to the warning device 29 for warning to the driver by lighting on and off of a lamp and/or sound.

Next, a basic principle of the computing process carried out by the microcomputer 7 in the controller 18 of the embodiment, that is, the control for distribution of driving force is explained below.

In this embodiment, in usual, the four wheel drive system allows a driver of the vehicle to select a drive mode by operation of the select switch among the two wheel drive mode, the automatic four wheel drive mode and the directly connecting four wheel drive mode. In the two wheel drive mode, a drive force distribution between the rear and front wheels is fixed as the rear wheels:the front wheels= 100%:0%, while in the automatic four wheel drive mode, a drive force distribution between the rear and front wheels is automatically determined in accordance with a difference of rotating speed between the rear and front wheels, and further in the directly connecting four wheel drive mode, a drive force distribution between the rear and front wheels is fixed as the rear wheels:the front wheels=50%:50%.

In more detail, when the automatic four wheel drive mode is selected, a difference $\Delta v_w$ of rotating speed between the rear and front wheels is computed by subtracting a mean front wheel speed (the front wheel rotation detection value nF) obtained from a mean rotating speed of the front wheels 12FL, 12FR as the subsidiary drive wheels, from a mean rear wheel speed (the rear wheel rotation detection value nR) obtained from a mean rotating speed of the rear wheels 12RL, 12RR as the main drive wheels, based on the following equation (1).

$$\Delta V_w = nR - nF \tag{1}$$

Normally, for the purpose of coexistence of a driving performance of a four wheel drive vehicle with a cornering performance of a rear wheel drive vehicle and far the purpose of an advanced handling stability of the vehicle, as shown in FIG. 13, the front wheel torque distribution instruction value $T_2$ is determined as "50" when the difference $\Delta V_w$ of rotating speed between the rear and front wheels is equal to or greater than a predetermined value $\Delta V_w 1$ (>0), while the front wheel torque distribution instruction value $T_2$ is determined as "15" when the difference $\Delta V_w$ is equal to or less than a predetermined value $\Delta V_w 2$ (<0). Further, the front wheel torque distribution instruction value $T_2$ is determined by computation with the following equation (2a) when the difference $\Delta V_w$ is equal to or greater than "0" and less than the predetermined value $\Delta V_w 1$, while the front wheel torque distribution instruction value $T_2$ is determined by computation with the following equation (2b) when the difference $\Delta V_w$ is less than "0" and greater than the predetermined value $\Delta V_w 2$.

$$T_2 = k_1 \cdot \Delta V_W \tag{2a}$$

$$T_2 = k_2 \cdot \Delta V_W \tag{2b}$$

However, as mentioned before, when the drive condition of the vehicle is changed from the condition in which the main drive wheels idly rotating while the subsidiary drive wheels stopping rotating, to the directly connecting four wheel drive condition so as to escape from being stuck in mud, the rotating speed of the subsidiary drive wheels which has been stopped rotating becomes the same as the rotating speed of the main drive wheels which has been idly rotated in high speed, so that, in some cases, a driver and/or a passenger feel uncomfortable, due to a shock caused by the rapid increase of a rotating speed of the subsidiary drive wheels.

Therefore, in this embodiment, when the front wheel rotation detection value nF is "0" and besides the rear wheel rotation detection value nR is larger than "0", the front wheel torque distribution instruction value $T_2$ is determined as "0" causing the two wheel drive condition, despite the drive mode selected by the select switch.

Meanwhile, in this embodiment, the drive system includes the subsidiary speed change mechanism 58. Therefore, when the low speed shift position is selected in the subsidiary speed change mechanism 58, a drive condition is forced to change to the directly connecting four wheel drive condition, despite the front wheel torque distribution instruction value $T_2$ being determined as "0". Consequently, to avoid such changing, in this embodiment, the locking mechanism 35 is provided on the moving path of the shift (select) lever, and the locking mechanism 35 inhibits the select lever (shift lever) from being shifted to a low speed shift position in accordance with the predetermined control signal (low speed shift position inhibiting signal) $S_N$ which becomes ON by a logical value "1" while becoming OFF by a logical value "0", and when the front wheel rotation detection value nF is "0" and besides the rear wheel rotation detection value nR is larger than "0", the control signal $S_N$ is determined as "1", on the other hand when it is not so, the control signal $S_N$ is determined as "0".

Figure 20:
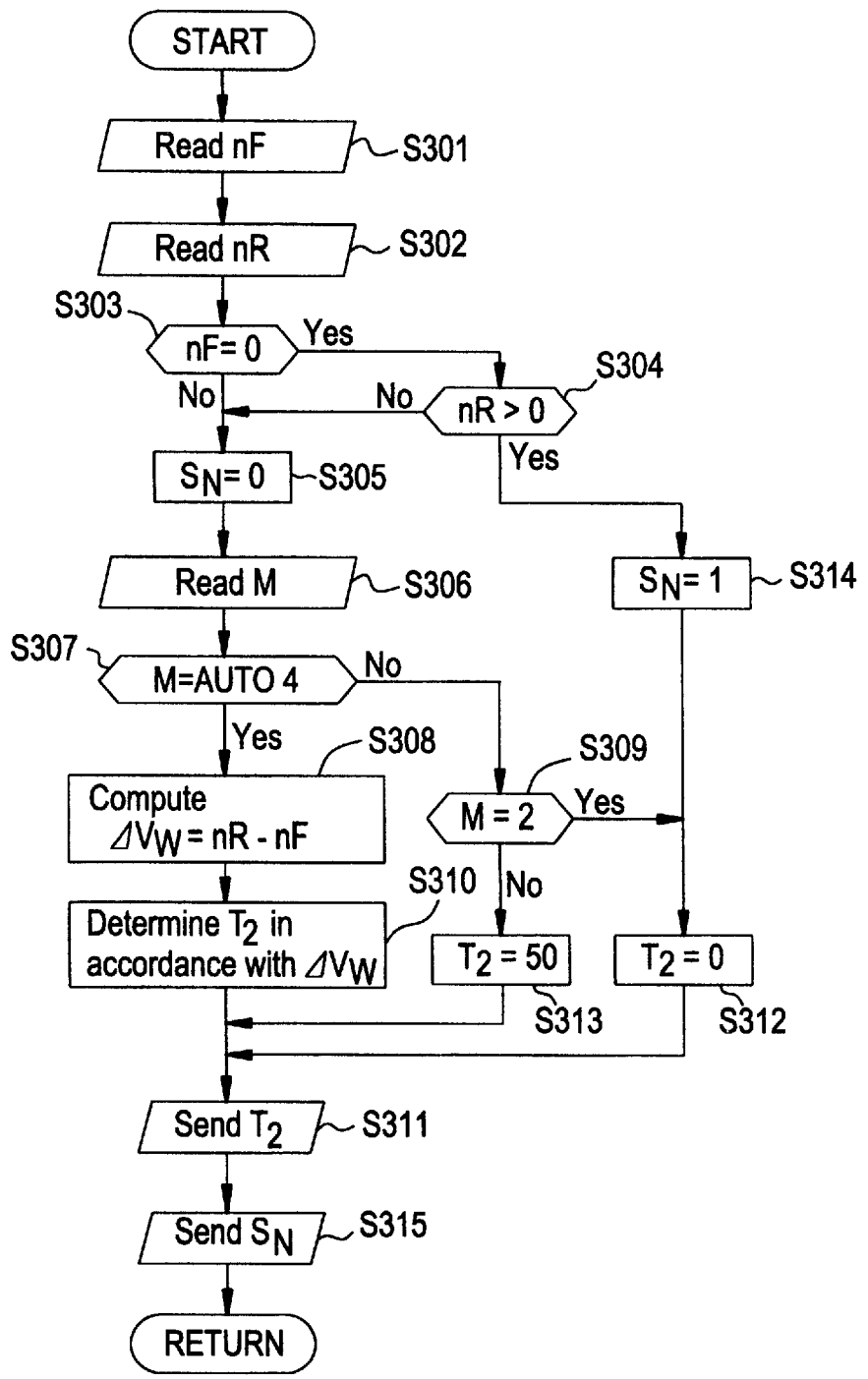
FIG. 20 is a flowchart of a computing process executed by the controller.

Next, the computing process is explained with a flowchart shown in FIG. 20. The computing process is executed based on the above-explained basic principle, for inhibiting changing of drive condition to the four wheel drive condition when the main drive wheels idly rotating while the subsidiary drive wheels stopping rotating.

The computing process shown in FIG. 20 is also executed by a timer interruption for every predetermined time $\Delta T_S$ (e.g. 10 seconds). In the computing process, at first, at step S301, the front wheel rotation detection value nF is read from the front wheel rotation sensor 17F, and at next step S302, the rear wheel rotation detection value nR is read from the rear wheel rotation sensor 17R. Then at next step S303, whether the front wheel rotation detection value nF read at the step S301 is "0" or not is determined, and if nF=0, the procedure is shifted to step S304, on the other hand if nF=0, the procedure is shifted to step S305.

At the step S305, the low speed shift position inhibiting signal $S_N$ is determined as the logical value "0", and at next step S306, the drive mode detection value M is read from the drive mode switch 21, then at next step S307, whether the drive mode detection value M read at the step S306 is M=AUTO4 or not is determined, and if M=AUT04, the procedure is shifted to step S305, on the other hand if it is not so, that is, if M=2 or M=LOCK4, the procedure is shifted to stop S309.

At the step S308, a difference $\Delta V_W$ of rotating speed between the rear and front wheels is computed from the front wheel rotation detection value nF and the rear wheel rotation detection value nR which are read at the steps S301 and S302, in accordance with the aforementioned equation (1), and the procedure is shifted to next step S310. At the step S310, referring to the characteristic curve shown in FIG. 13, the front wheel side torque distribution instruction value $T_2$ is determined in accordance with the difference $\Delta V_W$ of rotating speed between the front and rear wheels computed at the step S308, then the procedure is shifted to next step S311.

At the step S309, whether the drive mode detection value M read at the step S306 is M=2 or not is determined, and if M=2, the procedure is shifted to step S312, on the other hand if it is not so, the procedure is shifted to step S313. At the step S312, the front wheel side torque distribution instruction value $T_2$ is determined as "0", then the procedure is shifted to the step S311, and at the step S313, the front wheel side torque distribution instruction value $T_2$ is determined as "50", then the procedure is shifted to the stop S311.

On the other hand, at the step S304, whether the rear wheel rotation detection value nR read at the step S302 is greater than "0" or not is determined, and if nR>0, the procedure is shifted to step S314, on the other hand if it is not so, that is, if nR=0, the procedure is shifted to the step S305. At the step S314, the low speed shift position inhibiting signal $S_N$ is determined as the logical value "1", then the procedure is shifted to the step S312.

Then, at the step S311, the front wheel side torque distribution instruction value $T_2$ determined at one of the steps S310, S312 and S313 is sent out, and at the next step S315, the low speed shift position inhibiting signal $S_N$ determined as the logical value "0" or "1" at the step S305 or S314, is sent out, then the procedure is returned to a main program.

The front wheel side torque distribution instruction value $T_2$ thus determined is converted to the control signal $CS_0$ consisting of an analog voltage value indicating the duty ratio D for achieving the clutch pressure $P_C$ in accordance with the front wheel side torque distribution instruction value $T_2$ by the output interface circuit 7d of the microcomputer 7, then the control signal $CS_0$ is input to the drive circuit 31a, while the control signal $CS_1$ is input to the drive circuit 31b if the instruction value $T_2$=0. Thereby, the drive circuit 31a supplies the exciting current $i_0$ having the duty ratio D corresponding to the control signal $CS_0$, to the solenoid 128d of the duty control solenoid valve 128 in the hydraulic pressure supply device 16, while the drive circuit 31b supplies the exciting current $i_1$ to the solenoid 120d of the solenoid valve 120 in the hydraulic pressure supply device 16 if the control signal $CS_1$ is input. Incidentally, if the control signal $CS_1$ is not input, the drive circuit 31b does not supply the exciting current $i_1$.

As a result of this, in case of the front wheel side torque distribution instruction value $T_2$=0, the inlet port 120A of the solenoid selector valve 120 is communicated to the outlet port 120B thereof, then the control pressure is supplied from the solenoid selector valve 120 to the external pilot port $126_{p1}$, so that the pilot selector valve 126 becomes the condition shown in the cross-sectional view in the right half of FIG. 9, this enables feeding of a regulated pressure from the clutch pressure regulating valve 122 to the friction clutch 66 through the pilot selector valve 126. Meanwhile, the duty control solenoid valve 128 supplies the pilot control pressure to the external pilot port $122_{p2}$ of the clutch pressure regulating valve 122 in accordance with the control signal $CS_0$ by moving of the spool from the normal position 128b to the operating position 128c opposing to the return spring 128a, thereby the clutch pressure regulating valve 122 regulates the supply pressure in accordance with the control signal $CS_0$, so that the regulated pressures that is, the supply pressure $P_C$ in accordance with the front wheel side torque distribution instruction value $T_2$, is supplied from the clutch pressure regulating valve 122 to the friction clutch 66 through the pilot selector valve 126.

The regulated supply pressure $P_C$ is supplied from the hydraulic pressure supply device 16 to the inlet port 74 in the transfer 22, thereby, the friction plates 66b and the friction disks 66d frictionally contact with each other in accordance with the supplied clutch pressure $P_C$, and a drive torque (drive force) in accordance with the friction force drives the clutch hub 66c of the friction clutch 66 to rotate the clutch hub 66c. Then the drive torque (drive force) is transmitted through the gear train to the front wheel side output shaft 24, and further transmitted through the front wheel side drive force transmitting system to the front wheels 12FL, 12FR, so that a drive force transmitted to the rear wheels 12RL, 12RR is reduced due to the drive force transmitted to the front wheels, thus, by the computing process shown in FIG. 20, a four wheel drive condition with a desirable torque distribution can be achieved.

On the other hand, in case of the front wheel side torque distribution instruction value $T_2=0$, since the control signal $CS_1$ is not supplied, the inlet port 120A of the solenoid selector valve 120 is not communicated to the outlet port 120B, so that the control pressure is supplied from the solenoid selector valve 120 to the external pilot port $126_{p1}$, therefore the pilot selector valve 126 becomes the condition shown in the cross-sectional view in the left half of FIG. 9, this inhibits feeding of a regulated pressure from the clutch pressure regulating valve 122 to the friction clutch 66 through the pilot selector valve 126. Meanwhile, since the duty ratio D of the control signal $CS_0$ sent to the duty control solenoid valve 128 becomes lower than the duty ratio $D_1$, the spool in the solenoid value 128 stays at the normal position 128b or is moved from the operating position 129c to the normal position 128b, so that the clutch pressure $P_C$ from the clutch pressure regulating valve 122 becomes lower than the clutch pressure $P_1$ shown in FIG. 10, and is not regulated in accordance with the front wheel side torque distribution instruction value $T_2$.

Therefore, in this case, since the clutch pressure $P_C$ is not supplied from the hydraulic pressure supply device 16 to the inlet port 74 in the transfer 22, thereby, the friction plates 66b and the friction disks 66d do not frictionally contact with each other as explained before. Thus, the drive torque (drive force) is not transmitted to the front wheel side output shaft 24, so that drive condition of the vehicle becomes in the two wheel drive condition.

Next, actions of the four wheel drive system of this embodiment are explained below, which are executed by the computing process shown in FIG. 20.

First, when the vehicle with the four wheel drive system of this embodiment in which the two wheel drive mode is selected by an operation of the select switch by the driver, is running at a constant speed, since the front wheel rotation detection value nF read at the step S301 is not "0", the procedure is shifted from the step S303 to the step S305, so that the low speed shift position inhibiting signal $S_N$ is determined as the logical value "0", and the drive mode detection value M read at the step S306 is M=2, then the procedure is shifted in order of the steps S307, S309 and S312. Thereby, at the step S312, the front wheel side torque distribution instruction value $T_2$ is determined as "0", then at the step S311, the front wheel side torque distribution instruction value $T_2=0$ is sent out, and at the next stop S315, the low speed shift position inhibiting signal $S_N=0$ is sent out.

As a result of this, as mentioned before, the control signal $CS_0$ corresponding to the front wheel side torque distribution instruction value $T_2$ indicating $T_2=0$ is sent to the drive circuit 31a, while the control signal $CS_1$ is not sent to the drive circuit 31b, so that the exciting current $i_0$ having the duty ratio D corresponding to the front wheel side torque distribution instruction value $T_2=0$ is supplied from the drive circuit 31a to the solenoid 128d of the duty control solenoid valve 128, while the exciting current $i_1$ is not supplied from the drive circuit 31b. Thereby, the solenoid selector valve 120, the pilot selector valve 126, the duty control solenoid valve 128 and the clutch pressure regulating valve 122 hold the clutch supply pressure $P_C$ lower than the predetermined hydraulic pressure $P_1$.

Thus, as mentioned before, since the friction plates 66b and the friction disks 66d do not frictionally contact with each other, the drive torque (drive force) is not transmitted to the front wheel side output shaft 24, so that the two wheel drive condition is continued. It is noted that, in this case, the low speed shift position inhibiting signal $S_N$ determined as the logical value "0" has been sent out at the step S315, so that the locking mechanism 35 for the shift lever of the subsidiary speed change mechanism 58 is not operated. Therefore, it is allowed that a drive condition is forced to change to the directly connecting four wheel drive condition by selecting of the low speed shift position in the subsidiary speed change mechanism 58.

Next, during running of the vehicle with the four wheel drive system of this embodiment on high $\mu$ road with unevenness but with enoughly high friction coefficient, when a drive node is changed from the two wheel drive mode to the automatic four wheel drive mode by an operation of the select switch by the driver, since the front wheel rotation detection value nF read at the step S301 is not "0", the procedure is shifted from the step S303 to the step S305, so that the low speed shift position inhibiting signal $S_N$ is determined as the logical value "0", and the drive mode detection value M read at the step S306 is M=AUTO4, then the procedure is shifted from the step S307 to the step S308. Thereby, at the step S308, the difference $\Delta V_W$ of rotating speed between the rear and front wheels is computed from the front wheel rotation detection value nF and the rear wheel rotation detection value nR which are read at the steps S301 and S302, in accordance with the aforementioned equation (1), and at the step S310, referring to the characteristic curve shown in FIG. 13, the front wheel aide torque distribution instruction value $T_2$ is determined in accordance with the computed difference $\Delta V_W$, then at the step S311, the determined front wheel side torque distribution instruction value $T_2$ in accordance with the computed difference $\Delta V_W$ is sent out, and at the next step S315, the low speed shift position inhibiting signal $S_N=0$ is sent out.

As a result of this, as mentioned before, the control signal $CS_0$ of a voltage value corresponding to the front wheel side torque distribution instruction value $T_2$ is sent to the drive circuit 31a, while the control signal $CS_1$ is sent to the drive circuit 31b, so that the exciting current $i_0$ having the duty ratio D corresponding to the front wheel side torque distribution instruction value $T_2$ is supplied from the drive circuit 31a to the solenoid 128d of the duty control solenoid valve 128, while the exciting current $i_1$ corresponding to the current value $I_K$ is supplied from the drive circuit 31b to the solenoid 120d of the solenoid selector valve 120. Thereby, as mentioned before, the clutch supply pressure $P_C$ in accordance with the front wheel side torque distribution instruction value $T_2$ is supplied from the pilot selector valve 126, by means of the solenoid selector valve 120, the pilot selector valve 126, the duty control solenoid valve 128 and the clutch pressure regulating valve 122.

Thus, as mentioned before, since the friction plates 66b and the friction disks 66d frictionally contact with each other generating a friction force in accordance with the clutch supply pressure $P_C$, the drive torque (drive force) in accordance with the friction force drives the clutch hub 66c of the friction clutch 66 to rotate the clutch hub 66c. Then the drive torque (drive force) is transmitted through the gear train to the front wheel aide output shaft 24, and further transmitted through the front wheel side drive force transmitting system to the front wheels 12FL, 12FR, so that a drive force transmitted to the rear wheels 12RL, 12RR is reduced due to the drive force transmitted to the front wheels, thus, the automatic four wheel drive condition in which a drive torque is transmitted to the front wheels in accordance with the front wheel side torque distribution instruction value $T_2$, is achieved.

It is noted that, in this case, the low speed shift position inhibiting signal $S_N$ determined as the logical value "0" has been sent out at the step S315, so that the locking mechanism 35 for the shift lever of the subsidiary speed change mechanism 58 is not operated. Therefore, it is allowed that a drive condition is forced to change to the directly connecting four wheel drive condition by selecting of the low speed shift position in the subsidiary speed change mechanism 58.

Next, during running of the vehicle with the four wheel drive system of this embodiment on high $\mu$ road with unevenness but with enoughly high friction coefficient, when a drive mode is changed from the two wheel drive mode or the automatic four wheel drive mode the the directly connecting four wheel drive mode by an operation of the select switch by the driver, since the front wheel rotation detection value nF read at the step S301 is not "0", the procedure is shifted from the stop S303 to the step S305, so that the low speed shift position inhibiting signal $S_N$ is determined as the logical value "0", and the drive mode detection value M read at the step S306 is M=LOCK4, then the procedure is shifted from the step S307 to the step S313 through the step S309. Thereby, at the step S313, the front wheel side torque distribution instruction value $T_2$=50 is sent out, and at the next step S315, the low speed shift position inhibiting signal $S_N$=0 is sent out.

As a result of this, as mentioned before, the control signal $CS_0$ of a voltage value corresponding to the front wheel side torque distribution instruction value $T_2$ is sent to the drive circuit 31a, while the control signal $CS_1$ is sent to the drive circuit 31b, so that the exciting current $i_0$ having the duty ratio D corresponding to the front wheel side torque distribution instruction value $T_2$ is supplied from the drive circuit 31a to the solenoid 128d of the duty control solenoid valve 128, while the exciting current $i_1$ corresponding to the current value $I_K$ is supplied from the drive circuit 31b to the solenoid 120d of the solenoid selector valve 120. Thereby, as mentioned before, the maximum clutch supply pressure $P_C$ in accordance with the front wheel side torque distribution instruction value $T_2$=50 is supplied from the pilot selector valve 126, by means of the solenoid selector valve 120, the pilot selector valve 126, the duty control solenoid valve 128 and the clutch pressure regulating valve 122.

Thus, as mentioned before, since the friction plates 66b and the friction disks 66d frictionally contact with each other generating a friction force in accordance with the maximum clutch supply pressure $P_C$, the drive torque (drive force) in accordance with the friction force drives the clutch hub 66c of the friction clutch 66 to rotate the clutch hub 66c. Then the drive torque (drive force) is transmitted through the gear train to the front wheel side output shaft 24, and further transmitted through the front wheal side drive force transmitting system to the front wheels 12FL, 12FR, so that a drive force transmitted to the rear wheels 12RL, 12RR is reduced due to the drive force transmitted to the front wheels, thus, the directly connecting four wheel drive condition in which a distribution ratio of a drive torque from the engine 10 between the front and rear wheels becomes 1:1, is achieved.

It is noted that, in this case, the low speed shift position inhibiting signal $S_N$ determined as the logical value "0" has been sent out at the step S315, so that the locking mechanism 35 for the shift lever of the subsidiary speed change mechanism 58 is not operated. Therefore, it is allowed that a drive condition is forced to change to the directly connecting four wheel drive condition by selecting of the low speed shift position in the subsidiary speed change mechanism 58.

Further, during running of the vehicle on low $\mu$ road such as snowy load, when the vehicle falls into a situation that the rear wheels idly rotating while the front wheels stopping rotating, since the front wheel rotation detection value nF read at the step S301 is "0", the procedure is shifted from the step S303 to the step S304, and due to the rear wheel rotation detection value nR read at the step S302 being nR>0, the procedure is shifted from the step S304 to the step S314, so that the low speed shift position inhibiting signal $S_N$ is determined as the logical value "1", and at the step S312, the front wheel side torque distribution instruction value $T_2$=0 is determined, then at the step S311, $T_2$=0 is sent out, and at the next step S315, the low speed shift position inhibiting signal $S_N$=1 is sent out.

As a result of this, as mentioned before, the control signal $CS_0$ corresponding to the front wheel side torque distribution instruction value $T_2$ indicating $T_2$=0 is sent to the drive circuit 31a, while the control signal $CS_1$ is not sent to the drive circuit 31b, so that the exciting current $i_0$ having the duty ratio D corresponding to the front wheel side torque distribution instruction value $T_2$=0 is supplied from the drive circuit 31a to the solenoid 128d of the duty control solenoid valve 128, while the exciting current $i_1$ is not supplied from the drive circuit 31b. Thereby, the solenoid selector valve 120, the pilot selector valve 126, the duty control solenoid valve 128 and the clutch pressure regulating valve 122 hold the clutch supply pressure $P_C$ lower than the predetermined hydraulic pressure $P_1$, in accordance with the front wheel side torque distribution instruction value $T_2$=0.

Thus, as mentioned before, since the friction plates 66b and the friction disks 66d do not frictionally contact with each other, the drive torque (drive force) is not transmitted to the front wheel side output shaft 24, so that a drive condition of the vehicle becomes the two wheel drive condition. That is, with this embodiment, when the vehicle falls into a situation that the rear wheels idly rotating while the front wheels stopping rotating, the drive condition of the vehicle does not change to the directly connecting four wheel drive condition, even if the driver selects the directly connecting four wheel drive mode to escape from the situation in which the vehicle being stuck. Thereby, in the stuck situation, a shock caused by the rapid increase of rotating speed of the front wheels which has been stopped rotating, to the same as the rotating speed of the rear wheels which has been idly rotated in high speed, can be prevented.

It is noted that, in this case, the low speed shift position inhibiting signal $S_N$ determined as the logical value "1" has been sent out at the step S315, so that the locking mechanism 35 for the shift lever of the subsidiary speed change mechanism 58 is operated. Therefore, it is also prevented that a drive condition is forced to change to the directly connecting four wheel drive condition by selecting of the low speed shift position in the subsidiary speed change mechanism 58.

At this time, when the driver recognizes this situation and once stops the rear wheels by returning an accelerator pedal, at the sampling time just after the stopping of rear wheels, the rear wheel rotation detection value nR read at the step S302 becomes nR=0, thereby the procedure is shifted from the step S304 to the step S303, so that the low speed shift position inhibiting signal $S_N$ is determined au the logical value "0", and at the stop S306, the drive mode detection value M=LOCK4 is read. Then, the procedure is shifted from the step S307 to the stop S313 through the step S309, thereby at the stop S311, $T_2$=50 is sent out, and at the next step S315, the low speed shift position inhibiting signal $S_N$=0 is sent out. Thus, a drive torque of 50% is transmitted to the front wheel to provide the directly connecting four wheel drive condition, consequently, the vehicle can escape from the stuck situation calmly by pressing the accelerator pedal again slowly.

Incidentally, when the directly connecting four wheel drive mode is selected from starting of the vehicle, the front wheel rotation detection value nF read at the step S301 and the rear wheel rotation detection value nR read at the step S302 are both "0", thereby the procedure is shifted from the step S302 to the step S305 through the steps S303 and S304, so that the low speed shift position inhibiting signal $S_N$ is determined as the logical value "0", and at the step S306, the drive mode detection value M=LOCK4 is read. Then, the procedure is shifted from the step S307 to the step S313 through the step S309, thereby at the step S311, $T_2$=50 is sent out, and at the next stop S315, the low speed shift position inhibiting signal $S_N$=0 is sent out. Thus, a drive torque of 50% is transmitted to the front wheel to provide the directly connecting four wheel drive condition.

Therefore, in this embodiment, the steps S302 and S303 in the computing process shown in FIG. 20 with the front and rear wheel rotation sensors 17F and 17R constitute the main and subsidiary drive wheel rotating condition detecting means. The steps S303 to S305 and S314 in the computing process shown in FIG. 20 with the locking mechanism 35 for the shift lever correspond to the four wheel drive condition inhibiting means. The drive mode switch 21 and the step S306 in the computing process shown in FIG. 20 constitute the drive mode detecting means. Further, the controller 18 corresponds to the drive force distribution control means, and the transfer 22 and the hydraulic pressure supply device correspond to the drive force distribution adjusting means.

Figure 21:
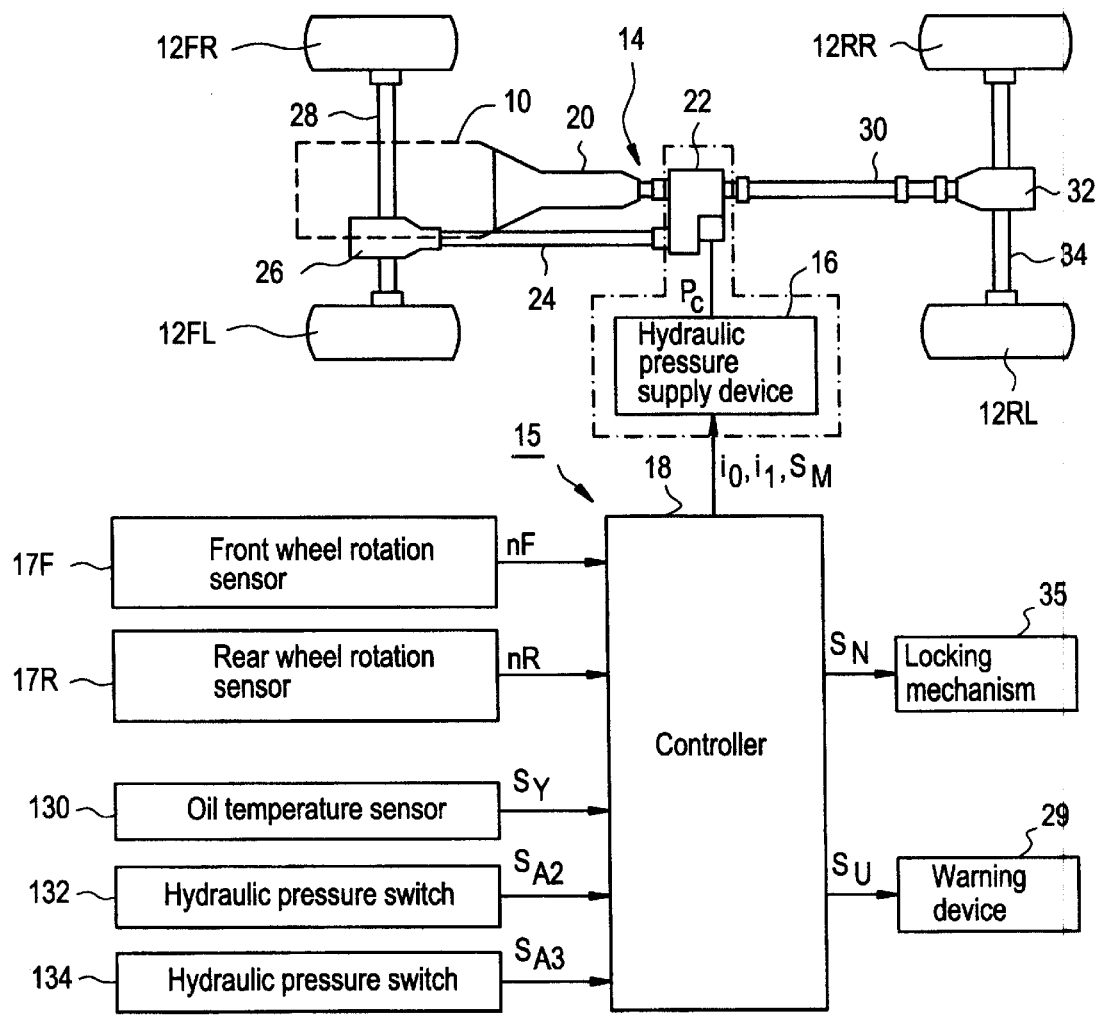
FIG. 21 is a schematic view illustrating the basic arrangement of transmission system of a vehicle according to another preferred embodiment of the present invention.
Figure 22:
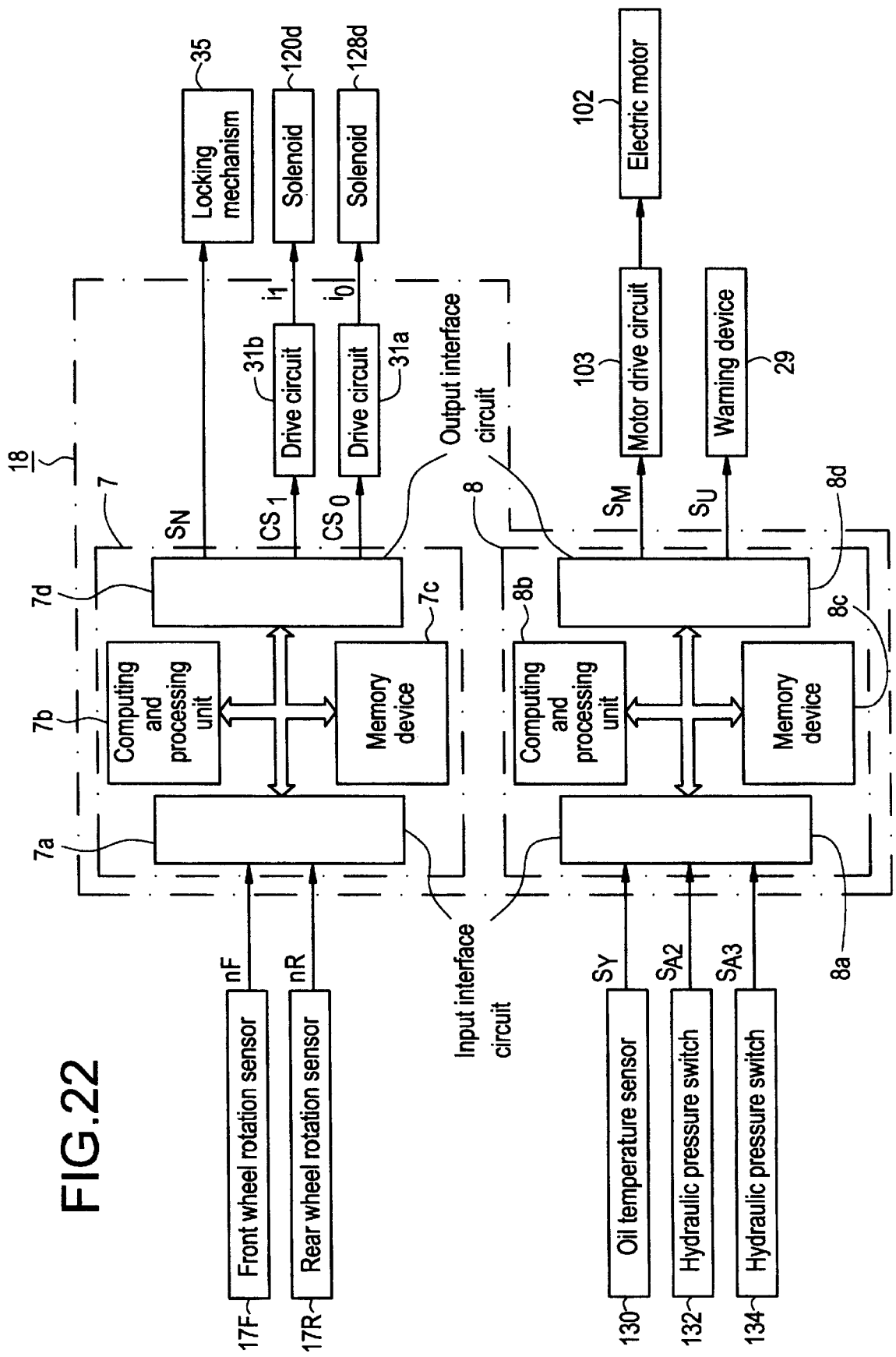
FIG. 22 is a block diagram illustrating a detailed constitution of a controller in the vehicle transmission system.

FIG. 21 shows a four wheel drive system for an automotive vehicle of another preferred embodiment of the present invention, based also upon an FR (front-engine and rear-drive) system. Though, the four wheel drive system of this embodiment is a full-time four wheel drive system, which has no drive mode select switch, and in which a drive force distribution between the main drive wheels (rear wheels) and the subsidiary drive wheels (front wheels) is automatically determined in accordance with a difference of rotating speed between the front and rear wheels. The four wheel drive system also comprises a subsidiary speed change mechanism, and enables the driver to select a shift position of the subsidiary speed change mechanism by operation of a select lever (not-shown). It is noted that the select lever of the subsidiary speed change mechanism is provided with a below-mentioned locking mechanism which inhibits the select lever (shift lever) from being shifted to a low speed shift position in accordance with a predetermined control signal.

Figure 24:
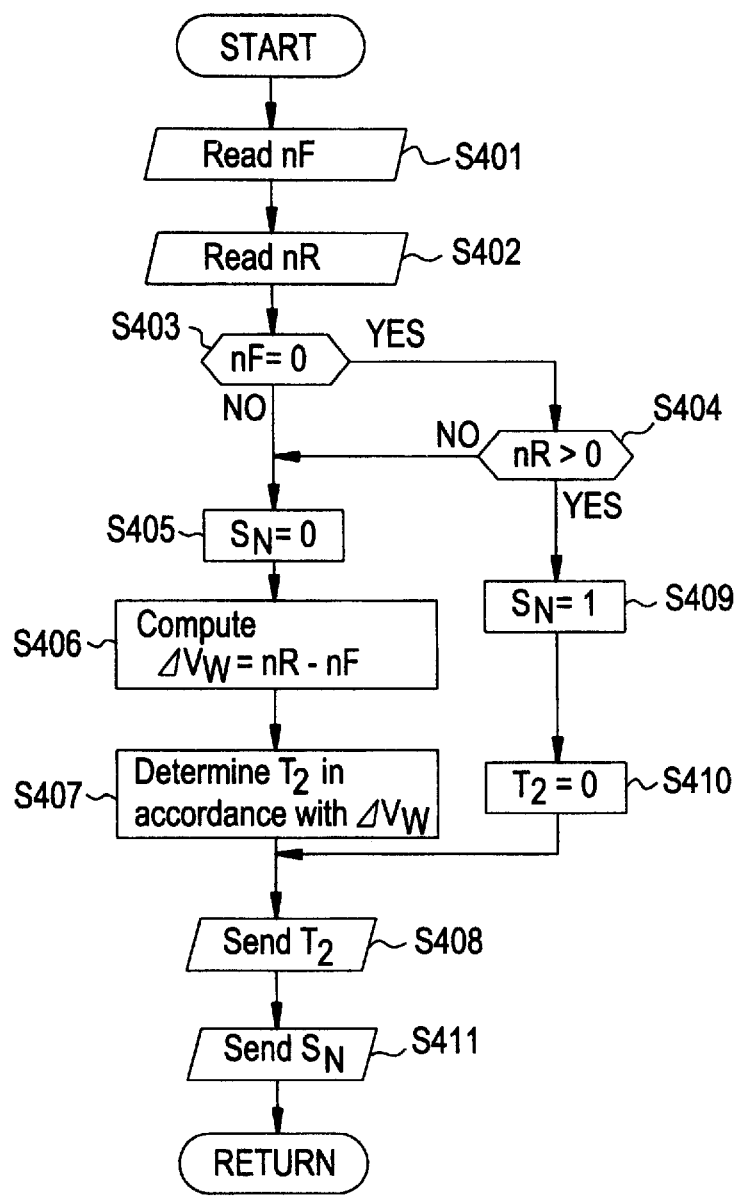
FIG. 24 is a flowchart of a computing process executed by the controller.

Therefore, the constitution shown in FIG. 21 is the same as the constitution shown in FIG. 18 from which the drive mode switch 21 is removed, and the drive force distribution control device 15 is the same as that shown in FIG. 18 from which the drive mode switch 21 is removed. Besides, the computing process shown in FIG. 24 is executed by the computing and processing unit 7b of the micro computer 7 as mentioned below, instead of the computing process shown in FIG. 20. Residual part of the constitution of this embodiment is the same as the above-mentioned latter embodiment, so that explanation of the residual part is omitted.

Next, a basic principle of the computing process carried out by the microcomputer 7 in the controller 18 of the embodiment, that is, the control for distribution of driving force is explained below.

In this embodiment, as mentioned above, the four wheel drive system has no select switch for selecting the drive mode, so that, in usual, a difference $\Delta V_W$ of rotating speed between the rear and front wheels is computed by subtracting a mean front wheel speed (the front wheel rotation detection value nF) obtained from a mean rotating speed of the front wheels 12FL, 12FR as the subsidiary drive wheels, from a mean rear wheel speed (the rear wheel rotation detection value nR) obtained from a mean rotating speed of the rear wheels 12RL, 12RR as the main drive wheels, based on the aforementioned equation (1).

Figure 23:
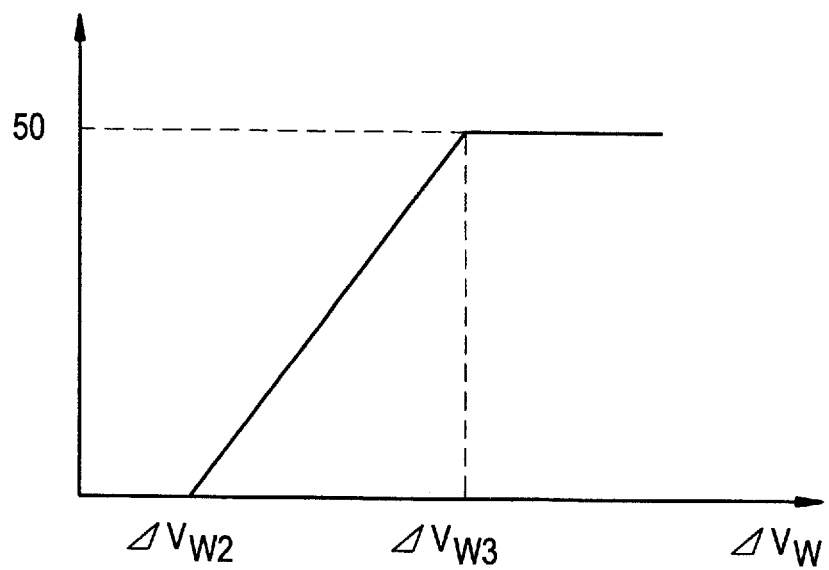
FIG. 23 is a graph of another characteristic curve exhibiting a relationship between a difference $\Delta V_W$ of rotating speed of front and rear wheels of the vehicle and a front wheel torque distribution instruction value $T_2$.

Then, as shown in FIG. 23, the front wheel torque distribution instruction value $T_2$ is determined as "0" when the difference $\Delta V_W$ of rotating speed between the rear and front wheels is less than a predetermined value $\Delta V_W 2$ ($\Delta V_W 2>0$), while the front wheel torque distribution instruction value $T_2$ is determined by computation with the following equation (2c) when the difference $\Delta V_W$ is equal to or greater than the predetermined value $\Delta V_W 2$ and equal to or lee. than a predetermined value $\Delta V_W 3$. Further, the front wheel torque distribution instruction value $T_2$ is determined as "50" when the difference $\Delta V_W$ is greater than the predetermined value $\Delta V_W 3$.

$$T_2 = k_3 \cdot \Delta V_W \tag{2c}$$

However, as mentioned before, when the drive condition of the vehicle is changed from the condition in which the main drive wheels idly rotating while the subsidiary drive wheels stopping rotating, to the directly connecting four wheel drive condition so as to escape from so called stuck situation, the rotating speed of the subsidiary drive wheels which has been stopped rotating becomes the same as the rotating speed of the main drive wheels which has been idly rotated in high speed, so that, in some cases, a driver and/or a passenger feel uncomfortable, due to a shock caused by the rapid increase of a rotating speed of the subsidiary drive wheels.

Therefore, in this embodiment, when the front wheel rotation detection value nF is "0" and besides the rear wheel rotation detection value nR is larger than "0", the front wheel torque distribution instruction value $T_2$ is determined as "0" causing the two wheel drive condition, despite the front wheel torque distribution instruction value $T_2$ determined with the equation (2c) being greater than "0".

Meanwhile, in this embodiment, the drive system also includes the subsidiary speed change mechanism 58. Therefore, when the low speed shift position is selected in the subsidiary speed change mechanism 58, a drive condition is forced to change to the directly connecting four wheel drive condition, despite the front wheel torque distribution instruction value $T_2$ being determined as "0". Consequently, to avoid such changing, in this embodiment, the locking mechanism 35 is provided on the moving path of the shift (select) lever, and the locking mechanism 35 inhibits the select lever (shift lever) from being shifted to a low speed shift position in accordance with the predetermined control signal (low speed shift position inhibiting signal) $S_N$ which becomes ON by a logical value "1" while becoming OFF by a logical value "0", and when the front wheel rotation detection value nF is "0" and besides the rear wheel rotation detection value nR is larger than "0", the control signal $S_N$ is determined as "1", on the other hand when it is not so, the control signal $S_N$ is determined as "0".

Next, the computing process is explained with a flowchart shown in FIG. 24. The computing process is executed based on the above-explained basic principle, for inhibiting changing of drive condition to the four wheel drive condition when the main drive wheels idly rotating while the subsidiary drive wheels stopping rotating.

The computing process shown in FIG. 24 is also executed by a timer interruption for every predetermined times $\Delta T_S$ (e.g. 10 seconds). In the computing process, at first, at step S401, the front wheel rotation detection value nF is read from the front wheel rotation sensor 17F, and at next stop S402, the rear wheel rotation detection value nR is read from the rear wheel rotation sensor 17R. Then at next step S403, whether the front wheel rotation detection value nF read at the step S401 is "0" or not is determined, and if nF=0, the procedure is shifted to step S404, on the other hand if nF=0, the procedure is shifted to stop S405.

At the step S405, the low speed shift position inhibiting signal $S_N$ is determined as the logical value "0", and at next step S406, a difference $\Delta V_W$ of rotating speed between the rear and front wheels is computed from the front wheel rotation detection value nF and the rear wheel rotation detection value nR which are read at the steps S401 and S402, in accordance with the aforementioned equation (1), and the procedure is shifted to next step S407. At the step S407, referring to the characteristic curve shown in FIG. 23, the front wheel side torque distribution instruction value $T_2$ is determined in accordance with the difference $\Delta V_W$ of rotating speed between the front and rear wheels computed at the step S406, then the procedure is shifted to next step S408, On the other hand, at the step S404, whether the rear wheel rotation detection value nR read at the step S402 is greater than "0" or not is determined, and if nR>0, the procedure is shifted to step S409, an the other hard if it is not so, that is, if nR=0, the procedure is shifted to the step S405. At the stop S409, the low speed shift position inhibiting signal $S_N$ is determined as the logical value "1", then the procedure is shifted to the step S410. At the step S410, the front wheel side torque distribution instruction value $T_2$ is determined as "0", and the procedure is shifted to the step S408.

Then, at the step S408, the front wheel side torque distribution instruction value $T_2$ determined at either of the steps S407 and S410 is sent out, and at the next stop S411, the low speed shift position inhibiting signal $S_N$ determined as the logical value "0" or "1" at the step S405 or S409, is sent out, then the procedure is returned to a main program.

By the control signal $CS_0$ in accordance with thus determined front wheel side torque distribution instruction value $T_2$, the hydraulic pressure supply device 16 is controlled, so that a drive torque (drive force) in accordance with the front wheel side torque distribution instruction value $T_2$ is transmitted to the front wheels, and besides, the locking mechanism 35 for the shift lever is controlled in accordance with whether the low speed shift position inhibiting signal $S_N$ is "1" or "0".

Next, actions of the tour wheel drive system of this embodiment are explained below, which are executed by the computing process shown in FIG. 24.

In this embodiment, in usual, that is in a case except that the rear wheels idly rotating while the front wheels stopping rotating, at the step S405, the low speed shift position inhibiting signal $S_N$ is determined as the logical value "0", and at the step S407, referring to the characteristic curve shown in FIG. 23, the front wheel side torque distribution instruction value $T_2$ is determined in accordance with the difference $\Delta V_W$ computed at the step S406, thereby, a drive torque (drive force) in accordance with the front wheel side torque distribution instruction value $T_2$ is transmitted to the front wheels. Besides, since the locking mechanism 35 for the shift lever is not operated, it is allowed to move the shift lever to the low speed shift position in the subsidiary speed change mechanism 58.

However, during running of the vehicle on low $\mu$ road such as snowy load in the two wheel drive condition due to the difference $\Delta V_W$ being less than the predetermined value $\Delta V_W2$, when the vehicle falls into a situation that the rear wheels idly rotating while the front wheels stopping rotating, in a prior four wheel drive vehicle, the difference $\Delta V_W$ becomes equal to or greater than the predetermined value $\Delta V_W3$, so that a drive force distribution providing the directly connecting four wheel drive conditions is executed. On the other hand, in this embodiment, since the front-wheel rotation detection value nr read at the step S401 is "0", the procedure is shifted from the step S403 to the step S404, and due to the rear wheel rotation detection value nR read at the step S402 being nR>0, the procedure is shifted from the step S404 to the step S409, so that the low speed shift position inhibiting signal $S_N$ is determined as the logical value "1", and at the step S410, the front wheel side torque distribution instruction value $T_2=0$ is determined, then at the step S408, $T_2=0$ is sent out, and at the next step S411, the low speed shift position inhibiting signal $S_N=1$ is sent out, thereby, the two wheel drive condition is continued.

Thus, in the stuck situation, a shock caused by the rapid increase of rotating speed of the front wheels which has been stopped rotating, to the same as the rotating speed of the rear wheels which has been idly rotated in high speed, can be prevented.

It is noted that, in this case, the low speed shift position inhibiting signal $S_N$ determined as the logical value "1" has been sent out at the step S411, so that the locking mechanism 35 for the shift lever of the subsidiary speed change mechanism 58 is operated. Therefore, it is also prevented that a drive condition is forced to change to the directly connecting four wheel drive condition by selecting of the low speed shift position in the subsidiary speed change mechanism 58.

Therefore, in this embodiment, the step S401 in the computing process shown in FIG. 24 with the front wheel rotation sensor 17F constitute the subsidiary drive wheel rotating speed detecting means, while the step S402 in the computing process shown in FIG. 24 with the rear wheel rotation sensor 17R constitute the main drive wheel rotating speed detecting means. The steps S403 to S405 and S409 in the computing process shown in FIG. 24 with the locking mechanism 35 for the shift lever correspond to the four wheel drive condition inhibiting means. Further, the controller 18 corresponds to the drive force distribution control means, and the transfer 22 and the hydraulic pressure supply device correspond to the drive force distribution adjusting means.

It is noted that, though the detailed explanation is made about a four wheel drive vehicle based an a rear wheel drive vehicle in the aforementioned embodiment, the present invention is not limited to such a rear wheel drive based four wheel drive vehicle, but can be applied to a four wheel drive vehicle based on a front wheel drive vehicle. In such a case, the difference $\Delta V_W$ of rotating speed between the front and rear wheels is computed by $\Delta V_W=nF-nR$, then at the step S303 in FIG. 20 and at the step S403 in FIG. 24, whether the rear wheel rotation detection value nR is nR=0 or not is determined, and at the step S304 in FIG. 20 and at the step S404 in FIG. 24, whether the front wheel rotation detection value nF is nF>0 or not is determined. Further, the characteristic curve in FIG. 13 used at the step S310 in FIG. 20 and the characteristic curve used at the step S407 in FIG. 23 are changed respectively to the one corresponding to this case.

Further, though the four wheel drive system of the aforementioned embodiments comprises the subsidiary speed change mechanism in the transfer, the present invention is not limited to such a system, but can be applied to a four wheel drive system comprising no subsidiary speed change mechanism. Additionally, though the four wheel drive system of the aforementioned embodiments comprises the friction clutch of hydraulic type as the clutch mechanism, the present invention is not limited to such a system, but can be applied to a four wheel drive system comprising a friction clutch of electro-magnetic type. Further, though the four wheel drive system of the aforementioned embodiments comprises the micro-computer as the controller, the present invention is not limited to such a system, but can be applied to a four wheel drive system comprising another controller consisting of electronic circuits an e.g. calculating circuits and comparators.

What is claimed is:

1. A four wheel drive system for an automotive vehicle, the system comprising a drive force distribution adjusting means which uses either front wheels or rear wheels of the vehicle as main drive wheels while using remaining wheels as subsidiary drive wheels and which distributes a drive force supplied from an engine of the vehicle between the main and subsidiary drive wheels in accordance with a control signal, and a drive force distribution control means which determines a drive force distribution for the main and subsidiary drive wheels and which sends the control signal to the drive force distribution adjusting means in accordance with the determined drive force distribution, the system further comprising a vehicle speed detecting means for detecting a current vehicle speed, wherein:

the drive force distribution control means includes a directly connecting four wheel drive condition inhibiting means which inhibits a drive condition from being a directly connecting four wheel drive condition in which the drive force distribution for the main and subsidiary drive wheels is 1:1, based on a difference of rotating speed between the main and subsidiary drive wheels, wherein, when the difference is greater than a predetermined value, the four wheel drive condition inhibiting means inhibits the four wheel drive condition, and wherein the predetermined value is a variable that changes based on the current vehicle speed as detected by the vehicle speed detecting means.

2. A four wheel drive system for an automotive vehicle according to claim 1, wherein the rotating speed of the main drive wheels is computed based on an average of rotating speeds of the main drive wheels, and the rotating speed of the subsidiary drive wheels is computed based on an average of rotating speed of the subsidiary drive wheels, and wherein the difference of rotating speed between the main and subsidiary drive wheels is computed based on a difference between the computed averages of the main and subsidiary drive wheels.

3. A four wheel drive system for an automotive vehicle, the system comprising a drive force distribution adjusting means which uses either front wheels or rear wheels of the vehicle as main drive wheels while using remaining wheels as subsidiary drive wheels and which distributes a drive force supplied from an engine of the vehicle between the main and subsidiary drive wheels in accordance with a control signal, and a drive force distribution control means which determines a drive force distribution for the main and subsidiary drive wheels and which sends the control signal to the drive force distribution adjusting means in accordance with the determined drive force distribution, wherein:

the four wheel drive system further comprises a drive mode detecting means which detects an automatically or manually selected drive mode, and a different diameter wheel using situation detecting means which detects a different diameter wheel using situation when a difference of rotating speed between the front and rear wheels corresponding to the main and subsidiary drive wheels is kept greater than a predetermined value during a predetermined time, in which situation a diameter of at least one wheel of the vehicle is different from diameters of other wheels of the vehicle, and the drive force distribution control means determines a drive force distribution for the main and subsidiary drive wheels in accordance with at least a selected drive mode detected by the drive mode detecting means, wherein the drive force distribution control means includes a directly connecting four wheel drive condition inhibiting means which inhibits a drive condition from being a directly connecting four wheel drive condition in which the drive force distribution for the main and subsidiary drive wheels is 1:1 in accordance with the detection of the different diameter wheel using situation by the different diameter wheel using situation detecting means.

4. A four wheel drive system for an automotive vehicle according to claim 3, wherein:

the four wheel drive system further comprises a directly connecting four wheel drive condition detecting means which detects the directly connecting four wheel drive condition, wherein the drive force distribution control means further includes a drive force distribution changing means which changes the determined drive force distribution for the main and subsidiary drive wheels so that the drive force distribution for the main drive wheels becomes greater than the distribution for the subsidiary drive wheels when the directly connecting four wheel drive condition is detected by the directly connecting four wheel drive condition detecting means and which sends a control signal to the drive force distribution adjusting means in accordance with the changed determination, and the different diameter wheel using situation detecting means detects the different diameter wheel using situation after the drive force distribution has changed by the drive force distribution adjusting means in accordance with the control signal from the drive force distribution changing means.

5. A four wheel drive system for an automotive vehicle, the system comprising a drive force distribution adjusting unit which uses either front wheels or rear wheels of the vehicle as main drive wheels while using remaining wheels as subsidiary drive wheels and which distributes a drive force supplied from an engine of the vehicle between the main and subsidiary drive wheels in accordance with a control signal, and a drive force distribution control unit which determines a drive force distribution for the main and subsidiary drive wheels and which sends the control signal to the drive force distribution adjusting means in accordance with the determined drive force distribution, wherein:

the four wheel drive system further comprises:

a drive mode detector which detects an automatically or manually selected drive mode of the vehicle;

a different diameter wheel using situation detector which detects a different diameter wheel using situation when a difference of rotating speed between the front and rear wheels corresponding to the main and subsidiary drive wheels is kept greater than a predetermined value during a predetermined time, in which situation a diameter of at least one wheel of the vehicle is different from diameters of other wheels of the vehicle; and a directly connecting four wheel drive condition inhibitor which inhibits a drive condition from being a directly connecting four wheel drive condition in which the drive force distribution for the main and subsidiary drive wheels is 1:1, in accordance with the detection of the different diameter wheel using situation by the different diameter wheel using situation detector, wherein the drive force distribution control unit determines a drive force distribution for the main and the subsidiary drive wheels in accordance with at least a selected drive mode detected by the drive mode detector.

* * * * *